(12) United States Patent
Hunt et al.

(10) Patent No.: US 10,467,806 B2
(45) Date of Patent: Nov. 5, 2019

(54) VOLUME DIMENSIONING SYSTEMS AND METHODS

(71) Applicant: Intermec IP Corp., Fort Mill, SC (US)

(72) Inventors: Jeffrey Mark Hunt, Kirkland, WA (US); Edward J. Jennings, Seattle, WA (US); Nancy Wojack, Lynnword, WA (US); Scott Xavier Houle, Edmonds, WA (US)

(73) Assignee: INTERMEC IP CORP., Fort Mill, SC (US)

( * ) Notice: Subject to any disclaimer, the term of this patent is extended or adjusted under 35 U.S.C. 154(b) by 25 days.

(21) Appl. No.: 15/718,593

(22) Filed: Sep. 28, 2017

(65) Prior Publication Data

US 2018/0018820 A1    Jan. 18, 2018

Related U.S. Application Data

(63) Continuation of application No. 13/464,799, filed on May 4, 2012, now Pat. No. 9,779,546.

(51) Int. Cl.
*G06T 17/20* (2006.01)
*G01B 11/00* (2006.01)

(52) U.S. Cl.
CPC .............. *G06T 17/20* (2013.01); *G01B 11/00* (2013.01)

(58) Field of Classification Search
None
See application file for complete search history.

(56) References Cited

U.S. PATENT DOCUMENTS

| 3,971,065 A | 7/1976 | Bayer |
| 4,026,031 A | 5/1977 | Siddall et al. |
| 4,279,328 A | 7/1981 | Ahlbom |

(Continued)

FOREIGN PATENT DOCUMENTS

| AU | 2004212587 A1 | 4/2005 |
| CN | 201139117 Y | 10/2008 |

(Continued)

OTHER PUBLICATIONS

European Extended Search Report in related EP Application No. 17201794.9, dated Mar. 16, 2018, 10 pages [Only new art cited herein].

(Continued)

*Primary Examiner* — Michael J Cobb
(74) *Attorney, Agent, or Firm* — Additon, Higgins & Pendleton, P.A.

(57) ABSTRACT

Systems and methods for volume dimensioning packages are provided. A method of operating a volume dimensioning system may include the receipt of image data of an area at least a first three-dimensional object to be dimensioned from a first point of view as captured using at least one image sensor. The system can determine from the received image data a number of features in three dimensions of the first three-dimensional object. Based at least on part on the determined features of the first three-dimensional object, the system can fit a first three-dimensional packaging wireframe model about the first three-dimensional object. The system can display of an image of the first three-dimensional packaging wireframe model fitted about an image of the first three-dimensional object on a display device.

20 Claims, 15 Drawing Sheets

(56) References Cited

U.S. PATENT DOCUMENTS

| | | | |
|---|---|---|---|
| 4,398,811 A | 8/1983 | Nishioka et al. |
| 4,495,559 A | 1/1985 | Gelatt, Jr. |
| 4,634,278 A | 1/1987 | Ross et al. |
| 4,730,190 A | 3/1988 | Win et al. |
| 4,803,639 A | 2/1989 | Steele et al. |
| 4,914,460 A | 4/1990 | Caimi et al. |
| 4,974,919 A | 12/1990 | Muraki et al. |
| 5,111,325 A | 5/1992 | DeJager |
| 5,175,601 A | 12/1992 | Fitts |
| 5,184,733 A | 2/1993 | Amarson et al. |
| 5,198,648 A | 3/1993 | Hibbard |
| 5,220,536 A | 6/1993 | Stringer et al. |
| 5,243,619 A | 9/1993 | Albers et al. |
| 5,331,118 A | 7/1994 | Jensen |
| 5,359,185 A | 10/1994 | Hanson |
| 5,384,901 A | 1/1995 | Glassner et al. |
| 5,477,622 A | 12/1995 | Skalnik |
| 5,548,707 A | 8/1996 | LoNegro et al. |
| 5,555,090 A | 9/1996 | Schmutz |
| 5,561,526 A | 10/1996 | Huber et al. |
| 5,590,060 A | 12/1996 | Granville et al. |
| 5,592,333 A | 1/1997 | Lewis |
| 5,606,534 A | 2/1997 | Stringer et al. |
| 5,619,245 A | 4/1997 | Kessler et al. |
| 5,655,095 A | 8/1997 | LoNegro et al. |
| 5,661,561 A | 8/1997 | Wurz et al. |
| 5,699,161 A | 12/1997 | Woodworth |
| 5,729,750 A | 3/1998 | Ishida |
| 5,730,252 A | 3/1998 | Herbinet |
| 5,732,147 A | 3/1998 | Tao |
| 5,734,476 A | 3/1998 | Dlugos |
| 5,737,074 A | 4/1998 | Haga et al. |
| 5,748,199 A | 5/1998 | Palm |
| 5,767,962 A | 6/1998 | Suzuki et al. |
| 5,802,092 A | 9/1998 | Endriz |
| 5,808,657 A | 9/1998 | Kurtz et al. |
| 5,831,737 A | 11/1998 | Stringer et al. |
| 5,850,370 A | 12/1998 | Stringer et al. |
| 5,850,490 A | 12/1998 | Johnson |
| 5,869,827 A | 2/1999 | Rando |
| 5,870,220 A | 2/1999 | Migdal et al. |
| 5,900,611 A | 5/1999 | Hecht |
| 5,923,428 A | 7/1999 | Woodworth |
| 5,929,856 A | 7/1999 | LoNegro et al. |
| 5,938,710 A | 8/1999 | Lanza et al. |
| 5,959,568 A | 9/1999 | Woolley |
| 5,960,098 A | 9/1999 | Tao |
| 5,969,823 A | 10/1999 | Wurz et al. |
| 5,978,512 A | 11/1999 | Kim et al. |
| 5,979,760 A | 11/1999 | Freyman et al. |
| 5,988,862 A | 11/1999 | Kacyra et al. |
| 5,991,041 A | 11/1999 | Woodworth |
| 6,009,189 A | 12/1999 | Schaack |
| 6,025,847 A | 2/2000 | Marks |
| 6,035,067 A | 3/2000 | Ponticos |
| 6,049,386 A | 4/2000 | Stringer et al. |
| 6,053,409 A | 4/2000 | Brobst et al. |
| 6,064,759 A | 5/2000 | Buckley et al. |
| 6,067,110 A | 5/2000 | Nonaka et al. |
| 6,069,696 A | 5/2000 | McQueen et al. |
| 6,115,114 A | 9/2000 | Berg et al. |
| 6,137,577 A | 10/2000 | Woodworth |
| 6,177,999 B1 | 1/2001 | Wurz et al. |
| 6,189,223 B1 | 2/2001 | Haug |
| 6,232,597 B1 | 5/2001 | Kley |
| 6,236,403 B1 | 5/2001 | Chaki |
| 6,246,468 B1 | 6/2001 | Dimsdale |
| 6,333,749 B1 * | 12/2001 | Reinhardt ............... G01C 11/00 345/619 |
| 6,336,587 B1 | 1/2002 | He et al. |
| 6,369,401 B1 | 4/2002 | Lee |
| 6,373,579 B1 | 4/2002 | Ober et al. |
| 6,429,803 B1 | 8/2002 | Kumar |
| 6,457,642 B1 | 10/2002 | Good et al. |
| 6,507,406 B1 | 1/2003 | Yagi et al. |
| 6,517,004 B2 | 2/2003 | Good et al. |
| 6,519,550 B1 | 2/2003 | D'Hooge et al. |
| 6,535,776 B1 | 3/2003 | Tobin et al. |
| 6,661,521 B1 | 12/2003 | Stern |
| 6,674,904 B1 | 1/2004 | McQueen |
| 6,705,526 B1 | 3/2004 | Zhu et al. |
| 6,773,142 B2 | 8/2004 | Rekow |
| 6,781,621 B1 | 8/2004 | Gobush et al. |
| 6,804,269 B2 | 10/2004 | Lizotte et al. |
| 6,824,058 B2 | 11/2004 | Patel et al. |
| 6,832,725 B2 | 12/2004 | Gardiner et al. |
| 6,858,857 B2 | 2/2005 | Pease et al. |
| 6,912,293 B1 * | 6/2005 | Korobkin ............... G06T 15/20 345/420 |
| 6,922,632 B2 | 7/2005 | Foxlin |
| 6,971,580 B2 | 12/2005 | Zhu et al. |
| 6,995,762 B1 | 2/2006 | Pavlidis et al. |
| 7,057,632 B2 | 6/2006 | Yamawaki et al. |
| 7,085,409 B2 | 8/2006 | Sawhney et al. |
| 7,086,162 B2 | 8/2006 | Tyroler |
| 7,104,453 B1 | 9/2006 | Zhu et al. |
| 7,128,266 B2 | 10/2006 | Zhu et al. |
| 7,137,556 B1 | 11/2006 | Bonner et al. |
| 7,159,783 B2 | 1/2007 | Walczyk et al. |
| 7,161,688 B1 * | 1/2007 | Bonner ............... B07C 3/00 356/625 |
| 7,205,529 B2 | 4/2007 | Andersen et al. |
| 7,214,954 B2 | 5/2007 | Schopp |
| 7,233,682 B2 | 6/2007 | Levine |
| 7,277,187 B2 | 10/2007 | Smith et al. |
| 7,307,653 B2 | 12/2007 | Dutta |
| 7,310,431 B2 | 12/2007 | Gokturk et al. |
| 7,313,264 B2 | 12/2007 | Crampton |
| 7,353,137 B2 | 4/2008 | Vock et al. |
| 7,413,127 B2 | 8/2008 | Ehrhart et al. |
| 7,509,529 B2 | 3/2009 | Colucci et al. |
| 7,527,205 B2 | 5/2009 | Zhu |
| 7,586,049 B2 | 9/2009 | Wurz |
| 7,602,404 B1 * | 10/2009 | Reinhardt ............... G01C 11/00 345/629 |
| 7,614,563 B1 | 11/2009 | Nunnink et al. |
| 7,639,722 B1 | 12/2009 | Paxton et al. |
| 7,726,206 B2 | 6/2010 | Terrafranca, Jr. et al. |
| 7,726,575 B2 | 6/2010 | Wang et al. |
| 7,780,084 B2 | 8/2010 | Zhang et al. |
| 7,788,883 B2 | 9/2010 | Buckley et al. |
| 7,912,320 B1 | 3/2011 | Minor |
| 7,974,025 B2 | 7/2011 | Topliss |
| 8,009,358 B2 | 8/2011 | Zalevsky et al. |
| 8,027,096 B2 | 9/2011 | Feng et al. |
| 8,028,501 B2 | 10/2011 | Buckley et al. |
| 8,050,461 B2 | 11/2011 | Shpunt et al. |
| 8,055,061 B2 | 11/2011 | Katano |
| 8,061,610 B2 | 11/2011 | Nunnink |
| 8,072,581 B1 | 12/2011 | Breiholz |
| 8,102,395 B2 | 1/2012 | Kondo et al. |
| 8,132,728 B2 | 3/2012 | Dwinell et al. |
| 8,134,717 B2 | 3/2012 | Pangrazio et al. |
| 8,149,224 B1 | 4/2012 | Kuo et al. |
| 8,194,097 B2 | 6/2012 | Xiao et al. |
| 8,201,737 B1 | 6/2012 | Palacios Durazo et al. |
| 8,212,158 B2 | 7/2012 | Wiest |
| 8,212,889 B2 | 7/2012 | Chanas et al. |
| 8,224,133 B2 | 7/2012 | Popovich et al. |
| 8,228,510 B2 | 7/2012 | Pangrazio et al. |
| 8,230,367 B2 | 7/2012 | Bell et al. |
| 8,294,969 B2 | 10/2012 | Plesko |
| 8,301,027 B2 | 10/2012 | Shaw et al. |
| 3,305,458 A1 | 11/2012 | Hara |
| 8,305,458 B2 | 11/2012 | Hara |
| 8,310,656 B2 | 11/2012 | Zalewski |
| 8,313,380 B2 | 11/2012 | Zalewski et al. |
| 8,317,105 B2 | 11/2012 | Kotlarsky et al. |
| 8,320,621 B2 | 11/2012 | McEldowney |
| 8,322,622 B2 | 12/2012 | Liu |
| 8,339,462 B2 | 12/2012 | Stec et al. |
| 8,350,959 B2 | 1/2013 | Topliss et al. |
| 8,351,670 B2 | 1/2013 | Ijiri et al. |
| 8,366,005 B2 | 2/2013 | Kotlarsky et al. |

(56) References Cited

U.S. PATENT DOCUMENTS

| | | | |
|---|---|---|---|
| 8,368,762 | B1 | 2/2013 | Chen et al. |
| 8,371,507 | B2 | 2/2013 | Haggerty et al. |
| 8,374,498 | B2 | 2/2013 | Pastore |
| 8,376,233 | B2 | 2/2013 | Van Horn et al. |
| 8,381,976 | B2 | 2/2013 | Mohideen et al. |
| 8,381,979 | B2 | 2/2013 | Franz |
| 8,390,909 | B2 | 3/2013 | Plesko |
| 8,408,464 | B2 | 4/2013 | Zhu et al. |
| 8,408,468 | B2 | 4/2013 | Horn et al. |
| 8,408,469 | B2 | 4/2013 | Good |
| 8,424,768 | B2 | 4/2013 | Rueblinger et al. |
| 3,437,539 | A1 | 5/2013 | Komatsu et al. |
| 8,441,749 | B2 | 5/2013 | Brown et al. |
| 8,448,863 | B2 | 5/2013 | Xian et al. |
| 8,457,013 | B2 | 6/2013 | Essinger et al. |
| 8,459,557 | B2 | 6/2013 | Havens et al. |
| 8,463,079 | B2 | 6/2013 | Ackley et al. |
| 8,469,272 | B2 | 6/2013 | Kearney |
| 8,474,712 | B2 | 7/2013 | Kearney et al. |
| 8,479,992 | B2 | 7/2013 | Kotlarsky et al. |
| 8,490,877 | B2 | 7/2013 | Kearney |
| 8,517,271 | B2 | 8/2013 | Kotlarsky et al. |
| 8,523,076 | B2 | 9/2013 | Good |
| 8,528,818 | B2 | 9/2013 | Ehrhart et al. |
| 8,544,737 | B2 | 10/2013 | Gomez et al. |
| 8,548,420 | B2 | 10/2013 | Grunow et al. |
| 8,550,335 | B2 | 10/2013 | Samek et al. |
| 8,550,354 | B2 | 10/2013 | Gannon et al. |
| 8,550,357 | B2 | 10/2013 | Kearney |
| 8,556,174 | B2 | 10/2013 | Kosecki et al. |
| 8,556,176 | B2 | 10/2013 | Van Horn et al. |
| 8,556,177 | B2 | 10/2013 | Hussey et al. |
| 8,559,767 | B2 | 10/2013 | Barber et al. |
| 8,561,895 | B2 | 10/2013 | Gomez et al. |
| 8,561,903 | B2 | 10/2013 | Sauerwein |
| 8,561,905 | B2 | 10/2013 | Edmonds et al. |
| 8,565,107 | B2 | 10/2013 | Pease et al. |
| 8,570,343 | B2 | 10/2013 | Halstead |
| 8,571,307 | B2 | 10/2013 | Li et al. |
| 8,576,390 | B1 | 11/2013 | Nunnink |
| 8,579,200 | B2 | 11/2013 | Samek et al. |
| 8,583,924 | B2 | 11/2013 | Caballero et al. |
| 8,584,945 | B2 | 11/2013 | Wang et al. |
| 8,587,595 | B2 | 11/2013 | Wang |
| 8,587,697 | B2 | 11/2013 | Hussey et al. |
| 8,588,869 | B2 | 11/2013 | Sauerwein et al. |
| 8,590,789 | B2 | 11/2013 | Nahill et al. |
| 8,594,425 | B2 | 11/2013 | Gurman et al. |
| 8,596,539 | B2 | 12/2013 | Havens et al. |
| 8,596,542 | B2 | 12/2013 | Havens et al. |
| 8,596,543 | B2 | 12/2013 | Havens et al. |
| 8,599,271 | B2 | 12/2013 | Havens et al. |
| 8,599,957 | B2 | 12/2013 | Peake et al. |
| 8,600,158 | B2 | 12/2013 | Li et al. |
| 8,600,167 | B2 | 12/2013 | Showering |
| 8,602,309 | B2 | 12/2013 | Longacre et al. |
| 8,608,053 | B2 | 12/2013 | Meier et al. |
| 8,608,071 | B2 | 12/2013 | Liu et al. |
| 8,611,309 | B2 | 12/2013 | Wang et al. |
| 8,615,487 | B2 | 12/2013 | Gomez et al. |
| 8,621,123 | B2 | 12/2013 | Caballero |
| 8,622,303 | B2 | 1/2014 | Meier et al. |
| 8,628,013 | B2 | 1/2014 | Ding |
| 8,628,015 | B2 | 1/2014 | Wang et al. |
| 8,628,016 | B2 | 1/2014 | Winegar |
| 8,629,926 | B2 | 1/2014 | Wang |
| 8,630,491 | B2 | 1/2014 | Longacre et al. |
| 8,635,309 | B2 | 1/2014 | Berthiaume et al. |
| 8,636,200 | B2 | 1/2014 | Kearney |
| 8,636,212 | B2 | 1/2014 | Nahill et al. |
| 8,636,215 | B2 | 1/2014 | Ding et al. |
| 8,636,224 | B2 | 1/2014 | Wang |
| 8,638,806 | B2 | 1/2014 | Wang et al. |
| 8,640,958 | B2 | 2/2014 | Lu et al. |
| 8,640,960 | B2 | 2/2014 | Wang et al. |
| 8,643,717 | B2 | 2/2014 | Li et al. |
| 8,646,692 | B2 | 2/2014 | Meier et al. |
| 8,646,694 | B2 | 2/2014 | Wang et al. |
| 8,657,200 | B2 | 2/2014 | Ren et al. |
| 8,659,397 | B2 | 2/2014 | Vargo et al. |
| 8,668,149 | B2 | 3/2014 | Good |
| 8,678,285 | B2 | 3/2014 | Kearney |
| 8,678,286 | B2 | 3/2014 | Smith et al. |
| 8,682,077 | B1 | 3/2014 | Longacre |
| D702,237 | S | 4/2014 | Oberpriller et al. |
| 8,687,000 | B2 * | 4/2014 | Panahpour Tehrani ..................... G06T 15/405 345/419 |
| 8,687,282 | B2 | 4/2014 | Feng et al. |
| 8,692,927 | B2 | 4/2014 | Pease et al. |
| 8,695,880 | B2 | 4/2014 | Bremer et al. |
| 8,698,949 | B2 | 4/2014 | Grunow et al. |
| 8,702,000 | B2 | 4/2014 | Barber et al. |
| 8,717,494 | B2 | 5/2014 | Gannon |
| 8,720,783 | B2 | 5/2014 | Biss et al. |
| 8,723,804 | B2 | 5/2014 | Fletcher et al. |
| 8,723,904 | B2 | 5/2014 | Marty et al. |
| 8,727,223 | B2 | 5/2014 | Wang |
| 8,740,082 | B2 | 6/2014 | Wilz |
| 8,740,085 | B2 | 6/2014 | Furlong et al. |
| 8,746,563 | B2 | 6/2014 | Hennick et al. |
| 8,750,445 | B2 | 6/2014 | Peake et al. |
| 8,752,766 | B2 | 6/2014 | Xian et al. |
| 8,756,059 | B2 | 6/2014 | Braho et al. |
| 8,757,495 | B2 | 6/2014 | Qu et al. |
| 8,760,563 | B2 | 6/2014 | Koziol et al. |
| 8,763,909 | B2 | 7/2014 | Reed et al. |
| 8,777,108 | B2 | 7/2014 | Coyle |
| 8,777,109 | B2 | 7/2014 | Oberpriller et al. |
| 8,779,898 | B2 | 7/2014 | Havens et al. |
| 8,781,520 | B2 | 7/2014 | Payne et al. |
| 8,783,573 | B2 | 7/2014 | Havens et al. |
| 8,789,757 | B2 | 7/2014 | Barten |
| 8,789,758 | B2 | 7/2014 | Hawley et al. |
| 8,789,759 | B2 | 7/2014 | Xian et al. |
| 8,792,688 | B2 | 7/2014 | Unsworth |
| 8,794,520 | B2 | 8/2014 | Wang et al. |
| 8,794,522 | B2 | 8/2014 | Ehrhart |
| 8,794,525 | B2 | 8/2014 | Amundsen et al. |
| 8,794,526 | B2 | 8/2014 | Wang et al. |
| 8,798,367 | B2 | 8/2014 | Ellis |
| 8,807,431 | B2 | 8/2014 | Wang et al. |
| 8,807,432 | B2 | 8/2014 | Van Horn et al. |
| 8,810,779 | B1 | 8/2014 | Hilde |
| 8,820,630 | B2 | 9/2014 | Qu et al. |
| 8,822,806 | B2 | 9/2014 | Cockerell et al. |
| 8,822,848 | B2 | 9/2014 | Meagher |
| 8,824,692 | B2 | 9/2014 | Sheerin et al. |
| 8,824,696 | B2 | 9/2014 | Braho |
| 8,842,849 | B2 | 9/2014 | Wahl et al. |
| 8,844,822 | B2 | 9/2014 | Kotlarsky et al. |
| 8,844,823 | B2 | 9/2014 | Fritz et al. |
| 8,849,019 | B2 | 9/2014 | Li et al. |
| D716,285 | S | 10/2014 | Chaney et al. |
| 8,851,383 | B2 | 10/2014 | Yeakley et al. |
| 8,854,633 | B2 | 10/2014 | Laffargue |
| 8,866,963 | B2 | 10/2014 | Grunow et al. |
| 8,868,421 | B2 | 10/2014 | Braho et al. |
| 8,868,519 | B2 | 10/2014 | Maloy et al. |
| 8,868,802 | B2 | 10/2014 | Barten |
| 8,868,803 | B2 | 10/2014 | Caballero |
| 8,870,074 | B1 | 10/2014 | Gannon |
| 8,879,639 | B2 | 11/2014 | Sauerwein |
| 8,880,426 | B2 | 11/2014 | Smith |
| 8,881,983 | B2 | 11/2014 | Havens et al. |
| 8,881,987 | B2 | 11/2014 | Wang |
| 8,897,596 | B1 | 11/2014 | Passmore et al. |
| 8,903,172 | B2 | 12/2014 | Smith |
| 8,908,277 | B2 | 12/2014 | Pesach et al. |
| 8,908,995 | B2 | 12/2014 | Benos et al. |
| 8,910,870 | B2 | 12/2014 | Li et al. |
| 8,910,875 | B2 | 12/2014 | Ren et al. |
| 8,914,290 | B2 | 12/2014 | Hendrickson et al. |
| 8,914,788 | B2 | 12/2014 | Pettinelli et al. |

(56) References Cited

U.S. PATENT DOCUMENTS

| | | |
|---|---|---|
| 8,915,439 B2 | 12/2014 | Feng et al. |
| 8,915,444 B2 | 12/2014 | Havens et al. |
| 8,916,789 B2 | 12/2014 | Woodburn |
| 8,918,250 B2 | 12/2014 | Hollifield |
| 8,918,564 B2 | 12/2014 | Caballero |
| 8,925,818 B2 | 1/2015 | Kosecki et al. |
| 8,928,896 B2 | 1/2015 | Kennington et al. |
| 8,939,374 B2 | 1/2015 | Jovanovski et al. |
| 8,942,480 B2 | 1/2015 | Ellis |
| 8,944,313 B2 | 2/2015 | Williams et al. |
| 8,944,327 B2 | 2/2015 | Meier et al. |
| 8,944,332 B2 | 2/2015 | Harding et al. |
| 8,950,678 B2 | 2/2015 | Germaine et al. |
| D723,560 S | 3/2015 | Zhou et al. |
| 8,967,468 B2 | 3/2015 | Gomez et al. |
| 8,971,346 B2 | 3/2015 | Sevier |
| 8,976,030 B2 | 3/2015 | Cunningham et al. |
| 8,976,368 B2 | 3/2015 | Akel et al. |
| 8,978,981 B2 | 3/2015 | Guan |
| 8,978,983 B2 | 3/2015 | Bremer et al. |
| 8,978,984 B2 | 3/2015 | Hennick et al. |
| 8,985,456 B2 | 3/2015 | Zhu et al. |
| 8,985,457 B2 | 3/2015 | Soule et al. |
| 8,985,459 B2 | 3/2015 | Kearney et al. |
| 8,985,461 B2 | 3/2015 | Gelay et al. |
| 8,988,578 B2 | 3/2015 | Showering |
| 8,988,590 B2 | 3/2015 | Gillet et al. |
| 8,991,704 B2 | 3/2015 | Hopper et al. |
| 8,993,974 B2 | 3/2015 | Goodwin |
| 8,996,194 B2 | 3/2015 | Davis et al. |
| 8,996,384 B2 | 3/2015 | Funyak et al. |
| 8,998,091 B2 | 4/2015 | Edmonds et al. |
| 9,002,641 B2 | 4/2015 | Showering |
| 9,007,368 B2 | 4/2015 | Laffargue et al. |
| 9,010,641 B2 | 4/2015 | Qu et al. |
| 9,014,441 B2 | 4/2015 | Truyen et al. |
| 9,015,513 B2 | 4/2015 | Murawski et al. |
| 9,016,576 B2 | 4/2015 | Brady et al. |
| D730,357 S | 5/2015 | Fitch et al. |
| 9,022,288 B2 | 5/2015 | Nahill et al. |
| 9,030,964 B2 | 5/2015 | Essinger et al. |
| 9,033,240 B2 | 5/2015 | Smith et al. |
| 9,033,242 B2 | 5/2015 | Gillet et al. |
| 9,036,054 B2 | 5/2015 | Koziol et al. |
| 9,037,344 B2 | 5/2015 | Chamberlin |
| 9,038,911 B2 | 5/2015 | Xian et al. |
| 9,038,915 B2 | 5/2015 | Smith |
| D730,901 S | 6/2015 | Oberpriller et al. |
| D730,902 S | 6/2015 | Fitch et al. |
| 9,047,098 B2 | 6/2015 | Barten |
| 9,047,359 B2 | 6/2015 | Caballero et al. |
| 9,047,420 B2 | 6/2015 | Caballero |
| 9,047,525 B2 | 6/2015 | Barber |
| 9,047,531 B2 | 6/2015 | Showering et al. |
| 9,049,640 B2 | 6/2015 | Wang et al. |
| 9,053,055 B2 | 6/2015 | Caballero |
| 9,053,378 B1 | 6/2015 | Hou et al. |
| 9,053,380 B2 | 6/2015 | Xian et al. |
| 9,057,641 B2 | 6/2015 | Amundsen et al. |
| 9,058,526 B2 | 6/2015 | Powilleit |
| 9,061,527 B2 | 6/2015 | Tobin et al. |
| 9,064,165 B2 | 6/2015 | Havens et al. |
| 9,064,167 B2 | 6/2015 | Xian et al. |
| 9,064,168 B2 | 6/2015 | Todeschini et al. |
| 9,064,254 B2 | 6/2015 | Todeschini et al. |
| 9,066,032 B2 | 6/2015 | Wang |
| 9,066,087 B2 | 6/2015 | Shpunt |
| 9,070,032 B2 | 6/2015 | Corcoran |
| D734,339 S | 7/2015 | Zhou et al. |
| D734,751 S | 7/2015 | Oberpriller et al. |
| 9,076,459 B2 | 7/2015 | Braho et al. |
| 9,079,423 B2 | 7/2015 | Bouverie et al. |
| 9,080,856 B2 | 7/2015 | Laffargue |
| 9,082,023 B2 | 7/2015 | Feng et al. |
| 9,082,195 B2 | 7/2015 | Holeva et al. |
| 9,084,032 B2 | 7/2015 | Rautiola et al. |
| 9,087,250 B2 | 7/2015 | Coyle |
| 9,092,681 B2 | 7/2015 | Havens et al. |
| 9,092,682 B2 | 7/2015 | Wilz et al. |
| 9,092,683 B2 | 7/2015 | Koziol et al. |
| 9,093,141 B2 | 7/2015 | Liu |
| 9,098,763 B2 | 8/2015 | Lu et al. |
| 9,104,929 B2 | 8/2015 | Todeschini |
| 9,104,934 B2 | 8/2015 | Li et al. |
| 9,107,484 B2 | 8/2015 | Chaney |
| 9,111,159 B2 | 8/2015 | Liu et al. |
| 9,111,166 B2 | 8/2015 | Cunningham |
| 9,135,483 B2 | 9/2015 | Liu et al. |
| 9,137,009 B1 | 9/2015 | Gardiner |
| 9,141,839 B2 | 9/2015 | Xian et al. |
| 9,142,035 B1 | 9/2015 | Rotman et al. |
| 9,147,096 B2 | 9/2015 | Wang |
| 9,148,474 B2 | 9/2015 | Skvoretz |
| 9,158,000 B2 | 10/2015 | Sauerwein |
| 9,158,340 B2 | 10/2015 | Reed et al. |
| 9,158,953 B2 | 10/2015 | Gillet et al. |
| 9,159,059 B2 | 10/2015 | Daddabbo et al. |
| 9,165,174 B2 | 10/2015 | Huck |
| 9,171,278 B1 | 10/2015 | Kong et al. |
| 9,171,543 B2 | 10/2015 | Emerick et al. |
| 9,183,425 B2 | 11/2015 | Wang |
| 9,189,669 B2 | 11/2015 | Zhu et al. |
| 9,195,844 B2 | 11/2015 | Todeschini et al. |
| 9,202,458 B2 | 12/2015 | Braho et al. |
| 9,208,366 B2 | 12/2015 | Liu |
| 9,208,367 B2 | 12/2015 | Wang |
| 9,219,836 B2 | 12/2015 | Bouverie et al. |
| 9,224,022 B2 | 12/2015 | Ackley et al. |
| 9,224,024 B2 | 12/2015 | Bremer et al. |
| 9,224,027 B2 | 12/2015 | Van Horn et al. |
| D747,321 S | 1/2016 | London et al. |
| 9,230,140 B1 | 1/2016 | Ackley |
| 9,233,470 B1 | 1/2016 | Bradski et al. |
| 9,235,553 B2 | 1/2016 | Fitch et al. |
| 9,235,899 B1 | 1/2016 | Kirmani et al. |
| 9,239,950 B2 | 1/2016 | Fletcher |
| 9,245,492 B2 | 1/2016 | Ackley et al. |
| 9,443,123 B2 | 1/2016 | Hejl |
| 9,248,640 B2 | 2/2016 | Heng |
| 9,250,652 B2 | 2/2016 | London et al. |
| 9,250,712 B1 | 2/2016 | Todeschini |
| 9,251,411 B2 | 2/2016 | Todeschini |
| 9,258,033 B2 | 2/2016 | Showering |
| 9,262,633 B1 | 2/2016 | Todeschini et al. |
| 9,262,660 B2 | 2/2016 | Lu et al. |
| 9,262,662 B2 | 2/2016 | Chen et al. |
| 9,269,036 B2 | 2/2016 | Bremer |
| 9,270,782 B2 | 2/2016 | Hala et al. |
| 9,273,846 B1 | 3/2016 | Rossi et al. |
| 9,274,812 B2 | 3/2016 | Doren et al. |
| 9,275,388 B2 | 3/2016 | Havens et al. |
| 9,277,668 B2 | 3/2016 | Feng et al. |
| 9,280,693 B2 | 3/2016 | Feng et al. |
| 9,286,496 B2 | 3/2016 | Smith |
| 9,297,900 B2 | 3/2016 | Jiang |
| 9,298,964 B2 | 3/2016 | Li et al. |
| 9,299,013 B1 | 3/2016 | Curlander et al. |
| 9,301,427 B2 | 3/2016 | Feng et al. |
| 9,304,376 B2 | 4/2016 | Anderson |
| 9,310,609 B2 | 4/2016 | Rueblinger et al. |
| 9,313,377 B2 | 4/2016 | Todeschini et al. |
| 9,317,037 B2 | 4/2016 | Byford et al. |
| D757,009 S | 5/2016 | Oberpriller et al. |
| 9,342,723 B2 | 5/2016 | Liu et al. |
| 9,342,724 B2 | 5/2016 | McCloskey |
| 9,361,882 B2 | 6/2016 | Ressler et al. |
| 9,365,381 B2 | 6/2016 | Colonel et al. |
| 9,366,861 B1 | 6/2016 | Johnson |
| 9,373,018 B2 | 6/2016 | Colavito et al. |
| 9,375,945 B1 | 6/2016 | Bowles |
| 9,378,403 B2 | 6/2016 | Wang et al. |
| D760,719 S | 7/2016 | Zhou et al. |
| 9,360,304 B2 | 7/2016 | Chang et al. |
| 9,383,848 B2 | 7/2016 | Daghigh |

(56) References Cited

U.S. PATENT DOCUMENTS

| | | |
|---|---|---|
| 9,384,374 B2 | 7/2016 | Bianconi |
| 9,390,596 B1 | 7/2016 | Todeschini |
| 9,399,557 B1 | 7/2016 | Mishra et al. |
| D762,604 S | 8/2016 | Fitch et al. |
| 9,411,386 B2 | 8/2016 | Sauerwein |
| 9,412,242 B2 | 8/2016 | Van Horn et al. |
| 9,418,269 B2 | 8/2016 | Havens et al. |
| 9,418,270 B2 | 8/2016 | Van Volkinburg et al. |
| 9,423,318 B2 | 8/2016 | Lui et al. |
| 9,424,749 B1 | 8/2016 | Reed et al. |
| D766,244 S | 9/2016 | Zhou et al. |
| 9,443,222 B2 | 9/2016 | Singel et al. |
| 9,454,689 B2 | 9/2016 | McCloskey et al. |
| 9,464,885 B2 | 10/2016 | Lloyd et al. |
| 9,465,967 B2 | 10/2016 | Xian et al. |
| 9,470,511 B2 | 10/2016 | Maynard et al. |
| 9,478,113 B2 | 10/2016 | Xie et al. |
| 9,478,983 B2 | 10/2016 | Kather et al. |
| D771,631 S | 11/2016 | Fitch et al. |
| 9,481,186 B2 | 11/2016 | Bouverie et al. |
| 9,486,921 B1 | 11/2016 | Straszheim et al. |
| 9,488,986 B1 | 11/2016 | Solanki |
| 9,489,782 B2 | 11/2016 | Payne et al. |
| 9,490,540 B1 | 11/2016 | Davies et al. |
| 9,491,729 B2 | 11/2016 | Rautiola et al. |
| 9,497,092 B2 | 11/2016 | Gomez et al. |
| 9,507,974 B1 | 11/2016 | Todeschini |
| 9,519,814 B2 | 12/2016 | Cudzilo |
| 9,521,331 B2 | 12/2016 | Bessettes et al. |
| 9,530,038 B2 | 12/2016 | Xian et al. |
| D777,166 S | 1/2017 | Bidwell et al. |
| 9,558,386 B2 | 1/2017 | Yeakley |
| 9,572,901 B2 | 2/2017 | Todeschini |
| 9,595,038 B1 | 3/2017 | Cavalcanti et al. |
| 9,606,581 B1 | 3/2017 | Howe et al. |
| D783,601 S | 4/2017 | Schulte et al. |
| D785,617 S | 5/2017 | Bidwell et al. |
| D785,636 S | 5/2017 | Oberpriller et al. |
| 9,646,189 B2 | 5/2017 | Lu et al. |
| 9,646,191 B2 | 5/2017 | Unemyr et al. |
| 9,652,648 B2 | 5/2017 | Ackley et al. |
| 9,652,653 B2 | 5/2017 | Todeschini et al. |
| 9,656,487 B2 | 5/2017 | Ho et al. |
| 9,659,198 B2 | 5/2017 | Giordano et al. |
| D790,505 S | 6/2017 | Vargo et al. |
| D790,546 S | 6/2017 | Zhou et al. |
| 9,680,282 B2 | 6/2017 | Hanenburg |
| 9,697,401 B2 | 7/2017 | Feng et al. |
| 9,701,140 B1 | 7/2017 | Alaganchetty et al. |
| 9,709,387 B2 | 7/2017 | Fujita et al. |
| 9,736,459 B2 | 8/2017 | Mor et al. |
| 9,741,136 B2 | 8/2017 | Holz |
| 9,779,546 B2 | 10/2017 | Hunt et al. |
| 9,828,223 B2 | 11/2017 | Svensson et al. |
| 2001/0027995 A1 | 10/2001 | Patel et al. |
| 2001/0032879 A1 | 10/2001 | He et al. |
| 2002/0036765 A1 | 3/2002 | McCaffrey |
| 2002/0054289 A1 | 5/2002 | Thibault et al. |
| 2002/0067855 A1 | 6/2002 | Chiu et al. |
| 2002/0105639 A1 | 8/2002 | Roelke |
| 2002/0109835 A1 | 8/2002 | Goetz |
| 2002/0113946 A1 | 8/2002 | Kitaguchi et al. |
| 2002/0118874 A1 | 8/2002 | Chung et al. |
| 2002/0158873 A1 | 10/2002 | Williamson |
| 2002/0167677 A1 | 11/2002 | Okada et al. |
| 2002/0179708 A1 | 12/2002 | Zhu et al. |
| 2002/0186897 A1 | 12/2002 | Kim et al. |
| 2002/0196534 A1 | 12/2002 | Lizotte et al. |
| 2003/0038179 A1 | 2/2003 | Tsikos et al. |
| 2003/0053513 A1 | 3/2003 | Vatan et al. |
| 2003/0063086 A1 | 4/2003 | Baumberg |
| 2003/0078755 A1 | 4/2003 | Leutz et al. |
| 2003/0091227 A1 | 5/2003 | Chang et al. |
| 2003/0156756 A1 | 8/2003 | Gokturk et al. |
| 2003/0163287 A1 | 8/2003 | Vock et al. |
| 2003/0197138 A1 | 10/2003 | Pease et al. |
| 2003/0225712 A1 | 12/2003 | Cooper et al. |
| 2003/0235331 A1 | 12/2003 | Kawaike et al. |
| 2004/0008259 A1 | 1/2004 | Gokturk et al. |
| 2004/0019274 A1 | 1/2004 | Galloway et al. |
| 2004/0024754 A1 | 2/2004 | Mane et al. |
| 2004/0066329 A1 | 4/2004 | Zeitfuss et al. |
| 2004/0073359 A1 | 4/2004 | Ichijo et al. |
| 2004/0083025 A1 | 4/2004 | Yamanouchi et al. |
| 2004/0089482 A1 | 5/2004 | Ramsden et al. |
| 2004/0098146 A1 | 5/2004 | Katae et al. |
| 2004/0105580 A1 | 6/2004 | Hager et al. |
| 2004/0118928 A1 | 6/2004 | Patel et al. |
| 2004/0122779 A1 | 6/2004 | Stickler et al. |
| 2004/0132297 A1 | 7/2004 | Baba et al. |
| 2004/0155975 A1 | 8/2004 | Hart et al. |
| 2004/0165090 A1 | 8/2004 | Ning |
| 2004/0184041 A1 | 9/2004 | Schopp |
| 2004/0211836 A1 | 10/2004 | Patel et al. |
| 2004/0214623 A1 | 10/2004 | Takahashi et al. |
| 2004/0233461 A1 | 11/2004 | Armstrong et al. |
| 2004/0258353 A1 | 12/2004 | Gluckstad et al. |
| 2005/0006477 A1 | 1/2005 | Patel |
| 2005/0117215 A1 | 6/2005 | Lange |
| 2005/0128193 A1 | 6/2005 | Popescu et al. |
| 2005/0128196 A1 | 6/2005 | Popescu et al. |
| 2005/0168488 A1 | 8/2005 | Montague |
| 2005/0187887 A1 | 8/2005 | Nicolas et al. |
| 2005/0211782 A1 | 9/2005 | Martin |
| 2005/0240317 A1 | 10/2005 | Kienzle-Lietl |
| 2005/0257748 A1 | 11/2005 | Kriesel et al. |
| 2005/0264867 A1 | 12/2005 | Cho et al. |
| 2006/0036556 A1 | 2/2006 | Knispel |
| 2006/0047704 A1 | 3/2006 | Gopalakrishnan |
| 2006/0078226 A1 | 4/2006 | Zhou |
| 2006/0108266 A1 | 5/2006 | Bowers et al. |
| 2006/0109105 A1 | 5/2006 | Varner et al. |
| 2006/0112023 A1 | 5/2006 | Horhann |
| 2006/0151604 A1 | 7/2006 | Zhu et al. |
| 2006/0159307 A1 | 7/2006 | Anderson et al. |
| 2006/0159344 A1 | 7/2006 | Shao et al. |
| 2006/0213999 A1 | 9/2006 | Wang et al. |
| 2006/0230640 A1 | 10/2006 | Chen |
| 2006/0232681 A1 | 10/2006 | Okada |
| 2006/0255150 A1 | 11/2006 | Longacre |
| 2006/0269165 A1 | 11/2006 | Viswanathan |
| 2006/0276709 A1 | 12/2006 | Khamene et al. |
| 2006/0291719 A1 | 12/2006 | Ikeda et al. |
| 2007/0003154 A1 | 1/2007 | Sun et al. |
| 2007/0025612 A1 | 2/2007 | Iwasaki et al. |
| 2007/0031064 A1 | 2/2007 | Zhao et al. |
| 2007/0063048 A1 | 3/2007 | Havens et al. |
| 2007/0116357 A1 | 5/2007 | Dewaele |
| 2007/0127022 A1 | 6/2007 | Cohen et al. |
| 2007/0143082 A1 | 6/2007 | Degnan |
| 2007/0153293 A1 | 7/2007 | Gruhlke et al. |
| 2007/0165013 A1 | 7/2007 | Goulanian et al. |
| 2007/0171220 A1 | 7/2007 | Kriveshko |
| 2007/0177011 A1 | 8/2007 | Lewin et al. |
| 2007/0181685 A1 | 8/2007 | Zhu et al. |
| 2007/0237356 A1 | 10/2007 | Dwinell et al. |
| 2007/0291031 A1 | 12/2007 | Konev et al. |
| 2007/0299338 A1 | 12/2007 | Stevick et al. |
| 2008/0013793 A1 | 1/2008 | Hillis et al. |
| 2008/0035390 A1 | 2/2008 | Wurz |
| 2008/0047760 A1 | 2/2008 | Georgitsis |
| 2008/0050042 A1 | 2/2008 | Zhang et al. |
| 2008/0054062 A1 | 3/2008 | Gunning et al. |
| 2008/0056536 A1 | 3/2008 | Hildreth et al. |
| 2008/0062164 A1 | 3/2008 | Bassi et al. |
| 2008/0065509 A1 | 3/2008 | Williams |
| 2008/0077265 A1 | 3/2008 | Boyden |
| 2008/0079955 A1 | 4/2008 | Storm |
| 2008/0156619 A1 | 7/2008 | Patel et al. |
| 2008/0164074 A1 | 7/2008 | Wurz |
| 2008/0204476 A1 | 8/2008 | Montague |
| 2008/0212168 A1 | 9/2008 | Olmstead et al. |
| 2008/0247635 A1 | 10/2008 | Davis et al. |
| 2008/0273191 A1 | 11/2008 | Kim et al. |

(56) References Cited

U.S. PATENT DOCUMENTS

| | | |
|---|---|---|
| 2008/0273210 A1 | 11/2008 | Hilde |
| 2008/0278790 A1 | 11/2008 | Boesser et al. |
| 2009/0038182 A1 | 2/2009 | Lans et al. |
| 2009/0046296 A1 | 2/2009 | Kilpartrick et al. |
| 2009/0059004 A1 | 3/2009 | Bochicchio |
| 2009/0081008 A1 | 3/2009 | Somin et al. |
| 2009/0095047 A1 | 4/2009 | Patel et al. |
| 2009/0114818 A1 | 5/2009 | Casares et al. |
| 2009/0134221 A1 | 5/2009 | Zhu et al. |
| 2009/0161090 A1 | 6/2009 | Campbell et al. |
| 2009/0189858 A1 | 7/2009 | Lev et al. |
| 2009/0195790 A1 | 8/2009 | Zhu et al. |
| 2009/0225333 A1 | 9/2009 | Bendall et al. |
| 2009/0237411 A1 | 9/2009 | Gossweiler et al. |
| 2009/0268023 A1 | 10/2009 | Hsieh |
| 2009/0272724 A1 | 11/2009 | Gubler |
| 2009/0273770 A1 | 11/2009 | Bauhahn et al. |
| 2009/0313948 A1 | 12/2009 | Buckley et al. |
| 2009/0318815 A1 | 12/2009 | Barnes et al. |
| 2009/0323084 A1 | 12/2009 | Dunn et al. |
| 2009/0323121 A1 | 12/2009 | Valkenburg |
| 2010/0035637 A1 | 2/2010 | Varanasi et al. |
| 2010/0060604 A1 | 3/2010 | Zwart et al. |
| 2010/0091104 A1 | 4/2010 | Sprigle |
| 2010/0113153 A1 | 5/2010 | Yen et al. |
| 2010/0118200 A1 | 5/2010 | Gelman et al. |
| 2010/0128109 A1 | 5/2010 | Banks |
| 2010/0161170 A1 | 6/2010 | Sills |
| 2010/0171740 A1 | 7/2010 | Andersen et al. |
| 2010/0172567 A1 | 7/2010 | Prokoski |
| 2010/0177076 A1 | 7/2010 | Essinger et al. |
| 2010/0177080 A1 | 7/2010 | Essinger et al. |
| 2010/0177707 A1 | 7/2010 | Essinger et al. |
| 2010/0177749 A1 | 7/2010 | Essinger et al. |
| 2010/0194709 A1 | 8/2010 | Tamaki et al. |
| 2010/0202702 A1 | 8/2010 | Benos et al. |
| 2010/0208039 A1 | 8/2010 | Stettner |
| 2010/0211355 A1 | 8/2010 | Horst et al. |
| 2010/0217678 A1 | 8/2010 | Goncalves |
| 2010/0220849 A1 | 9/2010 | Colbert et al. |
| 2010/0220894 A1 | 9/2010 | Ackley et al. |
| 2010/0223276 A1 | 9/2010 | Al-Shameri et al. |
| 2010/0245850 A1 | 9/2010 | Lee et al. |
| 2010/0254611 A1 | 10/2010 | Amz |
| 2010/0274728 A1 | 10/2010 | Kugelman |
| 2010/0303336 A1 | 12/2010 | Abraham |
| 2010/0315413 A1 | 12/2010 | Izadi et al. |
| 2010/0321482 A1 | 12/2010 | Cleveland |
| 2011/0019155 A1 | 1/2011 | Daniel et al. |
| 2011/0040192 A1 | 2/2011 | Brenner et al. |
| 2011/0040407 A1 | 2/2011 | Lim |
| 2011/0043609 A1 | 2/2011 | Choi et al. |
| 2011/0075936 A1 | 3/2011 | Deaver |
| 2011/0081044 A1 | 4/2011 | Peeper |
| 2011/0099474 A1 | 4/2011 | Grossman et al. |
| 2011/0169999 A1 | 7/2011 | Grunow et al. |
| 2011/0180695 A1 | 7/2011 | Li et al. |
| 2011/0188054 A1 | 8/2011 | Petronius et al. |
| 2011/0188741 A1 | 8/2011 | Sones et al. |
| 2011/0202554 A1 | 8/2011 | Powilleit et al. |
| 2011/0234389 A1 | 9/2011 | Mellin |
| 2011/0235854 A1 | 9/2011 | Berger et al. |
| 2011/0243432 A1 | 10/2011 | Hirsch et al. |
| 2011/0249864 A1 | 10/2011 | Venkatesan et al. |
| 2011/0254840 A1 | 10/2011 | Halstead |
| 2011/0260965 A1 | 10/2011 | Kim et al. |
| 2011/0279916 A1 | 11/2011 | Brown et al. |
| 2011/0286007 A1 | 11/2011 | Pangrazio et al. |
| 2011/0286628 A1 | 11/2011 | Goncalves et al. |
| 2011/0288818 A1 | 11/2011 | Thierman |
| 2011/0297590 A1 | 12/2011 | Ackley et al. |
| 2011/0301994 A1 | 12/2011 | Tieman |
| 2011/0303748 A1 | 12/2011 | Lemma et al. |
| 2011/0310227 A1 | 12/2011 | Konertz et al. |
| 2011/0310256 A1 | 12/2011 | Shishido |
| 2012/0014572 A1 | 1/2012 | Wong et al. |
| 2012/0024952 A1 | 2/2012 | Chen |
| 2012/0056982 A1 | 3/2012 | Katz et al. |
| 2012/0057345 A1 | 3/2012 | Kuchibhotla |
| 2012/0067955 A1 | 3/2012 | Rowe |
| 2012/0074227 A1 | 3/2012 | Ferren et al. |
| 2012/0081714 A1 | 4/2012 | Pangrazio et al. |
| 2012/0082383 A1 | 4/2012 | Kruglick |
| 2012/0111946 A1 | 5/2012 | Golant |
| 2012/0113223 A1 | 5/2012 | Hilliges et al. |
| 2012/0126000 A1 | 5/2012 | Kunzig et al. |
| 2012/0140300 A1 | 6/2012 | Freeman |
| 2012/0168509 A1 | 7/2012 | Nunnink et al. |
| 2012/0168512 A1 | 7/2012 | Kotlarsky et al. |
| 2012/0179665 A1 | 7/2012 | Baarman et al. |
| 2012/0185094 A1 | 7/2012 | Rosenstein et al. |
| 2012/0190386 A1 | 7/2012 | Anderson |
| 2012/0193423 A1 | 8/2012 | Samek |
| 2012/0197464 A1 | 8/2012 | Wang et al. |
| 2012/0203647 A1 | 8/2012 | Smith |
| 2012/0218436 A1 | 9/2012 | Rodriguez et al. |
| 2012/0223141 A1 | 9/2012 | Good et al. |
| 2012/0224026 A1 | 9/2012 | Bayer et al. |
| 2012/0224060 A1 | 9/2012 | Gurevich et al. |
| 2012/0236212 A1 | 9/2012 | Itoh et al. |
| 2012/0236288 A1 | 9/2012 | Stanley |
| 2012/0242852 A1 | 9/2012 | Hayward et al. |
| 2012/0113250 A1 | 10/2012 | Farlotti et al. |
| 2012/0256901 A1 | 10/2012 | Bendall |
| 2012/0261474 A1 | 10/2012 | Kawashime et al. |
| 2012/0262558 A1 | 10/2012 | Boger et al. |
| 2012/0280908 A1 | 11/2012 | Rhoads et al. |
| 2012/0282905 A1 | 11/2012 | Owen |
| 2012/0282911 A1 | 11/2012 | Davis et al. |
| 2012/0284012 A1 | 11/2012 | Rodriguez et al. |
| 2012/0284122 A1 | 11/2012 | Brandis |
| 2012/0284339 A1 | 11/2012 | Rodriguez |
| 2012/0284593 A1 | 11/2012 | Rodriguez |
| 2012/0293610 A1 | 11/2012 | Doepke et al. |
| 2012/0293625 A1 | 11/2012 | Schneider et al. |
| 2012/0294478 A1 | 11/2012 | Publicover et al. |
| 2012/0294549 A1 | 11/2012 | Doepke |
| 2012/0299961 A1 | 11/2012 | Ramkumar et al. |
| 2012/0300991 A1 | 11/2012 | Mikio |
| 2012/0313848 A1 | 12/2012 | Galor et al. |
| 2012/0314030 A1 | 12/2012 | Datta |
| 2012/0314058 A1 | 12/2012 | Bendall et al. |
| 2012/0314258 A1 | 12/2012 | Moriya |
| 2012/0316820 A1 | 12/2012 | Nakazato et al. |
| 2013/0019278 A1 | 1/2013 | Sun et al. |
| 2013/0038881 A1 | 2/2013 | Pesach et al. |
| 2013/0038941 A1 | 2/2013 | Pesach et al. |
| 2013/0043312 A1 | 2/2013 | Van Horn |
| 2013/0050426 A1 | 2/2013 | Sarmast et al. |
| 2013/0075168 A1 | 3/2013 | Amundsen et al. |
| 2013/0076857 A1 | 3/2013 | Kurashige et al. |
| 2013/0093895 A1 | 4/2013 | Palmer et al. |
| 2013/0094069 A1 | 4/2013 | Lee et al. |
| 2013/0101158 A1 | 4/2013 | Lloyd et al. |
| 2013/0156267 A1 | 6/2013 | Muraoka et al. |
| 2013/0175341 A1 | 7/2013 | Kearney et al. |
| 2013/0175343 A1 | 7/2013 | Good |
| 2013/0200150 A1 | 8/2013 | Reynolds et al. |
| 2013/0201288 A1 | 8/2013 | Billerbaeck et al. |
| 2013/0208164 A1 | 8/2013 | Cazier et al. |
| 2013/0211790 A1 | 8/2013 | Loveland et al. |
| 2013/0222592 A1 | 8/2013 | Gieseke |
| 2013/0223673 A1 | 8/2013 | Davis et al. |
| 2013/0257744 A1 | 10/2013 | Daghigh et al. |
| 2013/0257759 A1 | 10/2013 | Daghigh |
| 2013/0270346 A1 | 10/2013 | Xian et al. |
| 2013/0291998 A1 | 11/2013 | Konnerth |
| 2013/0292475 A1 | 11/2013 | Kotlarsky et al. |
| 2013/0292477 A1 | 11/2013 | Hennick et al. |
| 2013/0293539 A1 | 11/2013 | Hunt et al. |
| 2013/0293540 A1 | 11/2013 | Laffargue et al. |
| 2013/0306728 A1 | 11/2013 | Thuries et al. |
| 2013/0306731 A1 | 11/2013 | Pedraro |
| 2013/0307964 A1 | 11/2013 | Bremer et al. |

(56) References Cited

U.S. PATENT DOCUMENTS

| | | |
|---|---|---|
| 2013/0308013 A1 | 11/2013 | Li et al. |
| 2013/0308625 A1 | 11/2013 | Park et al. |
| 2013/0313324 A1 | 11/2013 | Koziol et al. |
| 2013/0317642 A1 | 11/2013 | Asaria |
| 2013/0326425 A1 | 12/2013 | Forstall et al. |
| 2013/0329012 A1 | 12/2013 | Bartos |
| 2013/0329013 A1 | 12/2013 | Metois et al. |
| 2013/0332524 A1 | 12/2013 | Fiala et al. |
| 2013/0342343 A1 | 12/2013 | Harring et al. |
| 2014/0001258 A1 | 1/2014 | Chan et al. |
| 2014/0001267 A1 | 1/2014 | Giordano et al. |
| 2014/0002828 A1 | 1/2014 | Laffargue et al. |
| 2014/0009586 A1 | 1/2014 | McNamer et al. |
| 2014/0019005 A1 | 1/2014 | Lee et al. |
| 2014/0021259 A1 | 1/2014 | Moed et al. |
| 2014/0025584 A1 | 1/2014 | Liu et al. |
| 2014/0031665 A1 | 1/2014 | Pinto et al. |
| 2014/0034731 A1 | 2/2014 | Gao et al. |
| 2014/0034734 A1 | 2/2014 | Sauerwein |
| 2014/0039674 A1 | 2/2014 | Motoyama et al. |
| 2014/0039693 A1 | 2/2014 | Havens et al. |
| 2014/0049120 A1 | 2/2014 | Kohtz et al. |
| 2014/0049635 A1 | 2/2014 | Laffargue et al. |
| 2014/0058612 A1 | 2/2014 | Wong et al. |
| 2014/0061306 A1 | 3/2014 | Wu et al. |
| 2014/0062709 A1 | 3/2014 | Hyer et al. |
| 2014/0063289 A1 | 3/2014 | Hussey et al. |
| 2014/0064624 A1 | 3/2014 | Kim et al. |
| 2014/0066136 A1 | 3/2014 | Sauerwein et al. |
| 2014/0067104 A1 | 3/2014 | Osterhout |
| 2014/0067692 A1 | 3/2014 | Ye et al. |
| 2014/0070005 A1 | 3/2014 | Nahill et al. |
| 2014/0071430 A1 | 3/2014 | Hansen et al. |
| 2014/0071840 A1 | 3/2014 | Venancio |
| 2014/0074746 A1 | 3/2014 | Wang |
| 2014/0076974 A1 | 3/2014 | Havens et al. |
| 2014/0078342 A1 | 3/2014 | Li et al. |
| 2014/0079297 A1 | 3/2014 | Tadayon et al. |
| 2014/0091147 A1 | 4/2014 | Evans et al. |
| 2014/0097238 A1 | 4/2014 | Ghazizadeh |
| 2014/0097252 A1 | 4/2014 | He et al. |
| 2014/0098091 A1 | 4/2014 | Hori |
| 2014/0098243 A1 | 4/2014 | Ghazizadeh |
| 2014/0098244 A1 | 4/2014 | Ghazizadeh |
| 2014/0098792 A1 | 4/2014 | Wang et al. |
| 2014/0100774 A1 | 4/2014 | Showering |
| 2014/0100813 A1 | 4/2014 | Showering |
| 2014/0103115 A1 | 4/2014 | Meier et al. |
| 2014/0104413 A1 | 4/2014 | McCloskey et al. |
| 2014/0104414 A1 | 4/2014 | McCloskey et al. |
| 2014/0104416 A1 | 4/2014 | Giordano et al. |
| 2014/0104664 A1 | 4/2014 | Lee |
| 2014/0106725 A1 | 4/2014 | Sauerwein |
| 2014/0108010 A1 | 4/2014 | Maltseff et al. |
| 2014/0108402 A1 | 4/2014 | Gomez et al. |
| 2014/0108682 A1 | 4/2014 | Caballero |
| 2014/0110485 A1 | 4/2014 | Toa et al. |
| 2014/0114530 A1 | 4/2014 | Fitch et al. |
| 2014/0125577 A1 | 5/2014 | Hoang et al. |
| 2014/0125853 A1 | 5/2014 | Wang |
| 2014/0125999 A1 | 5/2014 | Longacre et al. |
| 2014/0129378 A1 | 5/2014 | Richardson |
| 2014/0131443 A1 | 5/2014 | Smith |
| 2014/0131444 A1 | 5/2014 | Wang |
| 2014/0133379 A1 | 5/2014 | Wang et al. |
| 2014/0135984 A1 | 5/2014 | Hirata |
| 2014/0136208 A1 | 5/2014 | Maltseff et al. |
| 2014/0139654 A1 | 5/2014 | Taskahashi |
| 2014/0140585 A1 | 5/2014 | Wang |
| 2014/0142398 A1 | 5/2014 | Patil et al. |
| 2014/0152882 A1 | 6/2014 | Samek et al. |
| 2014/0152975 A1 | 6/2014 | Ko |
| 2014/0157861 A1 | 6/2014 | Jonas et al. |
| 2014/0158468 A1 | 6/2014 | Adami |
| 2014/0158770 A1 | 6/2014 | Sevier et al. |
| 2014/0159869 A1 | 6/2014 | Zumsteg et al. |
| 2014/0166755 A1 | 6/2014 | Liu et al. |
| 2014/0166757 A1 | 6/2014 | Smith |
| 2014/0168380 A1 | 6/2014 | Heidemann et al. |
| 2014/0168787 A1 | 6/2014 | Wang et al. |
| 2014/0175165 A1 | 6/2014 | Havens et al. |
| 2014/0177931 A1 | 6/2014 | Kocherscheidt et al. |
| 2014/0191913 A1 | 7/2014 | Ge et al. |
| 2014/0192187 A1 | 7/2014 | Atwell et al. |
| 2014/0192551 A1 | 7/2014 | Masaki |
| 2014/0197239 A1 | 7/2014 | Havens et al. |
| 2014/0197304 A1 | 7/2014 | Feng et al. |
| 2014/0201126 A1 | 7/2014 | Zadeh et al. |
| 2014/0204268 A1 | 7/2014 | Grunow et al. |
| 2014/0205150 A1 | 7/2014 | Ogawa |
| 2014/0214631 A1 | 7/2014 | Hansen |
| 2014/0217166 A1 | 8/2014 | Berthiaume et al. |
| 2014/0217180 A1 | 8/2014 | Liu |
| 2014/0225918 A1 | 8/2014 | Mittal et al. |
| 2014/0225985 A1 | 8/2014 | Klusza et al. |
| 2014/0231500 A1 | 8/2014 | Ehrhart et al. |
| 2014/0240454 A1 | 8/2014 | Lee |
| 2014/0247279 A1 | 9/2014 | Nicholas et al. |
| 2014/0247280 A1 | 9/2014 | Nicholas et al. |
| 2014/0247315 A1 | 9/2014 | Marty et al. |
| 2014/0263493 A1 | 9/2014 | Amurgis et al. |
| 2014/0263645 A1 | 9/2014 | Smith et al. |
| 2014/0267609 A1 | 9/2014 | Laffargue |
| 2014/0268093 A1 | 9/2014 | Tohme et al. |
| 2014/0270196 A1 | 9/2014 | Braho et al. |
| 2014/0270229 A1 | 9/2014 | Braho |
| 2014/0270361 A1 | 9/2014 | Amma et al. |
| 2014/0278387 A1 | 9/2014 | DiGregorio |
| 2014/0282210 A1 | 9/2014 | Bianconi |
| 2014/0288933 A1 | 9/2014 | Braho et al. |
| 2014/0297058 A1 | 10/2014 | Barker et al. |
| 2014/0299665 A1 | 10/2014 | Barber et al. |
| 2014/0306833 A1 | 10/2014 | Ricci |
| 2014/0307855 A1 | 10/2014 | Withagen et al. |
| 2014/0313527 A1 | 10/2014 | Askan |
| 2014/0319219 A1 | 10/2014 | Liu et al. |
| 2014/0320408 A1 | 10/2014 | Zagorsek et al. |
| 2014/0320605 A1 | 10/2014 | Johnson |
| 2014/0333775 A1 | 11/2014 | Naikal et al. |
| 2014/0347533 A1 | 11/2014 | Ovsiannikov et al. |
| 2014/0350710 A1 | 11/2014 | Gopalkrishnan et al. |
| 2014/0351317 A1 | 11/2014 | Smith et al. |
| 2014/0362184 A1 | 12/2014 | Jovanovski et al. |
| 2014/0363015 A1 | 12/2014 | Braho |
| 2014/0369511 A1 | 12/2014 | Sheerin et al. |
| 2014/0374483 A1 | 12/2014 | Lu |
| 2014/0374485 A1 | 12/2014 | Xian et al. |
| 2014/0379613 A1 | 12/2014 | Nishitani et al. |
| 2015/0001301 A1 | 1/2015 | Ouyang |
| 2015/0003673 A1 | 1/2015 | Fletcher |
| 2015/0009100 A1 | 1/2015 | Haneda et al. |
| 2015/0009301 A1 | 1/2015 | Ribnick et al. |
| 2015/0009338 A1 | 1/2015 | Laffargue et al. |
| 2015/0014416 A1 | 1/2015 | Kotlarsky et al. |
| 2015/0016712 A1 | 1/2015 | Rhoads et al. |
| 2015/0021397 A1 | 1/2015 | Rueblinger et al. |
| 2015/0028104 A1 | 1/2015 | Ma et al. |
| 2015/0029002 A1 | 1/2015 | Yeakley et al. |
| 2015/0032709 A1 | 1/2015 | Maloy et al. |
| 2015/0036876 A1 | 2/2015 | Marrion et al. |
| 2015/0039309 A1 | 2/2015 | Braho et al. |
| 2015/0040378 A1 | 2/2015 | Saber et al. |
| 2015/0042791 A1 | 2/2015 | Metois et al. |
| 2015/0049347 A1 | 2/2015 | Laffargue et al. |
| 2015/0051992 A1 | 2/2015 | Smith |
| 2015/0053769 A1 | 2/2015 | Thuries et al. |
| 2015/0062160 A1 | 3/2015 | Sakamoto et al. |
| 2015/0062366 A1 | 3/2015 | Liu et al. |
| 2015/0062369 A1 | 3/2015 | Gehring et al. |
| 2015/0063215 A1 | 3/2015 | Wang |
| 2015/0063676 A1 | 3/2015 | Lloyd et al. |
| 2015/0070158 A1 | 3/2015 | Hayasaka |
| 2015/0070489 A1 | 3/2015 | Hudman et al. |
| 2015/0088522 A1 | 3/2015 | Hendrickson et al. |

(56) References Cited

U.S. PATENT DOCUMENTS

| | | |
|---|---|---|
| 2015/0096872 A1 | 4/2015 | Woodburn |
| 2015/0100196 A1 | 4/2015 | Hollifield |
| 2015/0115035 A1 | 4/2015 | Meier et al. |
| 2015/0116498 A1 | 4/2015 | Vartiainen et al. |
| 2015/0117749 A1 | 4/2015 | Chen et al. |
| 2015/0127791 A1 | 5/2015 | Kosecki et al. |
| 2015/0128116 A1 | 5/2015 | Chen et al. |
| 2015/0130928 A1 | 5/2015 | Maynard et al. |
| 2015/0133047 A1 | 5/2015 | Smith et al. |
| 2015/0134470 A1 | 5/2015 | Hejl et al. |
| 2015/0136851 A1 | 5/2015 | Harding et al. |
| 2015/0142492 A1 | 5/2015 | Kumar |
| 2015/0144692 A1 | 5/2015 | Hejl |
| 2015/0144698 A1 | 5/2015 | Teng et al. |
| 2015/0149946 A1 | 5/2015 | Benos et al. |
| 2015/0161429 A1 | 6/2015 | Xian |
| 2015/0163474 A1 | 6/2015 | You |
| 2015/0178900 A1 | 6/2015 | Kim et al. |
| 2015/0182844 A1 | 7/2015 | Jang |
| 2015/0186703 A1 | 7/2015 | Chen et al. |
| 2015/0199957 A1 | 7/2015 | Funyak et al. |
| 2015/0204662 A1 | 7/2015 | Kobayashi et al. |
| 2015/0210199 A1 | 7/2015 | Payne |
| 2015/0213590 A1* | 7/2015 | Brown .................... G06T 17/05 345/419 |
| 2015/0213647 A1 | 7/2015 | Laffargue et al. |
| 2015/0219748 A1 | 8/2015 | Hyatt |
| 2015/0220753 A1 | 8/2015 | Zhu et al. |
| 2015/0229838 A1 | 8/2015 | Hakim et al. |
| 2015/0243030 A1 | 8/2015 | Pfeiffer |
| 2015/0248578 A1 | 9/2015 | Utsumi |
| 2015/0253469 A1 | 9/2015 | Le Gros et al. |
| 2015/0254485 A1 | 9/2015 | Feng et al. |
| 2015/0260830 A1 | 9/2015 | Ghosh et al. |
| 2015/0269403 A1 | 9/2015 | Lei et al. |
| 2015/0201181 A1 | 10/2015 | Herschbach |
| 2015/0276379 A1 | 10/2015 | Ni et al. |
| 2015/0308816 A1 | 10/2015 | Laffargue et al. |
| 2015/0310243 A1 | 10/2015 | Ackley |
| 2015/0310389 A1 | 10/2015 | Crimm et al. |
| 2015/0316368 A1 | 10/2015 | Moench et al. |
| 2015/0325036 A1 | 11/2015 | Lee |
| 2015/0327012 A1 | 11/2015 | Bian et al. |
| 2015/0332075 A1 | 11/2015 | Burch |
| 2015/0332463 A1 | 11/2015 | Galera et al. |
| 2015/0355470 A1 | 12/2015 | Herschbach |
| 2016/0014251 A1 | 1/2016 | Hejl |
| 2016/0169665 A1 | 1/2016 | Deschenes et al. |
| 2016/0040982 A1 | 2/2016 | Li et al. |
| 2016/0042241 A1 | 2/2016 | Todeschini |
| 2016/0048725 A1 | 2/2016 | Holz et al. |
| 2016/0057230 A1 | 2/2016 | Todeschini et al. |
| 2016/0070982 A1 | 2/2016 | Li et al. |
| 2016/0062473 A1 | 3/2016 | Bouchat et al. |
| 2016/0063429 A1 | 3/2016 | Varley et al. |
| 2016/0065912 A1 | 3/2016 | Peterson |
| 2016/0088287 A1 | 3/2016 | Sadi et al. |
| 2016/0090283 A1 | 3/2016 | Svensson et al. |
| 2016/0090284 A1 | 3/2016 | Svensson et al. |
| 2016/0092805 A1 | 3/2016 | Geisler et al. |
| 2016/0094016 A1 | 3/2016 | Beach et al. |
| 2016/0101936 A1 | 4/2016 | Chamberlin |
| 2016/0102975 A1 | 4/2016 | McCloskey et al. |
| 2016/0104019 A1 | 4/2016 | Todeschini et al. |
| 2016/0104274 A1 | 4/2016 | Jovanovski et al. |
| 2016/0109219 A1 | 4/2016 | Ackley et al. |
| 2016/0109220 A1 | 4/2016 | Laffargue et al. |
| 2016/0109224 A1 | 4/2016 | Thuries et al. |
| 2016/0112631 A1 | 4/2016 | Ackley et al. |
| 2016/0112643 A1 | 4/2016 | Laffargue et al. |
| 2016/0117627 A1 | 4/2016 | Raj et al. |
| 2016/0117631 A1 | 4/2016 | McCloskey et al. |
| 2016/0124516 A1 | 5/2016 | Schoon et al. |
| 2016/0125217 A1 | 5/2016 | Todeschini |
| 2016/0125342 A1 | 5/2016 | Miller et al. |
| 2016/0133253 A1 | 5/2016 | Braho et al. |
| 2016/0138247 A1 | 5/2016 | Conway et al. |
| 2016/0138248 A1 | 5/2016 | Conway et al. |
| 2016/0138249 A1 | 5/2016 | Svensson et al. |
| 2016/0147408 A1 | 5/2016 | Bevis et al. |
| 2016/0164261 A1 | 6/2016 | Warren |
| 2016/0171597 A1 | 6/2016 | Todeschini |
| 2016/0171666 A1 | 6/2016 | McCloskey |
| 2016/0171720 A1 | 6/2016 | Todeschini |
| 2016/0171775 A1 | 6/2016 | Todeschini et al. |
| 2016/0171777 A1 | 6/2016 | Todeschini et al. |
| 2016/0174674 A1 | 6/2016 | Oberpriller et al. |
| 2016/0178479 A1 | 6/2016 | Goldsmith |
| 2016/0178685 A1 | 6/2016 | Young et al. |
| 2016/0178707 A1 | 6/2016 | Young et al. |
| 2016/0178915 A1 | 6/2016 | Mor et al. |
| 2016/0179132 A1 | 6/2016 | Harr et al. |
| 2016/0179143 A1 | 6/2016 | Bidwell et al. |
| 2016/0179368 A1 | 6/2016 | Roeder |
| 2016/0179378 A1 | 6/2016 | Kent et al. |
| 2016/0180130 A1 | 6/2016 | Bremer |
| 2016/0180133 A1 | 6/2016 | Oberpriller et al. |
| 2016/0180136 A1 | 6/2016 | Meier et al. |
| 2016/0180594 A1 | 6/2016 | Todeschini |
| 2016/0180663 A1 | 6/2016 | McMahan et al. |
| 2016/0180678 A1 | 6/2016 | Ackley et al. |
| 2016/0180713 A1 | 6/2016 | Bernhardt et al. |
| 2016/0185136 A1 | 6/2016 | Ng et al. |
| 2016/0185291 A1 | 6/2016 | Chamberlin |
| 2016/0186926 A1 | 6/2016 | Oberpriller et al. |
| 2016/0187186 A1 | 6/2016 | Coleman et al. |
| 2016/0187187 A1 | 6/2016 | Coleman et al. |
| 2016/0187210 A1 | 6/2016 | Coleman et al. |
| 2016/0188861 A1 | 6/2016 | Todeschini |
| 2016/0188939 A1 | 6/2016 | Sailors et al. |
| 2016/0188940 A1 | 6/2016 | Lu et al. |
| 2016/0188941 A1 | 6/2016 | Todeschini et al. |
| 2016/0188942 A1 | 6/2016 | Good et al. |
| 2016/0188943 A1 | 6/2016 | Linwood |
| 2016/0188944 A1 | 6/2016 | Wilz et al. |
| 2016/0189076 A1 | 6/2016 | Mellott et al. |
| 2016/0189087 A1 | 6/2016 | Morton et al. |
| 2016/0189088 A1 | 6/2016 | Pecorari et al. |
| 2016/0189092 A1 | 6/2016 | George et al. |
| 2016/0189284 A1 | 6/2016 | Mellott et al. |
| 2016/0189288 A1 | 6/2016 | Todeschini |
| 2016/0189366 A1 | 6/2016 | Chamberlin et al. |
| 2016/0189443 A1 | 6/2016 | Smith |
| 2016/0189447 A1 | 6/2016 | Valenzuela |
| 2016/0189489 A1 | 6/2016 | Au et al. |
| 2016/0191684 A1 | 6/2016 | DiPiazza et al. |
| 2016/0191801 A1 | 6/2016 | Sivan |
| 2016/0192051 A1 | 6/2016 | DiPiazza et al. |
| 2016/0125873 A1 | 7/2016 | Braho et al. |
| 2016/0202478 A1 | 7/2016 | Masson et al. |
| 2016/0202951 A1 | 7/2016 | Pike et al. |
| 2016/0202958 A1 | 7/2016 | Zabel et al. |
| 2016/0202959 A1 | 7/2016 | Doubleday et al. |
| 2016/0203021 A1 | 7/2016 | Pike et al. |
| 2016/0203429 A1 | 7/2016 | Mellott et al. |
| 2016/0203641 A1 | 7/2016 | Bostick et al. |
| 2016/0203797 A1 | 7/2016 | Pike et al. |
| 2016/0203820 A1 | 7/2016 | Zabel et al. |
| 2016/0204623 A1 | 7/2016 | Haggert et al. |
| 2016/0204636 A1 | 7/2016 | Allen et al. |
| 2016/0204638 A1 | 7/2016 | Miraglia et al. |
| 2016/0210780 A1 | 7/2016 | Paulovich et al. |
| 2016/0316190 A1 | 7/2016 | McCloskey et al. |
| 2016/0223474 A1 | 8/2016 | Tang et al. |
| 2016/0227912 A1 | 8/2016 | Oberpriller et al. |
| 2016/0232891 A1 | 8/2016 | Pecorari |
| 2016/0292477 A1 | 10/2016 | Bidwell |
| 2016/0294779 A1 | 10/2016 | Yeakley et al. |
| 2016/0306769 A1 | 10/2016 | Kohtz et al. |
| 2016/0314276 A1 | 10/2016 | Sewell et al. |
| 2016/0314294 A1 | 10/2016 | Kubler et al. |
| 2016/0323310 A1 | 11/2016 | Todeschini et al. |
| 2016/0325677 A1 | 11/2016 | Fitch et al. |
| 2016/0327614 A1 | 11/2016 | Young et al. |

(56) References Cited

U.S. PATENT DOCUMENTS

| | | |
|---|---|---|
| 2016/0327930 A1 | 11/2016 | Charpentier et al. |
| 2016/0328762 A1 | 11/2016 | Pape |
| 2016/0328854 A1 | 11/2016 | Kimura |
| 2016/0330218 A1 | 11/2016 | Hussey et al. |
| 2016/0343163 A1 | 11/2016 | Venkatesha et al. |
| 2016/0343176 A1 | 11/2016 | Ackley |
| 2016/0364914 A1 | 12/2016 | Todeschini |
| 2016/0370220 A1 | 12/2016 | Ackley et al. |
| 2016/0372282 A1 | 12/2016 | Bandringa |
| 2016/0373847 A1 | 12/2016 | Vargo et al. |
| 2016/0377414 A1 | 12/2016 | Thuries et al. |
| 2016/0377417 A1 | 12/2016 | Jovanovski et al. |
| 2017/0010141 A1 | 1/2017 | Ackley |
| 2017/0010328 A1 | 1/2017 | Mullen et al. |
| 2017/0010780 A1 | 1/2017 | Waldron et al. |
| 2017/0016714 A1 | 1/2017 | Laffargue et al. |
| 2017/0018094 A1 | 1/2017 | Todeschini |
| 2017/0046603 A1 | 2/2017 | Lee et al. |
| 2017/0047864 A1 | 2/2017 | Stang et al. |
| 2017/0053146 A1 | 2/2017 | Liu et al. |
| 2017/0053147 A1 | 2/2017 | Geramine et al. |
| 2017/0053647 A1 | 2/2017 | Nichols et al. |
| 2017/0055606 A1 | 3/2017 | Xu et al. |
| 2017/0060316 A1 | 3/2017 | Larson |
| 2017/0061961 A1 | 3/2017 | Nichols et al. |
| 2017/0064634 A1 | 3/2017 | Van Horn et al. |
| 2017/0083730 A1 | 3/2017 | Feng et al. |
| 2017/0091502 A1 | 3/2017 | Furlong et al. |
| 2017/0091706 A1 | 3/2017 | Lloyd et al. |
| 2017/0091741 A1 | 3/2017 | Todeschini |
| 2017/0091904 A1 | 3/2017 | Ventress |
| 2017/0092908 A1 | 3/2017 | Chaney |
| 2017/0094238 A1 | 3/2017 | Germaine et al. |
| 2017/0098947 A1 | 4/2017 | Wolski |
| 2017/0100949 A1 | 4/2017 | Celinder et al. |
| 2017/0103545 A1 | 4/2017 | Holz |
| 2017/0108838 A1 | 4/2017 | Todeschini et al. |
| 2017/0108895 A1 | 4/2017 | Chamberlin et al. |
| 2017/0115490 A1 | 4/2017 | Hsieh et al. |
| 2017/0115497 A1 | 4/2017 | Chen et al. |
| 2017/0116462 A1 | 4/2017 | Ogasawara |
| 2017/0118355 A1 | 4/2017 | Wong et al. |
| 2017/0121158 A1 | 5/2017 | Wong |
| 2017/0123598 A1 | 5/2017 | Phan et al. |
| 2017/0124369 A1 | 5/2017 | Rueblinger et al. |
| 2017/0124396 A1 | 5/2017 | Todeschini et al. |
| 2017/0124687 A1 | 5/2017 | McCloskey et al. |
| 2017/0126873 A1 | 5/2017 | McGary et al. |
| 2017/0126904 A1 | 5/2017 | d'Armancourt et al. |
| 2017/0132806 A1 | 5/2017 | Balachandreswaran |
| 2017/0139012 A1 | 5/2017 | Smith |
| 2017/0139213 A1 | 5/2017 | Schmidtlin |
| 2017/0140329 A1 | 5/2017 | Bernhardt et al. |
| 2017/0140731 A1 | 5/2017 | Smith |
| 2017/0147847 A1 | 5/2017 | Berggren et al. |
| 2017/0148250 A1 | 5/2017 | Angermayer |
| 2017/0150124 A1 | 5/2017 | Thuries |
| 2017/0018294 A1 | 6/2017 | Hardy et al. |
| 2017/0169198 A1 | 6/2017 | Nichols |
| 2017/0171035 A1 | 6/2017 | Lu et al. |
| 2017/0171703 A1 | 6/2017 | Maheswaranathan |
| 2017/0171803 A1 | 6/2017 | Maheswaranathan |
| 2017/0180359 A1 | 6/2017 | Wolski et al. |
| 2017/0180577 A1 | 6/2017 | Nguon et al. |
| 2017/0181299 A1 | 6/2017 | Shi et al. |
| 2017/0190192 A1 | 7/2017 | Delario et al. |
| 2017/0193432 A1 | 7/2017 | Bernhardt |
| 2017/0193461 A1 | 7/2017 | Jonas et al. |
| 2017/0193727 A1 | 7/2017 | Van Horn et al. |
| 2017/0200108 A1 | 7/2017 | Au et al. |
| 2017/0200275 A1 | 7/2017 | McCloskey et al. |
| 2017/0200296 A1 | 7/2017 | Jones et al. |
| 2017/0309108 A1 | 10/2017 | Sadovsky et al. |
| 2017/0336870 A1 | 11/2017 | Everett et al. |
| 2018/0018627 A1 | 1/2018 | Ross |

FOREIGN PATENT DOCUMENTS

| | | |
|---|---|---|
| DE | 3335760 A1 | 4/1985 |
| DE | 10210813 A1 | 10/2003 |
| DE | 102007037282 A1 | 3/2008 |
| EP | 1111435 A2 | 6/2001 |
| EP | 1443312 A1 | 8/2004 |
| EP | 1112483 B1 | 5/2006 |
| EP | 1232480 B1 | 5/2006 |
| EP | 2013117 A1 | 1/2009 |
| EP | 2216634 A1 | 8/2010 |
| EP | 2286932 A2 | 2/2011 |
| EP | 2372648 A2 | 10/2011 |
| EP | 2381421 A2 | 10/2011 |
| EP | 2533009 A1 | 12/2012 |
| EP | 2562715 A1 | 2/2013 |
| EP | 2722656 A1 | 4/2014 |
| EP | 2779027 A1 | 9/2014 |
| EP | 2833323 A2 | 2/2015 |
| EP | 2843590 A2 | 3/2015 |
| EP | 2845170 A1 | 3/2015 |
| EP | 2966595 A1 | 1/2016 |
| EP | 3006893 A1 | 3/2016 |
| EP | 3012601 A1 | 3/2016 |
| EP | 3007096 A1 | 4/2016 |
| EP | 3270342 A1 | 1/2018 |
| GB | 2503978 A1 | 1/2014 |
| GB | 2525053 A | 10/2015 |
| GB | 2531928 A | 5/2016 |
| JP | H04129902 A | 4/1992 |
| JP | 200696457 A | 4/2006 |
| JP | 2007084162 A | 4/2007 |
| JP | 2008210276 A | 9/2008 |
| JP | 2014210646 A | 11/2014 |
| JP | 2015174705 A | 10/2015 |
| KR | 20100020115 A | 2/2010 |
| KR | 20110013200 A | 2/2011 |
| KR | 20110117020 A | 10/2011 |
| KR | 20120028109 A | 3/2012 |
| WO | 96/40452 A1 | 12/1996 |
| WO | 0077726 A1 | 12/2000 |
| WO | 0114836 A1 | 3/2001 |
| WO | 2006095110 A1 | 9/2006 |
| WO | 2007015059 A1 | 2/2007 |
| WO | 200712554 A1 | 11/2007 |
| WO | 2011017241 A1 | 2/2011 |
| WO | 2012175731 A1 | 12/2012 |
| WO | 2013021157 A1 | 2/2013 |
| WO | 2013033442 A1 | 3/2013 |
| WO | 2013163789 A1 | 11/2013 |
| WO | 2013166368 A1 | 11/2013 |
| WO | 20130184340 A1 | 12/2013 |
| WO | 2014023697 A1 | 2/2014 |
| WO | 2014102341 A1 | 7/2014 |
| WO | 2014149702 A1 | 9/2014 |
| WO | 2014151746 A1 | 9/2014 |
| WO | 2015006865 A1 | 1/2015 |
| WO | 2016020038 A1 | 2/2016 |
| WO | 2016061699 | 4/2016 |
| WO | 2016061699 A1 | 4/2016 |
| WO | 2016085682 A1 | 6/2016 |

OTHER PUBLICATIONS

European Extended Search Report in related EP Application 17205030.4, dated Mar. 22, 2018, 8 pages.

European Exam Report in related EP Application 16172995.9, dated Mar. 15, 2018, 7 pages (Only new art cited herein).

United Kingdom Combined Search and Examination Report dated Mar. 21, 2018, 5 pages (Art has been previously cited).

European extended Search Report in related Application No. 17207882.6 dated Apr. 26, 2018, 10 pages.

Ulusoy, Ali Osman et al.; "One-Shot Scanning using De Bruijn Spaced Grids", Brown University; 2009 IEEE 12th International Conference on Computer Vision Workshops, ICCV Workshops, pp. 1786-1792 [Cited in EPO Search Report dated Dec. 5, 2017}.

Extended European Search report in related EP Application No. 17189496.7 dated Dec. 5, 2017; 9 pages.

(56) References Cited

OTHER PUBLICATIONS

Extended European Search report in related EP Application No. 17190323.0 dated Jan. 19, 2018; 6 pages [Only new art cited herein].
Examination Report in related GB Application No. GB1517843.7, dated Jan. 19, 2018, 4 pages [Only new art cited herein].
Examination Report in related EP Application No. 15190315, dated Jan. 26, 2018, 6 pages [Only new art cited herein].
United Kingdom Further Exam Report in related application GB1607394.2 dated Oct. 5, 2018; 5 pages {Only new art cited here in].
European Extended Search Report in related EP application 18184864.9, dated Oct. 30, 2018, 7 pages.
United Kingdom Further Examination Report in related GB Patent Application No. 1517842.9 dated Jul. 26, 2018; 5 pages [Cited art has been previously cited in this matter].
United Kingdom Further Examination Report in related GB Patent Application No. 1517112.7 dated Jul. 17, 2018; 4 pages [No art cited].
United Kingdom Further Examination Report in related GB Patent Application No. 1620676.5 dated Jul. 17, 2018; 4 pages [No art cited].
Padzensky, Ron; "Augmera; Gesture Control", Dated Apr. 18, 2015, 15 pages [Examiner Cited Art in Office Action dated Jan. 20, 2017 in related Application.].
Grabowski, Ralph; "New Commands in AutoCADS 2010: Part 11 Smoothing 3D Mesh Objects" Dated 2011 (per examiner who cited reference), 6 pages, [Examiner Cited Art in Office Action dated Jan. 20, 2017 in related Application.].
Theodoropoulos, Gabriel; "Using Gesture Recognizers to Handle Pinch, Rotate, Pan, Swipe, and Tap Gestures" dated Aug. 25, 2014, 34 pages, [Examiner Cited Art in Office Action dated Jan. 20, 2017 in related Application.].
Boavida et al., "Dam monitoring using combined terrestrial imaging systems", 2009 Civil Engineering Survey Dec./Jan. 2009, pp. 33-38 {Cited in Notice of Allowance dated Sep. 15, 2017 in related matter}.
Ralph Grabowski, "Smothing 3D Mesh Objects," New Commands in AutoCAD 2010: Part 11, Examiner Cited art in related matter Non Final Office Action dated May 19, 2017; 6 pages.
Wikipedia, "Microlens", Downloaded from https://en.wikipedia.org/wiki/Microlens, pp. 3. {Feb. 9, 2017 Final Office Action in related matter}.
Fukaya et al., "Characteristics of Speckle Random Pattern and Its Applications", pp. 317-327, Nouv. Rev. Optique, t.6, n.6. (1975) {Feb. 9, 2017 Final Office Action in related matter: downloaded Mar. 2, 2017 from http://iopscience.iop.org}.
Thorlabs, Examiner Cited NPL in Advisory Action dated Apr. 12, 2017 in related commonly owned application, downloaded from https://www.thorlabs.com/newgrouppage9.cfm?objectgroup_id=6430, 4 pages.
Eksma Optics, Examiner Cited NPL in Advisory Action dated Apr. 12, 2017 in related commonly owned application, downloaded from http://eksmaoptics.com/optical-systems/f-theta-lenses/f-theta-lens-for-1064-nm/, 2 pages.
Sill Optics, Examiner Cited NPL in Advisory Action dated Apr. 12, 2017 in related commonly owned application, http://www.silloptics.de/1/products/sill-encyclopedia/laser-optics/f-theta-lenses/, 4 pages.
European Extended Search Report in related EP Application No. 16190017.0, dated Jan. 4, 2017, 6 pages.
European Extended Search Report in related EP Application No. 16173429.8, dated Dec. 1, 2016, 8 pages [US 2013/0038881 cited on separate IDS filed concurrently herewith].
Extended European Search Report in related EP Application No. 16175410.0, dated Dec. 13, 2016, 5 pages.
European extended search report in related EP Application 16190833.0, dated Mar. 9, 2017, 8 pages [US Publication 2014/0034731 cited on separate IDS filed concurrently herewith].
United Kingdom Combined Search and Examination Report in related Application No. GB1620676.5, dated Mar. 8, 2017, 6 pages [References cited on separate IDS filed concurrently herewith; WO2014/151746, WO2012/175731, US 2014/0313527, GB2503978].
European Exam Report in related , EP Application No. 16168216.6, dated Feb. 27, 2017, 5 pages, [cited on separate IDS filed concurrently herewith; WO2011/017241 and US 2014/0104413].
EP Search Report in related EP Application No. 17171844 dated Sep. 18, 2017. 4 pages [Only new art cited herein; some art has been cited on separate IDS filed concurrently herewith}.
EP Extended Search Report in related EP Applicaton No. 17174843.7 dated Oct. 17, 2017, 5 pages {Only new art cited herein; some art has been cited on separate IDS filed concurrently herewith}.
UK Further Exam Report in related UK Application No. GB1517842.9, dated Sep. 1, 2017, 5 pages (only new art cited herein; some art cited on separate IDS filed concurrently herewith).
European Exam Report in related EP Application No. 15176943.7, dated Apr. 12, 2017, 6 pages [Art cited on separate IDS filed concurrently herewith].
European Exam Report in related EP Application No. 15188440.0, dated Apr. 21, 2017, 4 pages [Art has been cited on separate IDS filed concurrently herewith.].
European Examination report in related EP Application No. 14181437.6, dated Feb. 8, 2017, 5 pages [References cited on separate IDS filed concurrently herewith].
Chinese Notice of Reexamination in related Chinese Application 201520810313.3, dated Mar. 14, 2017, English Computer Translation provided, 7 pages [References cited on separate IDS filed concurrently herewith].
Extended European search report in related EP Application 16199707.7, dated Apr. 10, 2017, 15 pages.
Ulusoy et al., One-Shot Scanning using De Bruijn Spaced Grids, 2009 IEEE 12th International Conference on Computer Vision Workshops, ICCV Workshops, 7 pages [Cited in EP Extended search report dated Apr. 10, 2017; NPL 14].
European Exam Report in related EP Application No. 16152477.2, dated Jun. 20, 2017, 4 pages [References cited on separate IDS filed concurrently herewith].
European Exam Report in related EP Applciation 16172995.9, dated Jul. 6, 2017, 9 pages [References cited on separate IDS filed concurrently herewith].
United Kingdom Search Report in related Application No. GB1700338.5, dated Jun. 30, 2017, 5 pages.
European Search Report in related EP Application No. 17175357.7, dated Aug. 17, 2017, pp. 1-7 [References cited on separate IDS filed concurrently herewith].
EP Search Report in related EP Application No. 17171844 dated Sep. 18, 2017. 4 pages [Only new art cited herein}.
EP Extended Search Report in related EP Applicaton No. 17174843.7 dated Oct. 17, 2017, 5 pages {Only new art cited herein}.
UK Further Exam Report in related UK Application No. GB1517842.9, dated Sep. 1, 2017, 5 pages (only new art cited herein).
Office Action in counterpart European Application No. 13186043.9 dated Sep. 30, 2015, pp. 1-7.
Lloyd et al., "System for Monitoring the Condition of Packages Throughout Transit", U.S. Appl. No. 14/865,575, filed Sep. 25, 2015, 59 pages, not yet published.
McCloskey et al., "Image Transformation for Indicia Reading," U.S. Appl. No. 14/928,032, filed Oct. 30, 2015, 48 pages, not yet published.
Great Britain Combined Search and Examination Report in related Application GB1517842.9, dated Apr. 8, 2016, 8 pages.
Search Report in counterpart European Application No. 15182675.7, dated Dec. 4, 2015, 10 pages.
Wikipedia, "3D projection" Downloaded on Nov. 25, 2015 from www.wikipedia.com, 4 pages.
M.Zahid Gurbuz, Selim Akyokus, Ibrahim Emiroglu, Aysun Guran, An Efficient Algorithm for 3D Rectangular Box Packing, 2009, Applied Automatic Systems: Proceedings of Selected AAS 2009 Papers, pp. 131-134.
European Extended Search Report in Related EP Application No. 16172995.9, dated Aug. 22, 2016, 11 pages.
European Extended search report in related EP Application No. 15190306.9, dated Sep. 9, 2016, 15 pages.

(56) References Cited

OTHER PUBLICATIONS

Collings et al., "The Applications and Technology of Phase-Only Liquid Crystal on Silicon Devices", Journal of Display Technology, IEEE Service Center, New, York, NY, US, vol. 7, No. 3, Mar. 1, 2011 (Mar. 1, 2011), pp. 112-119.
European extended Search report in related EP Application 13785171.3, dated Sep. 19, 2016, 8 pages.
El-Hakim et al., "Multicamera vision-based approach to flexible feature measurement for inspection and reverse engineering", published in Optical Engineering, Society of Photo-Optical Instrumentation Engineers, vol. 32, No. 9, Sep. 1, 1993, 15 pages.
El-Hakim et al., "A Knowledge-based Edge/Object Measurement Technique", Retrieved from the Internet: URL: https://www.researchgate.net/profile/Sabry_El-Hakim/publication/44075058_A_Knowledge_Based_EdgeObject_Measurement_Technique/links/00b4953b5faa7d3304000000.pdf [retrieved on Jul. 15, 2016] dated Jan. 1, 1993, 9 pages.
H. Sprague Ackley, "Automatic Mode Switching in a Volume Dimensioner", U.S. Appl. No. 15/182,636, filed Jun. 15, 2016, 53 pages, Not yet published.
Bosch Tool Corporation, "Operating/Safety Instruction for DLR 130", Dated Feb. 2, 2009, 36 pages.
European Search Report for related EP Application No. 16152477.2, dated May 24, 2016, 8 pages.
Mike Stensvold, "get the Most Out of Variable Aperture Lenses", published on www.OutdoorPhotogrpaher.com; dated Dec. 7, 2010; 4 pages, [As noted on search report retrieved from URL: http://www.outdoorphotographer.com/gear/lenses/get-the-most-out-ofvariable-aperture-lenses.html on Feb. 9, 2016].
Houle et al., "Vehical Positioning and Object Avoidance", U.S. Appl. No. 15/007,522 [not yet published], filed Jan. 27, 2016, 59 pages.
United Kingdom combined Search and Examination Report in related GB Application No. 1607394.2, dated Oct. 19, 2016, 7 pages.
European Search Report from related EP Application No. 16168216.6, dated Oct. 20, 2016, 8 pages.
Peter Clarke, Actuator Developer Claims Anti-Shake Breakthrough for Smartphone Cams, Electronic Engineering Times, p. 24, May 16, 2011. [Previously cited and copy provided in parent application].
Spiller, Jonathan; Object Localization Using Deformable Templates, Master's Dissertation, University of the Witwatersrand, Johannesburg, South Africa, 2007; 74 pages [Previously cited and copy provided in parent application].
Leotta, Matthew J.; Joseph L. Mundy; Predicting High Resolution Image Edges with a Generic, Adaptive, 3-D Vehicle Model; IEEE Conference on Computer Vision and Pattern Recognition, 2009; 8 pages. [Previously cited and copy provided in parent application].
European Search Report for application No. EP13186043 dated Feb. 26, 2014 (now EP2722656 (Apr. 23, 2014)): Total pages 7 [Previously cited and copy provided in parent application].
International Search Report for PCT/US2013/039438 (WO2013166368), dated Oct. 1, 2013, 7 pages [Previously cited and copy provided in parent application].
Lloyd, Ryan and Scott McCloskey, "Recognition of 3D Package Shapes for Singe Camera Metrology" IEEE Winter Conference on Applications of computer Visiona, IEEE, Mar. 24, 2014, pp. 99-106, {retrieved on Jun. 16, 2014}, Authors are employees of common Applicant [Previously cited and copy provided in parent application].
European Office Action for application EP 13186043, dated Jun. 12, 2014(now EP2722656 (Apr. 23, 2014)), Total of 6 pages [Previously cited and copy provided in parent application].
Zhang, Zhaoxiang; Tieniu Tan, Kaiqi Huang, Yunhong Wang; Three-Dimensional Deformable-Model-based Localization and Recognition of Road Vehicles; IEEE Transactions on Image Processing, vol. 21, No. 1, Jan. 2012, 13 pages. [Previously cited and copy provided in parent application].
U.S. Appl. No. 14/801,023, Tyler Doomenbal et al., filed Jul. 16, 2015, not published yet, Adjusting Dimensioning Results Using Augmented Reality, 39 pages [Previously cited and copy provided in parent application].
Wikipedia, YUV description and definition, downloaded from http://www.wikipeida.org/wiki/YUV on Jun. 29, 2012, 10 pages [Previously cited and copy provided in parent application].
YUV Pixel Format, downloaded from http://www.fource.org/yuv.php on Jun. 29, 2012; 13 pages. [Previously cited and copy provided in parent application].
YUV to RGB Conversion, downloaded from http://www.fource.org/fccyvrgb.php on Jun. 29, 2012; 5 pages [Previously cited and copy provided in parent application].
Benos et al., "Semi-Automatic Dimensioning with Imager of a Portable Device," U.S. Appl. No. 61/149,912, filed Feb. 4, 2009 (now expired), 56 pages. [Previously cited and copy provided in parent application].
Dimensional Weight—Wikipedia, the Free Encyclopedia, URL=http://en.wikipedia.org/wiki/Dimensional_weight, download date Aug. 1, 2008, 2 pages. [Previously cited and copy provided in parent application].
Dimensioning—Wikipedia, the Free Encyclopedia, URL=http://en.wikipedia.org/wiki/Dimensioning, download date Aug. 1, 2008, 1 page [Previously cited and copy provided in parent application].
European Patent Office Action for Application No. 14157971.4-1906, dated Jul. 16, 2014, 5 pages. [Previously cited and copy provided in parent application].
European Patent Search Report for Application No. 14157971.4-1906, dated Jun. 30, 2014, 6 pages. [Previously cited and copy provided in parent application].
Caulier, Yannick et al., "A New Type of Color-Coded Light Structures for an Adapted and Rapid Determination of Point Correspondences for 3D Reconstruction." Proc. of SPIE, vol. 8082 808232-3; 2011; 8 pages [Previously cited and copy provided in parent application].
Kazantsev, Aleksei et al. "Robust Pseudo-Random Coded Colored STructured Light Techniques for 3D Object Model Recovery"; ROSE 2008 IEEE International Workshop on Robotic and Sensors Environments (Oct. 17-18, 2008) , 6 pages [Previously cited and copy provided in parent application].
Mouaddib E. et al. "Recent Progress in Structured Light in order to Solve the Correspondence Problem in Stereo Vision" Proceedings of the 1997 IEEE International Conference on Robotics and Automation, Apr. 1997; 7 pages [Previously cited and copy provided in parent application].
Proesmans, Marc et al. "Active Acquisition of 3D Shape for Moving Objects" 0-7803-3258-X/96 1996 IEEE; 4 pages [Previously cited and copy provided in parent application].
Salvi, Joaquim et al. "Pattern Codification Strategies in Structured Light Systems" published in Pattern Recognition; The Journal of the Pattern Recognition Society, Received Mar. 6, 2003; Accepted Oct. 2, 2003; 23 pages [Previously cited and copy provided in parent application].
EP Search and Written Opinion Report in related matter EP Application No. 14181437.6, dated Mar. 26, 2015, 7 pages. [Previously cited and copy provided in parent application].
Hetzel, Gunter et al.; "3D Object Recognition from Range Images using Local Feature Histograms,", Proceedings 2OO1 IEEE Conference on Computer Vision and Pattern Recognition. CVPR 2001. Kauai, Hawaii, Dec. 8-14, 2001; pp. 394-399, XP010584149, ISBN: 978-0-7695-1272-3. [Previously cited and copy provided in parent application].
Second Chinese Office Action in related CN Application No. 201520810685.6, dated Mar. 22, 2016, 5 pages, no references. [Previously cited and copy provided in parent application].
European Search Report in related EP Application No. 15190315.0, dated Apr. 1, 2016, 7 pages [Previously cited and copy provided in parent application].
Second Chinese Office Action in related CN Application No. 2015220810562.2, dated Mar. 22, 2016, 5 pages. English Translation provided [No references] [Previously cited and copy provided in parent application].

(56) References Cited

OTHER PUBLICATIONS

European Search Report for related Application EP 15190249.1, dated Mar. 22, 2016, 7 pages. [Previously cited and copy provided in parent application].
Second Chinese Office Action in related CN Application No. 201520810313.3, dated Mar. 22, 2016, 5 pages. English Translation provided [No references].
U.S. Appl. No. 14/800,757, Eric Todeschini, filed Jul. 16, 2015, not published yet, Dimensioning and Imaging Items, 80 pages [Previously cited and copy provided in parent application].
U.S. Appl. No. 14/747,197, Serge Thuries et al., filed Jun. 23, 2015, not published yet, Optical Pattern Rojector; 33 pages [Previously cited and copy provided in parent application].
U.S. Appl. No. 14/747,490, Brian L. Jovanovski et al., filed Jun. 23, 2015, not published yet, Dual-Projector Three-Dimensional Scanner; 40 pages [Previously cited and copy provided in parent application].
Search Report and Opinion in related GB Application No. 1517112.7, dated Feb. 19, 2016, 6 pages [Previously cited and copy provided in parent application].
U.S. Appl. No. 14/793,149, H. Sprague Ackley, filed Jul. 7, 2015, not published yet, Mobile Dimensioner Apparatus for Use in Commerce; 57 pages [Previously cited and copy provided in parent application].
U.S. Appl. No. 14/740,373, H. Sprague Ackley et al., filed Jun. 16, 2015, not published yet, Calibrating a Volume Dimensioner; 63 pages [Previously cited and copy provided in parent application].
Intention to Grant in counterpart European Application No. 14157971.4 dated Apr. 14, 2015, pp. 1-8 [Previously cited and copy provided in parent application].
Decision to Grant in counterpart European Application No. 14157971.4 dated Aug. 6, 2015, pp. 1-2 [Previously cited and copy provided in parent application].
Leotta, Matthew, Generic, Deformable Models for 3-D Vehicle Surveillance, May 2010, Doctoral Dissertation, Brown University, Providence RI, 248 pages [Previously cited and copy provided in parent application].
Ward, Benjamin, Interactive 3D Reconstruction from Video, Aug. 2012, Doctoral Thesis, Univesity of Adelaide, Adelaide, South Australia, 157 pages [Previously cited and copy provided in parent application].
Hood, Frederick W.; William A. Hoff, Robert King, Evaluation of an Interactive Technique for Creating Site Models from Range Data, Apr. 27-May 1, 1997 Proceedings of the ANS 7th Topical Meeting on Robotics & Remote Systems, Augusta GA, 9 pages [Previously cited and copy provided in parent application].
Gupta, Alok; Range Image Segmentation for 3-D Objects Recognition, May 1988, Technical Reports (CIS), Paper 736, University of Pennsylvania Department of Computer and Information Science, retrieved from Http://repository.upenn.edu/cis_reports/736, Accessed May 31, 2015, 157 pages [Previously cited and copy provided in parent application].
Reisner-Kollmann,Irene; Anton L. Fuhrmann, Werner Purgathofer, Interactive Reconstruction of Industrial Sites Using Parametric Models, May 2010, Proceedings of the 26th Spring Conference of Computer Graphics SCCG "10, 8 pages [Previously cited and copy provided in parent application].
Drummond, Tom; Roberto Cipolla, Real-Time Visual Tracking of Complex Structures, Jul. 2002, IEEE Transactions on Pattern Analysis and Machine Intelligence, vol. 24, No. 7; 15 pages. [Previously cited and copy provided in parent application].
European Search Report for Related EP Application No. 15189214.8, dated Mar. 3, 2016, 9 pages [Previously cited and copy provided in parent application].
Santolaria et al. "A one-step intrinsic and extrinsic calibration method for laster line scanner operation in coordinate measuring machines", dated Apr. 1, 2009, Measurement Science and Technology, IOP, Bristol, GB, vol. 20, No. 4; 12 pages [Previously cited and copy provided in parent application].
Search Report and Opinion in Related EP Application 15176943.7, dated Jan. 8, 2016, 8 pages [Previously cited and copy provided in parent application].
European Search Report for related EP Application No. 15188440.0, dated Mar. 8, 2016, 8 pages. [Previously cited and copy provided in parent application].
United Kingdom Search Report in related application GB1517842.9, dated Apr. 8, 2016, 8 pages [Previously cited and copy provided in parent application].
Great Britain Search Report for related Application On. GB1517843.7, dated Feb. 23, 2016; 8 pages [Previously cited and copy provided in parent application].
Combined Search and Examination Report in related UK Application No. GB1900752.5 dated Feb. 1, 2019, pp. 1-5.
Examination Report in related UK Application No. GB1517842.9 dated Mar. 8, 2019, pp. 1-4.
Examination Report in related EP Application No. 13193181.8 dated Mar. 20, 2019, pp. 1-4.
First Office Action in related CN Application No. 201510860188.1 dated Jan. 18, 2019, pp. 1-14 [All references previously cited.].
Examination Report in related EP Application No. 13785171.3 dated Apr. 2, 2019, pp. 1-5.
Lowe David G., "Filling Parameterized Three-Dimensional Models to Images", IEEE Transaction on Pattern Analysis and Machine Intelligence, IEEE Computer Society, USA, vol. 13, No. 5, May 1, 1991, pp. 441-450.
Combined Search and Examination Report in related UK Application No. GB1817189.2 dated Nov. 14, 2018, pp. 1-4 [Reference previously cited].
Examination Report in related UK Application No. GB1517842.9 dated Dec. 21, 2018, pp. 1-7 [All references previously cited.].
Examination Report in European Application No. 16152477.2 dated Jun. 18, 2019, pp. 1-6.
Examination Report in European Application No. 17175357.7 dated Jun. 26, 2019, pp. 1-5.
Examination Report in European Application No. 19171976.4 dated Jun. 19, 2019, pp. 1-8.
Examination Report in GB Application No. 1607394.2 dated Jul. 5, 2019, pp. 1-4.

* cited by examiner

VOLUME DIMENSIONING SYSTEMS AND METHODS

CROSS-REFERENCE TO RELATED APPLICATION

The present application claims the benefit of U.S. patent application Ser. No. 13/464,799 for Volume Dimensioning Systems and Methods filed May 4, 2012 (and published Nov. 7, 2013 as U.S. Patent Publication No. 2013/0293539), now U.S. Pat. No. 9,779,546. Each of the foregoing patent application, patent publication, and patent is hereby incorporated by reference in its entirety.

International Application No. PCT/US13/39438 for Volume Dimensioning Systems and Methods filed May 3, 2013 (and published Nov. 7, 2013 as WIPO Publication No. WO 2013/166368) also claims the benefit of U.S. patent application Ser. No. 13/464,799. Each of the foregoing patent application and patent publication is hereby incorporated by reference in its entirety.

FIELD

This disclosure generally relates to non-contact systems and methods for determining dimensions and volume of one or more objects.

BACKGROUND

Volume dimensioning systems are useful for providing dimensional and volumetric data related to three-dimensional objects disposed within the point of view of the volume dimensioning system. Such dimensional and volumetric information is useful for example, in providing users with accurate shipping rates based on the actual size and volume of the object being shipped. Additionally, the volume dimensioning system's ability to transmit parcel data immediately to a carrier can assist the carrier in selecting and scheduling appropriately sized vehicles based on measured cargo volume and dimensions. Finally, the ready availability of dimensional and volumetric information for all the objects within a carrier's network assists the carrier in ensuring optimal use of available space in the many different vehicles and containers used in local, interstate, and international commerce.

Automating the volume dimensioning process can speed parcel intake, improve the overall level of billing accuracy, and increase the efficiency of cargo handling. Unfortunately, parcels are not confined to a standard size or shape, and may, in fact, have virtually any size or shape. Additionally, parcels may also have specialized handling instructions such as a fragile side that must be protected during shipping or a side that must remain up throughout shipping. Automated systems may struggle with assigning accurate dimensions and volumes to irregularly shaped objects, with a single object that may be represented as a combination of two objects (e.g., a guitar) or with multiple objects that may be better represented as a single object (e.g., a pallet holding multiple boxes that will be shrink-wrapped for transit). Automated systems may also struggle with identifying a particular portion of an object as being "fragile" or a particular portion of an object that should remain "up" while in transit.

Providing users with the ability to identify and/or confirm the shape and/or numbers of either single objects or individual objects within a group or stack of objects and to identify the boundaries of irregularly shaped objects benefits the user in providing cartage rates that are proportionate to the actual size and/or volume of the parcel being shipped. Involving the user in providing accurate shape and/or volume data for a parcel or in providing an accurate outline of an irregularly shaped parcel also benefits the carrier by providing data that can be used in optimizing transport coordination and planning. Providing the user with the ability to designate one or more special handling instructions provides the user with a sense of security that the parcel will be handled in accordance with their wishes, that fragile objects will be protected, and that "up" sides will be maintained on the "top" of the parcel during transport. The special handling instructions also benefit the transporter by providing information that can be useful in load planning (ensuring, for example, "fragile" sides remain protected and "up" sides remain "up" in load planning) and in reducing liability for mishandled parcels that are damaged in transit.

SUMMARY

A method of operation of a volume dimensioning system may be summarized as including receiving image data of an area from a first point of view by at least one nontransitory processor-readable medium from at least one image sensor, the area including at least a first three-dimensional object to be dimensioned; determining from the received image data a number of features in three dimensions of the first three-dimensional object by at least one processor communicatively coupled to the at least one nontransitory processor-readable medium; based at least on part on the determined features of the first three-dimensional object, fitting a first three-dimensional packaging wireframe model about the first three-dimensional object by the at least one processor; and causing a displaying of an image of the first three-dimensional packaging wireframe model fitted about an image of the first three-dimensional object on a display on which the image of the first three-dimensional object is displayed.

The method may further include receiving at least one user input via a user interface, the user input indicative of a change in a position of at least a portion of the displayed image of the first three-dimensional packaging wireframe model relative to the displayed image of the first three-dimensional object; and causing a displaying of an updated image of the first three-dimensional packaging wireframe model fitted about the image of the first three-dimensional object on the display. The method may further include receiving at least one user input via a user interface, the user input indicative of a change in a position of at least a portion of the displayed image of the three-dimensional packaging wireframe model relative to the displayed image of the first three-dimensional object; based at least in part on the received user input, fitting a second three-dimensional packaging wireframe model about the first three-dimensional object by the at least one processor, the second three-dimensional packaging wireframe model having a different geometrical shape than the first three-dimensional wireframe model; and causing a displaying of an image of the second three-dimensional packaging wireframe model fitted about the image of the first three-dimensional object on the display. The method may further include receiving at least one user input via a user interface, the user input indicative of an identification of a second three-dimensional object, the second three-dimensional object different from the first three-dimensional object; based at least in part on the received user input, fitting a second three-dimensional packaging wireframe model about the second three-dimensional object by the at least one processor, the second three-dimensional wireframe model; and causing a displaying of an image of the second three-dimensional packaging wireframe model fitted about the image of the second three-dimensional object on the display. The at least one processor may cause the concurrent displaying of the image of the first three-dimensional packaging wireframe model fitted about the image of the first three-dimensional object on the display and the image of the second three-dimensional packaging wireframe model fitted about the image of the second three-dimensional object on the display. The method may further include receiving at least one user input via a user interface, the user input indicative of an identification of at least one portion of the first three-dimensional object; based at least in part on the received user input, fitting one three-dimensional packaging wireframe model about a first portion of the first three-dimensional object by the at least one processor; based at least in part on the received user input, fitting one three-dimensional packaging wireframe model about a second portion of the first three-dimensional object by the at least one processor; and causing a concurrent displaying of an image of the three-dimensional wireframe models respectively fitted about the image of the first and the second portions of the first three-dimensional object on the display. The at least one processor may cause the displaying of the image of the first three-dimensional packaging wireframe model fitted about the image of the first three-dimensional object on the display to rotate about an axis. The method may further include receiving image data of the area from a second point of view by at least one nontransitory processor-readable medium from at least one image sensor, the second point of view different from the first point of view; determining from the received image data at least one additional feature in three dimensions of the first three-dimensional object by at least one processor; based on the determined features of the first three-dimensional object, at least one of adjusting the first three-dimensional packaging wireframe model or fitting a second three-dimensional packaging wireframe model about the first three-dimensional object by the at least one processor; and causing a displaying of an image of at least one of the adjusted first three-dimensional packaging wireframe model or the second three-dimensional packaging wireframe model fitted about the image of the first three-dimensional object on the display. Fitting a first three-dimensional packaging wireframe model about the first three-dimensional object by the at least one processor may include selecting from a number of defined geometric primitives that define respective volumes and sizing at least one dimension of the selected geometric primitive based on a corresponding dimension of the first three-dimensional object such that the first three-dimensional object is completely encompassed by the selected and sized geometric primitive. The method may further include producing a wireframe model of the first three-dimensional object; and causing a concurrently displaying of the wireframe model of the first three-dimensional object along with the three-dimensional packaging wireframe model. The method may further include receiving at least one user input via a user interface, the user input indicative of a geometric primitive of the first three-dimensional object; and selecting the first three-dimensional object from a plurality of three-dimensional objects represented in the image data by at least one processor, based at least in part on the user input indicative of the geometric primitive of the first three-dimensional object. Selecting the first three-dimensional object from a plurality of three-dimensional objects represented in the image data based at least in part on the user input indicative of the geometric primitive of the first three-dimensional object includes determining which of the three-dimensional objects has a geometric primitive that most closely matches the geometric primitive indicated by the received user input. The method may further include receiving at least one user input via a user interface, the user input indicative of an acceptance of the first three-dimensional packaging wireframe model; and performing at least a volumetric calculation using a number of dimensions of the selected three-dimensional packaging wireframe model. The method may further include receiving at least one user input via a user interface, the user input indicative of a rejection of the first three-dimensional packaging wireframe model; and in response to the received user input, fitting a second three-dimensional packaging wireframe model about the first three-dimensional object by the at least one processor, the second three-dimensional packaging wireframe model having a different geometric primitive than the first three-dimensional wireframe model; and causing a displaying of an image of the second three-dimensional packaging wireframe model fitted about the image of the first three-dimensional object on the display. The method may further include receiving at least one user input via a user interface, the user input indicative of a second three-dimensional packaging wireframe model, the second three-dimensional packaging wireframe model having a different geometric primitive than the first three-dimensional wireframe model; in response to the received user input, fitting the second three-dimensional packaging wireframe model about the first three-dimensional object by the at least one processor; and causing a displaying of an image of the second three-dimensional packaging wireframe model fitted about the image of the first three-dimensional object on the display by the at least one processor. The method may further include causing by the at least one processor a displaying of a plurality of user selectable icons, each corresponding to a respective one of a plurality of three-dimensional packaging wireframe model and selectable by a user to be fitted to the first three-dimensional object. The method may further include receiving at least one user input via a user interface, the user input indicative of a region of interest of the displayed image of the first three-dimensional object; and in response to the received user input, causing by the at least one processor a displaying of an enlarged image of a portion of the first three-dimensional object corresponding to the region of interest by the display. The method may further include causing by the at least one processor a displaying of a plurality of user selectable icons, each corresponding to a respective one of a plurality of three-dimensional packaging wireframe model and selectable by a user to be fitted to the first three-dimensional object. 19. The method of claim 1 wherein the volume dimensioning system comprises a computer having a first processor, a camera and the display, and the volume dimensioning system further comprises a volume dimensioning system having a second processor, the volume dimensioning system selectively detachably coupleable to the computer, and causing a displaying of an image of the first three-dimensional packaging wireframe model fitted about an image of the first three-dimensional object on a display on which the image of the first three-dimensional object is displayed includes the second processor causing the first processor to display the image of the first three-dimensional packaging wireframe model fitted about the image of the first three-dimensional object on the display of the first computer.

A volume dimensioning system may be summarized as including at least one image sensor communicably coupled to at least one nontransitory processor-readable medium; at least one processor communicably coupled to the at least one nontransitory processor-readable medium; a machine executable instruction set stored within at least one nontransitory processor-readable medium, that when executed by the at least one processor causes the at least one processor to: read image data from the at least one nontransitory processor-readable medium, the image data associated with a first point of view of an area sensed by the at least one image sensor, the area including at least a first three-dimensional object to be dimensioned; determine from the received image data a number of features in three dimensions of the first three-dimensional object; based at least on part on the determined features of the first three-dimensional object, fit a first three-dimensional packaging wireframe model about the first three-dimensional object; and cause a display of an image of the first three-dimensional packaging wireframe model fitted about an image of the first three-dimensional object on a display device.

The machine executable instruction set may further include instructions, that when executed by the at least one processor cause the at least one processor to: select from a number of defined geometric primitives that define respective volumes and sizing at least one dimension of the selected geometric primitive based on a corresponding dimension of the first three-dimensional object such that the first three-dimensional object is completely encompassed by the selected and sized geometric primitive; produce a wireframe model of the first three-dimensional object; and cause a concurrent display of the wireframe model of the first three-dimensional object along with the three-dimensional packaging wireframe model. The machine executable instruction set stored within at least one nontransitory processor-readable medium may further include instructions, that when executed by the at least one processor cause the at least one processor to: responsive to a user input received by the at least one processor, change a position of at least a portion of the displayed image of the first three-dimensional packaging wireframe model relative to the displayed image of the first three-dimensional object; and cause a display of an updated image of the first three-dimensional packaging wireframe model fitted about the image of the first three-dimensional object on the display device. The machine executable instruction set stored within at least one nontransitory processor-readable medium may further include instructions, that when executed by the at least one processor cause the at least one processor to: responsive to a user input received by the at least one processor, change a position of at least a portion of the displayed image of the three-dimensional packaging wireframe model relative to the displayed image of the first three-dimensional object; responsive to a user input received by the at least one processor, fit a second three-dimensional packaging wireframe model about the first three-dimensional object, the second three-dimensional packaging wireframe model having a different geometrical shape than the first three-dimensional wireframe model; and cause a display of an image of the second three-dimensional packaging wireframe model fitted about the image of the first three-dimensional object on the display device. The machine executable instruction set stored within at least one nontransitory processor-readable medium may further include instructions, that when executed by the at least one processor cause the at least one processor to: responsive to a user input received by the at least one processor, the user input indicative of an identification of a second three-dimensional object different from the first three-dimensional object, fit a second three-dimensional packaging wireframe model about the second three-dimensional object; and cause a display of an image of the second three-dimensional packaging wireframe model fitted about the image of the second three-dimensional object on the display. The machine executable instruction set stored within at least one nontransitory processor-readable medium may further include instructions, that when executed by the at least one processor cause the at least one processor to: responsive to a user input received by the at least one processor, the user input indicative of an identification of at least one portion of the first three-dimensional object, fit a three-dimensional packaging wireframe model about a first portion of the first three-dimensional object; responsive to a user input received by the at least one processor, the user input indicative of an identification of at least one portion of the first three-dimensional object, fit a three-dimensional packaging wireframe model about a second portion of the first three-dimensional object; and cause a display of an image of the three-dimensional wireframe models fitted about the image of the first and the second portions of the first three-dimensional object on the display device. The machine executable instruction set stored within at least one nontransitory processor-readable medium may further include instructions, that when executed by the at least one processor cause the at least one processor to: responsive to a user input received by the at least one processor, the user input indicative of a second three-dimensional packaging wireframe model having a different geometric primitive than the first three-dimensional wireframe model, fit the second three-dimensional packaging wireframe model about the first three-dimensional object by the at least one processor; and cause a display of an image of the second three-dimensional packaging wireframe model fitted about the image of the first three-dimensional object on the display. The machine executable instruction set stored within at least one nontransitory processor-readable medium may further include instructions, that when executed by the at least one processor cause the at least one processor to: cause a display of a plurality of user selectable icons on the display device, each user selectable icon corresponding to a respective one of a plurality of three-dimensional packaging wireframe models and selectable by a user to be fitted to the first three-dimensional object.

A method of operation of a volume dimensioning system may be summarized as including receiving image data of an area from a first point of view by at least one nontransitory processor-readable medium from at least one image sensor, the area including at least a first three-dimensional object to be dimensioned; determining from the received image data a number of features in three dimensions of the first three-dimensional object by at least one processor communicatively coupled to the at least one nontransitory processor-readable medium; based at least in part on the determined features of the first three-dimensional object, identifying a first portion and at least a second portion of the first three-dimensional object by the at least one processor; based on the determined features of the first three-dimensional object, fitting a first three-dimensional packaging wireframe model about the first portion of the first three-dimensional object by the at least one processor; based on the determined features of the first three-dimensional object, fitting a second three-dimensional packaging wireframe model about the second portion of the first three-dimensional object by the at least one processor; and causing a concurrent displaying of an image of the first and the second three-dimensional wireframe models respectively fitted about the image of the first and the second portions of the first three-dimensional object on the display.

The method may further include receiving at least one user input via a user interface, the user input indicative of a change in a position of at least a portion of the displayed image of at least one of the first three-dimensional packaging wireframe model or the second three-dimensional packaging wireframe model relative to the displayed image of the first and second portions of the first three-dimensional object, respectively; and causing a displaying of an updated image of the first and second three-dimensional packaging wireframe models fitted about the image of the first and second portions of the first three-dimensional object on the display. The method may further include receiving at least one user input via a user interface, the user input indicative of a change in a position of at least a portion of the displayed image of at least one of the first three-dimensional packaging wireframe model or the second three-dimensional packaging wireframe model relative to the displayed image of the first three-dimensional object; based at least in part on the received user input, fitting a replacement three-dimensional packaging wireframe model about at least one of the first or second portions of the first three-dimensional object by the at least one processor, the replacement three-dimensional packaging wireframe model having a different geometric primitive than the first or second three-dimensional wireframe model that it replaces; and causing a displaying of an image of at least the replacement three-dimensional packaging wireframe model fitted about the image of the first three-dimensional object on the display. The at least one processor may cause the displaying of the image of the first and the second three-dimensional packaging wireframe model fitted about the image of the first three-dimensional object on the display to rotate about an axis. The method may further include receiving image data of the area from a second point of view by at least one nontransitory processor-readable medium from at least one image sensor, the second point of view different from the first point of view; determining from the received image data at least one additional feature in three dimensions of the first three-dimensional object by at least one processor; based on the determined features of the first three-dimensional object, performing at least one of adjusting the first or second three-dimensional packaging wireframe model or fitting a third three-dimensional packaging wireframe model about at least a portion of the first three-dimensional object not discernible from the first point of view by the at least one processor; and causing a displaying of an image of at least one of the adjusted first or second three-dimensional packaging wireframe model or the first, second, and third three-dimensional packaging wireframe models fitted about the image of the first three-dimensional object on the display. Fitting a first three-dimensional packaging wireframe model about the first three-dimensional object by the at least one processor may include selecting the first three-dimensional packaging wireframe model from a number of defined geometric primitives that define respective volumes and sizing at least one dimension of the selected geometric primitive based on a corresponding dimension of the first portion of the first three-dimensional object such that the first portion of the first three-dimensional object is completely encompassed by the selected and sized geometric primitive; and wherein fitting a second three-dimensional packaging wireframe model about the second portion of the first three-dimensional object by the at least one processor may include selecting the second three-dimensional packaging wireframe model from the number of defined geometric primitives that define respective volumes and sizing at least one dimension of the selected geometric primitive based on a corresponding dimension of the second portion of the first three-dimensional object such that the second portion of the first three-dimensional object is completely encompassed by the selected and sized geometric primitive. The method may further include producing a wireframe model of the first three-dimensional object; and causing a concurrently displaying of the wireframe model of the first three-dimensional object along with the first and second three-dimensional packaging wireframe models by the display. The method may further include receiving at least one user input via a user interface, the user input indicative of a geometric primitive of at least the first portion or the second portion of the first three-dimensional object; and selecting the first three-dimensional object from a plurality of three-dimensional objects represented in the image data by at least one processor, based at least in part on the user input indicative of the geometric primitive of at least a portion of the first three-dimensional object. Selecting the first three-dimensional object from a plurality of three-dimensional objects represented in the image data by at least one processor, based at least in part on the user input indicative of the geometric primitive of at least a portion of the first three-dimensional object may include determining which of the three-dimensional objects contains a portion having a geometric primitive that most closely matches the geometric primitive indicated by the received user input. The method may further include receiving at least one user input via a user interface, the user input indicative of an acceptance of the first three-dimensional packaging wireframe model and the second three-dimensional packaging wireframe model; and performing at least a volumetric calculation using a number of dimensions of the selected first and second three-dimensional packaging wireframe models. The method may further include receiving at least one user input via a user interface, the user input indicative of a rejection of at least one of the first three-dimensional packaging wireframe model or the second three-dimensional packaging wireframe model; and in response to the received user input, fitting a replacement three-dimensional packaging wireframe model about the first or second portion of the first three-dimensional object by the at least one processor, the replacement three-dimensional packaging wireframe model having a different geometric primitive than the first or second three-dimensional wireframe model that it replaces; and causing a displaying of an image of the replacement three-dimensional packaging wireframe model fitted about at least a portion of the image of the first three-dimensional object on the display. The method may further include receiving at least one user input via a user interface, the user input indicative of a replacement three-dimensional packaging wireframe model, the replacement three-dimensional packaging wireframe model having a different geometric primitive than at least one of the first three-dimensional wireframe model and the second three-dimensional wireframe model; in response to the received user input, fitting the replacement three-dimensional packaging wireframe model about either the first or second portion of the first three-dimensional object by the at least one processor; and causing a displaying of an image of the replacement three-dimensional packaging wireframe model fitted about the image of the first three-dimensional object on the display by the at least one processor. The method may further include causing by the at least one processor a displaying of a plurality of user selectable options, each user selectable option corresponding to a respective one of a plurality of three-dimensional packaging wireframe model and selectable by a user to be fitted to either the first or second portion of the first three-dimensional object.

A volume dimensioning system may be summarized as including at least one image sensor communicably coupled to at least one nontransitory processor-readable medium; at least one processor communicably coupled to the at least one nontransitory processor-readable medium; and a machine executable instruction set stored within at least one nontransitory processor-readable medium, that when executed by the at least one processor causes the at least one processor to: read image data from the at least one nontransitory processor-readable medium, the image data associated with a first point of view of an area sensed by the at least one image sensor, the area including at least a first three-dimensional object to be dimensioned; determine from the received image data a number of features in three dimensions of the first three-dimensional object; based at least in part on the determined features of the first three-dimensional object, identify a first portion and at least a second portion of the first three-dimensional object; based on the determined features of the first three-dimensional object, fit a first three-dimensional packaging wireframe model about the first portion of the first three-dimensional object; based on the determined features of the first three-dimensional object, fit a second three-dimensional packaging wireframe model about the second portion of the first three-dimensional object; and cause a concurrent display of an image of the first and the second three-dimensional wireframe models fitted about the image of the first and the second portions of the first three-dimensional object.

The first three-dimensional wireframe model may be a first geometric primitive; and wherein the second three-dimensional wireframe model may be a second geometric primitive.

A method of operation of a volume dimensioning system may be summarized as including receiving image data of an area from a first point of view by at least one nontransitory processor-readable medium from at least one image sensor, the area including at least a first three-dimensional object to be dimensioned; determining that there are insufficient features in the image data to determine a three-dimensional volume occupied by the first three-dimensional object; in response to the determination, generating an output to change at least one of a relative position or orientation of at least one image sensor with respect to at least the first three-dimensional object to obtain image data from a second point of view, the second point of view different from the first point of view.

Generating an output to change at least one of a relative position or orientation of at least one image sensor with respect to at least the first three-dimensional object to obtain image data from a second point of view may include generating at least one output, including at least one of an audio output or a visual output that is perceivable by a user. The at least one output may indicate to the user a direction of movement to change at least one of a relative position or orientation of the at least one sensor with respect to the first three-dimensional object. The method may further include causing a displaying of an image of a two-dimensional packaging wireframe model fitted about a portion of an image of the first three-dimensional object on a display on which the image of the first three-dimensional object is displayed. The causing of the displaying of the image of the two-dimensional packaging wireframe model fitted about the portion of the image of the first three-dimensional object may occur before generating the output.

A volume dimensioning system may be summarized as including at least one image sensor communicably coupled to at least one nontransitory processor-readable medium; at least one processor communicably coupled to the at least one nontransitory processor-readable medium; and a machine executable instruction set stored within at least one nontransitory processor-readable medium, that when executed by the at least one processor causes the at least one processor to: read image data from the at least one nontransitory processor-readable medium, the image data associated with a first point of view of an area sensed by the at least one image sensor, the area including at least a first three-dimensional object to be dimensioned; determine from the received image data that there are an insufficient number of features in the image data to determine a three-dimensional volume occupied by the first three-dimensional object; responsive to the determination of an insufficient number of features in the image data, generate an output to change at least one of a relative position or orientation of at least one image sensor with respect to at least the first three-dimensional object to obtain image data from a second point of view, the second point of view different from the first point of view.

The machine executable instruction set may further include instructions that when executed by the at least one processor further cause the at least one processor to: generate at least one output, including at least one of an audio output or a visual output that is perceivable by a user. The at least one output may indicate to the user a direction of movement to change at least one of a relative position or orientation of the at least one sensor with respect to the first three-dimensional object.

A method of operation of a volume dimensioning system may be summarized as including receiving image data of an area from a first point of view by at least one nontransitory processor-readable medium from at least one image sensor, the area including at least a first three-dimensional object to be dimensioned; receiving at least one user input via a user interface communicably coupled to at least one processor, the user input indicative of at least a portion of the three-dimensional packaging wireframe model of the first three-dimensional object; in response to the received user input, fitting the user inputted three-dimensional packaging wireframe model to at least a portion of one or more edges of the first three-dimensional object by the at least one processor; and causing a displaying of an image of the user inputted three-dimensional packaging wireframe model fitted about the image of the first three-dimensional object on the display by the at least one processor.

The at least one processor may cause the displaying of the image of the first three-dimensional packaging wireframe model fitted about the image of the first three-dimensional object on the display to rotate about an axis. The method may further include receiving image data of the area from a second point of view by at least one nontransitory processor-readable medium from at least one image sensor, the second point of view different from the first point of view; determining from the received image data at least one additional feature in three dimensions of the first three-dimensional object by at least one processor; based on the determined features of the first three-dimensional object, performing at least one of adjusting the three-dimensional packaging wireframe model by accepting additional user input via the user interface communicably coupled to at least one processor, the additional user input indicative the first three-dimensional packaging wireframe model; and causing a displaying of an image of at least one of the adjusted first three-dimensional packaging wireframe model fitted about the image of the first three-dimensional object on the display. The method may further include receiving at least one user input via a user interface, the user input indicative of an acceptance of the first three-dimensional packaging wireframe model; and performing at least a volumetric calculation using a number of dimensions of the selected three-dimensional packaging wireframe model.

A method of operation of a volume dimensioning system may be summarized as including receiving image data of an area from a first point of view by at least one nontransitory processor-readable medium from at least one image sensor, the area including at least a first three-dimensional void to be dimensioned; determining from the received image data a number of features in three dimensions of the first three-dimensional void by at least one processor communicatively coupled to the at least one nontransitory processor-readable medium; based at least on part on the determined features of the first three-dimensional void, fitting a first three-dimensional receiving wireframe model within the first three-dimensional void by the at least one processor; and causing a displaying of an image of the first three-dimensional receiving wireframe model fitted within an image of the first three-dimensional void on a display on which the image of the first three-dimensional void is displayed.

The method may further include calculating by the at least one processor, at least one of an available receiving dimension and an available receiving volume encompassed by the first three-dimensional receiving wireframe model. The method may further include receiving by the at least one nontransitory processor-readable medium at least one of dimensional data and volume data for each of a plurality of three-dimensional objects, the dimensional data and volume data determined based upon a respective three-dimensional packaging wireframe model fitted to each of the plurality of three-dimensional objects and corresponding to at least one of the respective dimensions and volume of each of the plurality of three-dimensional objects; and determining by the at least one processor communicably coupled to the at least one nontransitory processor-readable medium based at least in part on at least one of the available receiving dimension and an available receiving volume encompassed by the first three-dimensional receiving wireframe model at least one of a position and an orientation of at least a portion of the plurality of three-dimensional objects within the first three-dimensional void; wherein at least one of the position and the orientation of at least a portion of the plurality of three-dimensional objects within the first three-dimensional void minimizes at least one of: at least one dimension occupied by at least a portion of the plurality of three-dimensional objects within the first three-dimensional void, or a volume occupied by at least a portion of the plurality of three-dimensional objects within the first three-dimensional void. The method may further include indicating at least one of the position and the orientation of each of the three-dimensional packaging wireframes associated with each of the plurality of three-dimensional objects within the first three-dimensional void on the display.

A volume dimensioning system may be summarized as including at least one image sensor communicably coupled to at least one nontransitory processor-readable medium; at least one processor communicably coupled to the at least one nontransitory processor-readable medium; and a machine executable instruction set stored within at least one nontransitory processor-readable medium, that when executed by the at least one processor causes the at least one processor to: read image data from the at least one nontransitory processor-readable medium, the image data associated with a first point of view of an area sensed by the at least one image sensor, the area including at least a first three-dimensional void to be dimensioned; determine from the received image data a number of features in three dimensions of the first three-dimensional void; based at least on part on the determined features of the first three-dimensional void, fit a first three-dimensional receiving wireframe model within the first three-dimensional void; and cause a display of an image of the first three-dimensional receiving wireframe model fitted within an image of the first three-dimensional void on the display device.

The machine executable instruction set may further include instructions, that when executed by the at least one processor further cause the at least one processor to: determine at least one of an available receiving dimension and an available receiving volume encompassed by the first three-dimensional receiving wireframe model; receive from the at least one nontransitory processor-readable medium at least one of dimensional data and volume data for each of a plurality of three-dimensional objects, the dimensional data and volume data determined based upon a respective three-dimensional packaging wireframe model fitted to each of the plurality of three-dimensional objects and corresponding to at least one of the respective dimensions and volume of each of the plurality of three-dimensional objects; and determine based at least in part on at least one of the available receiving dimension and the available receiving volume encompassed by the first three-dimensional receiving wireframe model at least one of a position and an orientation of at least a portion of the plurality of three-dimensional objects within the first three-dimensional void; wherein at least one of the position and the orientation of at least a portion of the plurality of three-dimensional objects within the first three-dimensional void minimizes at least one of: at least one dimension occupied by at least a portion of the plurality of three-dimensional objects within the first three-dimensional void, or a volume occupied by at least a portion of the plurality of three-dimensional objects within the first three-dimensional void.

A method of operation of a volume dimensioning system may be summarized as including receiving image data of an area from a first point of view by at least one nontransitory processor-readable medium from at least one image sensor, the area including at least a first three-dimensional object to be dimensioned; determining from the received image data a number of features in three dimensions of the first three-dimensional object by at least one processor communicatively coupled to the at least one nontransitory processor-readable medium; based at least on part on the determined features of the first three-dimensional object, fitting a first three-dimensional packaging wireframe model selected from a wireframe library stored within the at least one nontransitory processor-readable medium about the first three-dimensional object by the at least one processor; receiving at least one user input via a user interface, the user input indicative of a change in a position of at least a portion of the displayed image of the first three-dimensional packaging wireframe model relative to the displayed image of the first three-dimensional object; associating via the processor, a plurality of points differentiating the changed first three-dimensional packaging wireframe model from all existing wireframe models within the wireframe library, and the storing the changed first three-dimensional packaging wireframe model in the wireframe library; and reviewing via the processor, the wireframe model stored within the wireframe library and associated with the changed first three-dimensional packaging wireframe model for subsequent fitting about a new three-dimensional object based at least in part on the plurality of points differentiating the changed first three-dimensional packaging wireframe model from all existing wireframe models within the wireframe library.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

Figure 1A:
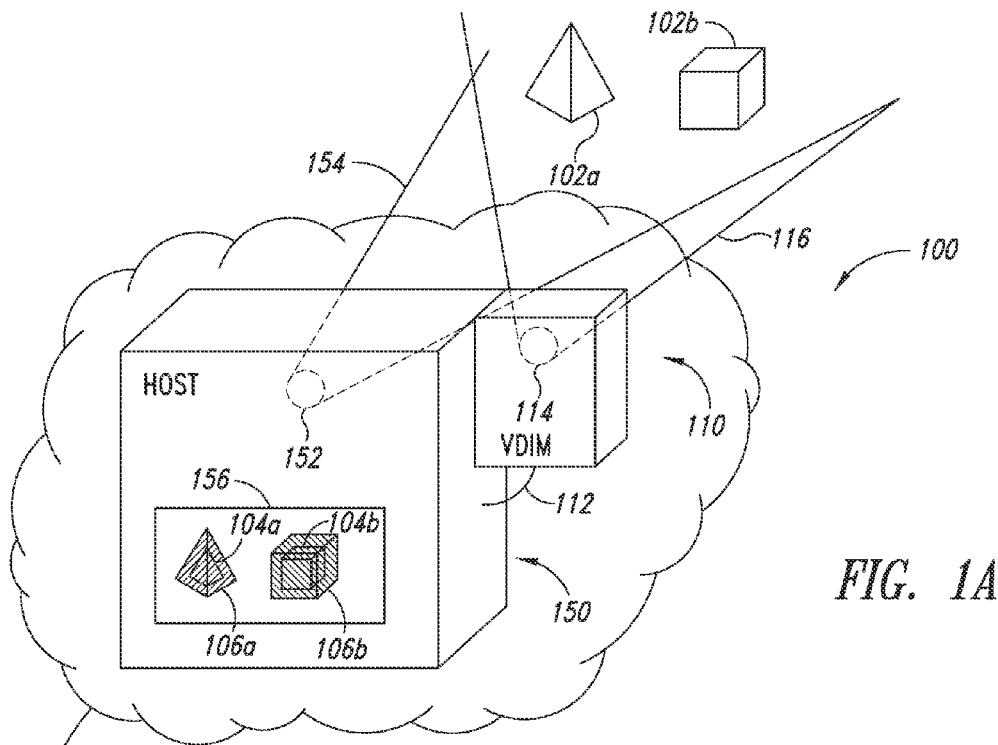
FIG. 1A is a schematic diagram of an example volume dimensioning system coupled to a host computer, with two three-dimensional objects disposed within the field-of-view of the host system camera and the field-of-view of the volume dimensioning system image sensor.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with sources of electromagnetic energy, operative details concerning image sensors and cameras and detailed architecture and operation of the host computer system have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Volume dimensioning systems provide dimensional and volumetric data for one or more three-dimensional objects located within a given point of view without requiring the laborious and time-consuming task of hand measuring and calculating the volume of each individual object. Volume dimensioning systems typically employ one or more image sensors to obtain or otherwise capture an image containing the one or more three-dimensional objects located within the field-of-view of the image sensor. Based on the shape, overall complexity, or surface contours of each of the three-dimensional objects, the volume dimensioning system can select one or more geometric primitives from a library to serve as a model of the three-dimensional object. A wireframe packaging model based, at least in part, on the selected one or more geometric primitives can then be scaled or fitted to encompass the image of each respective three-dimensional object. The scaled and fitted wireframe provides a packaging wireframe that includes sufficient t space about the three-dimensional to include an estimate of the packaging, blocking, padding, and wrapping used to ship the three-dimensional object. Thus, the three-dimensional packaging wireframe model generated by the system can be used to provide shipping data such as the dimensions and volume of not just the three-dimensional object itself, but also any additional packaging or boxing necessary to ship the three-dimensional object.

For example, a box shaped three-dimensional object may result in the selection of a single, cubic, geometric primitive by the volume dimensioning system as approximating the packaging of the actual three-dimensional object. The three-dimensional packaging wireframe model associated with a cubic geometric primitive can then be scaled and fitted to the image of the actual three-dimensional object within the volume dimensioning system to provide a model approximating the size and shape of the packaging of the actual three-dimensional object. From the virtual representation of the three-dimensional object provided by the three-dimensional packaging wireframe model, the length, width, height, and volume of the packaging can be determined by the volume dimensioning system.

In a more complex example, an obelisk shaped three-dimensional object may result in the selection of two geometric primitives by the volume dimensioning system, a rectangular prism representing the body of the obelisk and a four-sided pyramid representing the top of the obelisk. The three-dimensional packaging wireframe models associated with each of these geometric primitives can then be scaled and fitted to the image of the actual three-dimensional object within the volume dimensioning system to provide a model approximating the size, shape, and proportions of the actual, packaged, three-dimensional object. From the virtual representation of the three-dimensional object provided by the three-dimensional packaging wireframe model, the length, width, height, and volume of the packaged obelisk can be determined by the volume dimensioning system. By fitting one or more geometric primitives about three-dimensional objects having even highly complex surface features can be encompassed by the one or more relatively simple geometric primitives to provide a three-dimensional packaging wireframe model of the packaged three-dimensional object that includes allowances for packing, padding, bracing, and boxing of the three-dimensional object.

Advantageously, the volume dimensioning system can permit a user to identify special handling instructions, fragile surfaces, shipping orientation, and the like on the three-dimensional packaging wireframe model. Such handling instructions can then be associated with a given object and where the volume dimensioning system is used to perform load planning, objects can be positioned and oriented within the load plan in accordance with the handling instructions.

Additionally, the interactive nature of the volume dimensioning system can advantageously permit a user to enter, select, or modify the three-dimensional packaging wireframe model fitted to a particular three-dimensional object to more closely follow the actual outline, shape, contours, or surfaces of the object. In some instances, the system can "learn" new geometric primitives or wireframe models based on received user input, for example user input altering or modifying the three-dimensional packaging wireframe model fitted by the volume dimensioning system about three-dimensional objects having a characteristic size or shape.

FIG. 1A depicts an illustrative volume dimensioning system 110 physically and communicably coupled to a host computer 150 using one or more data busses 112. The volume dimensioning system 110 is equipped with an image sensor 114 having a field-of-view 116. The host computer 150 is equipped with a camera 152 having a field-of-view 154 and a display device 156.

Two three-dimensional objects, a pyramidal three-dimensional object 102a and a cubic three-dimensional object 102b (collectively 102) appear within the field-of-view 116 of the image sensor 114 and the field-of-view 154 of the camera 152. The three-dimensional objects 102 are depicted as surrounded by a scaled and fitted pyramidal geometric primitive 104a and a scaled and fitted cubic geometric primitive 104b (collectively 104) as displayed upon on the one or more display devices 156. Scaled, fitted, three-dimensional packaging wireframe models 106a, 106b (collectively 106) are depicted as encompassing the scaled and fitted geometric primitives 104a, 104b, respectively.

The scaled, fitted three-dimensional packaging wireframe models 106 may be generated by the host computer 150 or, more preferably by the volume dimensioning system 110.

The image on the display device 156 is a provided in part using the image data acquired by the camera 152 coupled to the host computer system 150 which provides the virtual representation of the three-dimensional objects 104, and in part using the scaled and fitted three-dimensional packaging wireframe models 106 provided by the volume dimensioning system 110. Data, including visible image data provided by the camera 152 and depth map data and intensity image data provided by the image sensor 114 is exchanged between the host computer 150 and the volume dimensioning system 110 via the one or more data busses 112. In some instances, the volume dimensioning system 110 and the host computer system 150 may be partially or completely incorporated within the same housing, for example a self service kiosk or a handheld computing device.

Figure 1B:
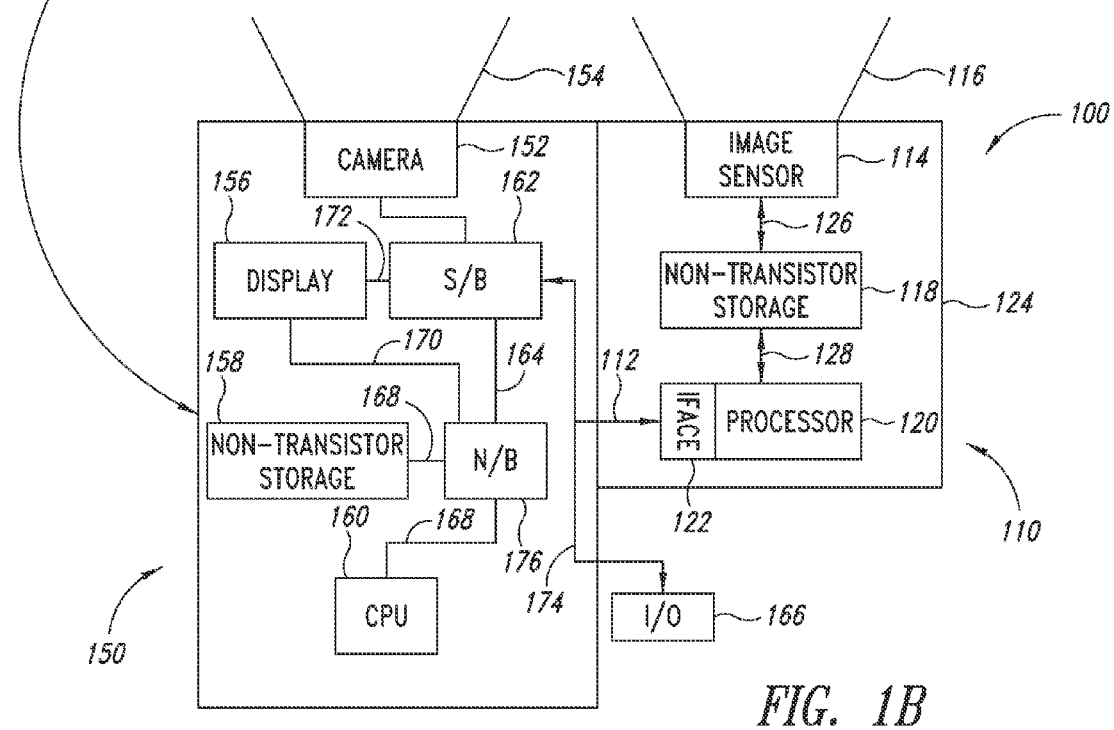
FIG. 1B is a block diagram of the example volume dimensioning system and host computer depicted in FIG. 1A.

FIG. 1B depicts an operational level block diagram of the volume dimensioning system 110 and the host computer 150. The volume dimensioning system 110 can include the image sensor 114 communicably coupled to one or more non-transitory, machine-readable storage media 118 and one or more processors 120 that are also communicably coupled to the one or more non-transitory, machine-readable storage media 118. The one or more processors 120 includes an interface 122 used to exchange data between the volume dimensioning system 110 and the host computer system 150 via the one or more data busses 112. The interface 122 can include an I/O controller, serial port, a parallel port, or a network suitable for receipt of the one or more data busses 112. In one preferred embodiment, the interface 122 can be an I/O controller having at least one universal serial bus ("USB") connector, and the one or more data busses 112 can be a USB cable. The volume dimensioning system 110 can be at least partially enclosed within a housing 124. In a preferred embodiment, the housing 124 can be detachably attached to the host computer system 150 using one or more attachment features on the exterior surface of the housing 124, the exterior surface of the host computer 150, or exterior surfaces of both the housing 124 and the host computer 150.

The host computer system 150 can include the camera 152 which is communicably coupled to a first bridge processor (e.g., a southbridge processor) 162 via one or more serial or parallel data buses, for example a universal serial bus ("USB"), a small computer serial interface ("SCSI") bus, a peripheral component interconnect ("PCI") bus, an integrated drive electronics ("IDE") bus or similar. One or more local busses 164 communicably couple the first bridge processor 162 to a second bridge processor (e.g., a northbridge processor) 176. The one or more non-transitory, machine-readable storage medium 158 and central processing units ("CPUs") 160 are communicably coupled to the second bridge processor 176 via one or more high-speed or high bandwidth busses 168. The one or more display devices 156 are coupled to the second bridge processor 176 via an interface 170 such as a Digital Visual Interface ("DVI") or a High Definition Multimedia Interface ("HDMI"). In some instances, for example where the one or more display devices 156 include at least one touch-screen display device capable of receiving user input to the host computer 150, some or all of the one or more display devices 156 may also be communicably coupled to the first bridge processor 162 via one or more USB interfaces 172.

The volume dimensioning system 110 is communicably coupled to the host computer 150 via one or more communication or data interfaces, for example one or more USB interfaces coupled to a USB bus 174 within the host computer. The USB bus 174 may also be shared with other peripheral devices, such as one or more I/O devices 166, for example one or more keyboards, pointers, touchpads, trackballs, or the like. The host computer 150 can be of any size, structure, or form factor, including, but not limited to a rack mounted kiosk system, a desktop computer, a laptop computer, a netbook computer, a handheld computer, or a tablet computer. Although for clarity and brevity one specific host computer architecture was presented in detail, those of ordinary skill in the art will appreciate that any host computer architecture may be used or substituted with equal effectiveness.

Referring now in detail to the volume dimensioning system 110, the image sensor 114 includes any number of devices, systems, or apparatuses suitable for obtaining three-dimensional image data from the scene within the field-of-view 116 of the image sensor 114. Although referred to herein as a "three-dimensional image data" it should be understood by one of ordinary skill in the art that the term may apply to more than one three-dimensional image and therefore would equally apply to "three-dimensional video images" which may be considered to comprise a series or time-lapse sequence including a plurality of "three-dimensional images." The three-dimensional image data acquired or captured by the image sensor 114 can include data collected using electromagnetic radiation either falling within the visible spectrum (e.g., wavelengths in the range of about 360 nm to about 750 nm) or falling outside of the visible spectrum (e.g., wavelengths below about 360 nm or above about 750 nm). For example, three-dimensional image data may be collected using infrared, near-infrared, ultraviolet, or near-ultraviolet light. The three-dimensional image data acquired or captured by the image sensor 114 can include data collected using laser or ultrasonic based imaging technology. In some embodiments, a visible, ultraviolet, or infrared supplemental lighting system (not shown) may be synchronized to and used in conjunction with the volume dimensioning system 100. For example, a supplemental lighting system providing one or more structured light patterns or a supplemental lighting system providing one or more gradient light patterns may be used to assist in acquiring, capturing, or deriving three-dimensional image data from the scene within the field-of-view 116 of the image sensor 114.

In a preferred embodiment, the image sensor 114 includes a single sensor capable of acquiring both depth data providing a three-dimensional depth map and intensity data providing an intensity image for objects within the field-of-view 116 of the image sensor 114. The acquisition of depth and intensity data using a single image sensor 114 advantageously eliminates parallax and provides a direct mapping between the depth map and the intensity image. The depth map and intensity image may be collected in an alternating sequence by the image sensor 114 and the resultant depth data and intensity data stored within the one or more non-transitory, machine-readable storage media 118.

The three-dimensional image data captured or acquired by the image sensor 114 may be in the form of an analog signal that is converted to digital data using one or more analog-to-digital ("A/D") converters (not shown) within the image sensor 114 or within the volume dimensioning system 110 prior to storage within the one or more non-transitory, machine-readable, storage media 118. Alternatively, the three-dimensional image data captured or acquired by the image sensor 114 may be in the form of one or more digital data groups, structures, or files comprising digital data supplied directly by the image sensor 114.

The image sensor 114 can be formed from or contain any number of image capture elements, for example picture elements or "pixels." For example, the image sensor 114 can have between 1,000,000 pixels (1 MP) and 100,000,000 pixels (100 MP). The image sensor 114 can include any number of current or future developed image sensing devices or systems, including, but not limited to, one or more complementary metal-oxide semiconductor ("CMOS") sensors or one or more charge-coupled device ("CCD") sensors.

In some embodiments, the three-dimensional image data captured by the image sensor 114 can include more than one type of data associated with or collected by each image capture element. For example, in some embodiments, the image sensor 114 may capture depth data related to a depth map of the three-dimensional objects within the point of view of the image sensor 114 and may also capture intensity data related to an intensity image of the three-dimensional objects in the field-of-view of the image sensor 114. Where the image sensor 114 captures or otherwise acquires more than one type of data, the data in the form of data groups, structures, files or the like may be captured either simultaneously or in an alternating sequence by the image sensor 114.

In some embodiments, the image sensor 114 may also provide visible image data capable of providing a visible black and white, grayscale, or color image of the three-dimensional objects 102 within the field-of-view 116 of the image sensor 114. Where the image sensor 114 is able to provide visible image data, the visible image data may be communicated to the host computer 150 for display on the one or more display devices 156. In some instances, where the image sensor 114 is able to provide visible image data, the host computer system camera 152 may be considered optional and may be eliminated.

Data is communicated from the image sensor 114 to the one or more non-transitory machine readable storage media 118 via one or more serial or parallel data busses 126. The one or more non-transitory, machine-readable storage media 118 can be any form of data storage device including, but not limited to, optical data storage, electrostatic data storage, electroresistive data storage, magnetic data storage, and molecular data storage. In some embodiments, all or a portion of the one or more non-transitory, machine-readable storage media 118 may be disposed within the one or more processors 120, for example in the form of a cache or similar non-transitory memory structure capable of storing data or machine-readable instructions executable by the one or more processors 120.

In at least some embodiments, the volume dimensioning system 110 including the image sensor 114, the communicably coupled one or more non-transitory, machine-readable storage media 118, and the communicably coupled one or more processors 120 are functionally combined to provide a system capable of selecting one or more geometric primitives 104 to virtually represent each of the one or more three-dimensional objects 102 appearing in the field-of-view 116 of the image sensor 114. Using the selected one or more geometric primitives 104, the system can then fit a three-dimensional packaging wireframe model 106 about each of the respective three-dimensional objects 102.

The one or more non-transitory, machine-readable storage media 118 can have any data storage capacity from about 1 megabyte (1 MB) to about 3 terabytes (3 TB). In some embodiments two or more devices or data structures may form all or a portion of the one or more non-transitory, machine-readable storage media 118. For example, in some embodiments, the one or more non-transitory, machine-readable storage media 118 can include an non-removable portion including a non-transitory, electrostatic, storage medium and a removable portion such as a Secure Digital (SD) card, a compact flash (CF) card, a Memory Stick, or a universal serial bus ("USB") storage device.

The one or more processors 120 can execute one or more instruction sets that are stored in whole or in part in the one or more non-transitory, machine-readable storage media 118. The machine executable instruction set can include instructions related to basic functional aspects of the one or more processors 120, for example data transmission and storage protocols, communication protocols, input/output ("I/O") protocols, USB protocols, and the like. Machine executable instruction sets related to all or a portion of the volume dimensioning functionality of the volume dimensioning system 110 and intended for execution by the one or more processors 120 may also be stored within the one or more non-transitory, machine-readable storage media 118, within the one or more processors 120, or within both the one or more non-transitory, machine-readable storage media 118 and the one or more processors 120. Additional volume dimensioning system 110 functionality may also be stored in the form of one or more machine executable instruction sets within the one or more non-transitory, machine-readable storage media 118. Such functionality may include system security settings, system configuration settings, language preferences, dimension and volume preferences, and the like.

The one or more non-transitory, machine-readable storage media 118 may also store a library containing a number of geometric primitives useful in the construction of three-dimensional packaging wireframe models by the one or more processors 120. As used herein, the term "geometric primitive" refers to a simple three-dimensional geometric shape such as a cube, cylinder, sphere, cone, pyramid, torus, prism, and the like that may be used individually or combined to provide a virtual representation of more complex three-dimensional geometric shapes or structures. The geometric primitives stored within the one or more non-transitory, machine-readable storage media 118 are selected by the one or more processors 120 as basic elements in the construction of a virtual representation 104 of each of the three-dimensional objects 102 appearing within the field-of-view 116 of the image sensor 114. The construction of the virtual representation 104 by the one or more processors 120 is useful in fitting properly scaled three-dimensional packaging wireframe models 106 to each of the three-dimensional objects 102 appearing in the field-of-view 116 of the image sensor 114. A properly scaled three-dimensional packaging wireframe model 106 permits the accurate determination of dimensional and volumetric data for each of the three-dimensional objects 102 appearing in the field-of-view 116 of the image sensor 114. A properly scaled and fitted three-dimensional packaging wireframe model 106 will fall on the boundaries of the geometric primitive 104 fitted to the three-dimensional object 102 by the one or more processors 120 as viewed on the one or more display devices 156 as depicted in FIG. 1A.

Data is transferred between the one or more non-transitory, machine-readable storage media 118 and the one or more processors 120 via one or more serial or parallel bi-directional data busses 128. The one or more processors 120 can include any device comprising one or more cores or independent central processing units that are capable of executing one or more machine executable instruction sets. The one or more processors 120 can, in some embodiments, include a general purpose processor such as a central processing unit ("CPU") including, but not limited to, an Intel® Atom® processor, an Intel® Pentium®, Celeron®, or Core 2® processor, and the like. In other embodiments the one or more processors 120 can include a system-on-chip ("SoC") architecture, including, but not limited to, the Intel® Atom® System on Chip ("Atom SoC") and the like. In other embodiments, the one or more processors 120 can include a dedicated processor such as an application specific integrated circuit ("ASIC"), a programmable gate array ("PGA" or "FPGA"), a digital signal processor ("DSP"), or a reduced instruction set computer ("RISC") based processor. Where the volume dimensioning system 110 is a battery-powered portable system, the one or more processors 120 can include one or more low power consumption processors, for example Intel® Pentium M®, or Celeron M® mobile system processors or the like, to extend the system battery life.

Data in the form of three-dimensional image data, three-dimensional packaging wireframe model data, instructions, input/output requests, and the like may be bi-directionally transferred from the volume dimensioning system 110 to the host computer 150 via the one or more data busses 112. Within the host computer 150, the three-dimensional packaging wireframe model 106 data can, for example, be combined with visual image data captured or acquired by the camera 152 to provide a display output including a visual image of one or more three-dimensional objects 102 appearing in both the camera 152 field-of-view 154 and the image sensor 114 field-of-view 116 encompassed by the geometric primitive 104 and the fitted three-dimensional packaging wireframe models 106 provided by the volume dimensioning system 110.

Referring now in detail to the host computer system 150, the camera 152 can acquire or capture visual image data of the scene within the field-of-view 154 of the camera 152. As a separate device that is discrete from the image sensor 114, the camera 152 will have a field-of-view 154 than differs from the image sensor 114 field-of-view 116. In at least some embodiments, the one or more CPUs 160, the one or more processors 120, or a combination of the one or more CPUs 160 and the one or more processors 120 will calibrate, align, map, or otherwise relate the field-of-view 154 of the camera 152 to the field-of-view 116 of the image sensor 114 thereby linking or spatially mapping in two-dimensional space or three-dimensional space the visual image data captured or acquired by the camera 152 to the three-dimensional image data captured or acquired by the image sensor 114. In a preferred embodiment, when the volume dimensioning system 110 is initially communicably coupled to the host computer 150, the one or more processors 120 in the volume dimensioning system 110 are used to calibrate, align, or spatially map in three-dimensions the field-of-view 116 of the image sensor 114 to the field-of-view 154 of the camera 152 such that three-dimensional objects 102 appearing in the field-of-view 116 of the image sensor 114 are spatially mapped or correlated in three-dimensions to the same three-dimensional objects 102 appearing in the field-of-view 154 of the camera 152.

The camera 152 can be formed from or contain any number of image capture elements, for example picture elements or "pixels." For example, the camera 152 may have between 1,000,000 pixels (1 MP) and 100,000,000 pixels (100 MP). In some embodiments, the camera 152 may capture or acquire more than one type of data, for example the camera 152 may acquire visual image data related to the visual image of the scene within the field-of-view 154 of the camera 152 as well as infrared image data related to an infrared image of the scene within the field-of-view 154 of the camera 152. Where the camera 152 captures or otherwise acquires more than one type of image data, the data may be collected into one or more data groups, structures, files, or the like.

In some embodiments, the visual image data captured or acquired by the camera 152 may originate as an analog signal that is converted to digital visual image data using one or more internal or external analog-to-digital ("A/D") converters (not shown). In other embodiments, the visual image data acquired by the camera 152 is acquired in the form of digital image data provided directly from one or more complementary metal-oxide semiconductor ("CMOS") sensors or one or more charge-coupled device ("CCD") sensors disposed at least partially within the camera 152. At least a portion of the visual image data from the camera 152 is stored in the one or more non-transitory, machine-readable storage media 158 in the form of one or more data groups, structures, or files.

Image data is transferred between the camera 152 and the one or more non-transitory, machine-readable storage media 158 via the first bridge processor 162, the second bridge processor 176, and one or more serial or parallel data buses 164, 168. The image data provided by the camera 152 can be stored within the one or more non-transitory, machine-readable storage media 158 in one or more data groups, structures, or files. The one or more non-transitory, machine-readable storage media 158 can have any data storage capacity from about 1 megabyte (1 MB) to about 3 terabytes (3 TB). In some embodiments two or more devices or data structures may form all or a portion of the one or more non-transitory, machine-readable storage media 158. For example, in some embodiments, the one or more non-transitory, machine-readable storage media 158 can include an non-removable portion including a non-transitory, electrostatic, storage medium and a removable portion such as a Secure Digital (SD) card, a compact flash (CF) card, a Memory Stick, or a universal serial bus ("USB") storage device.

Data is transferred between the one or more non-transitory, machine-readable storage media 158 and the one or more CPUs 160 via the second bridge processor 176 and one or more serial or parallel bi-directional data busses 168. The one or more CPUs 160 can include any device comprising one or more cores or independent central processing units that are capable of executing one or more machine executable instruction sets. The one or more CPUs 160 can, in some embodiments, include a general purpose processor including, but not limited to, an Intel® Atom® processor, an Intel® Pentium®, Celeron®, or Core 2® processor, and the like. In other embodiments the one or more CPUs 160 can include a system-on-chip ("SoC") architecture, including, but not limited to, the Intel® Atom® System on Chip ("Atom SoC") and the like. In other embodiments, the one or more CPUs 160 can include a dedicated processor such as an application specific integrated circuit ("ASIC"), a programmable gate array ("PGA" or "FPGA"), a digital signal processor ("DSP"), or a reduced instruction set computer ("RISC") based processor. Where the host computer 150 is a battery-powered portable system, the one or more CPUs 160 can include one or more low power consumption processors, for example Intel® Pentium M®, or Celeron M® mobile system processors or the like, to extend the system battery life.

Recall, the calibration or alignment process between the camera 152 and the image sensor 114 correlated, aligned, or spatially mapped the field-of-view 154 of the camera 152 with the field of view 116 of the image sensor 114 upon initial coupling of the volume dimensioning system 110 to the host computer 150. The image data captured or acquired by the camera 152 will therefore be spatially mapped, aligned, or correlated with the three-dimensional image data captured or acquired by the image sensor 114. Advantageously, the three-dimensional packaging wireframe models 106 fitted by the one or more processors 120 to the three-dimensional objects 102 in the field-of-view 116 of the image sensor 114 will align with the image of the three-dimensional objects 102 when viewed on the one or more display devices 156. Merging, overlaying, or otherwise combining the three-dimensional packaging wireframe models 106 provided by the one or more processors 120 with the image data captured or acquired by the camera 152 creates a display image on the one or more display devices 156 that contains both an image of the three-dimensional object 102 and the corresponding three-dimensional packaging wireframe model 106.

The host computer 150 may have one or more discrete graphical processing units (GPUs—not shown) or one or more GPUs integrated with the one or more CPUs 160. The one or more CPUs 160 or one or more GPUs can generate a display image output to provide a visible image on the one or more display devices 156. The display image output can be routed through the second bridge processors 176 to the one or more display devices 156 in the host computer system 150. The one or more display devices 156 include at least an output device capable of providing a visible image perceptible to the unaided human eye. In at least some embodiments, the one or more display devices 156 can include one or more input devices, for example a resistive or capacitive touch-screen. The one or more display devices 156 can include any current or future, analog or digital, two-dimensional or three-dimensional display technology, for example cathode ray tube ("CRT"), light emitting diode ("LED"), liquid crystal display ("LCD"), organic LED ("OLED"), digital light processing ("DLP"), eInk, and the like. In at least some embodiments, the one or more display devices 156 may be self-illuminating or provided with a backlight such as a white LED to facilitate use of the system 100 in low ambient light environments.

One or more peripheral I/O devices 166 may be communicably coupled to the host computer system 150 to facilitate the receipt of user input by the host computer 150 via a pointer, a keyboard, a touchpad, or the like. In at least some embodiments the one or more peripheral I/O devices 166 may be USB devices that are communicably coupled to the USB bus 174. In at least some embodiments, the one or more peripheral I/O devices 166 or the one or more display devices 156 may be used by the one or more processors 120 or one or more CPUs 160 to receive specialized shipping instructions associated with one or more three-dimensional objects 102 from a user. Such specialized instructions can include any data provided by the user that is relevant to how a particular three-dimensional object 102 should be handled, and can include, but is not limited to, designation of fragile areas, designation of proper shipping orientation, designation of top-load only or crushable contents, and the like. Upon receipt of the specialized shipping instructions, the one or more processors 120 or the one or more CPUs 160 can associate the instructions with a particular three-dimensional packaging wireframe model 106 which thereby links the instructions with a particular three-dimensional object 102.

Figure 2:
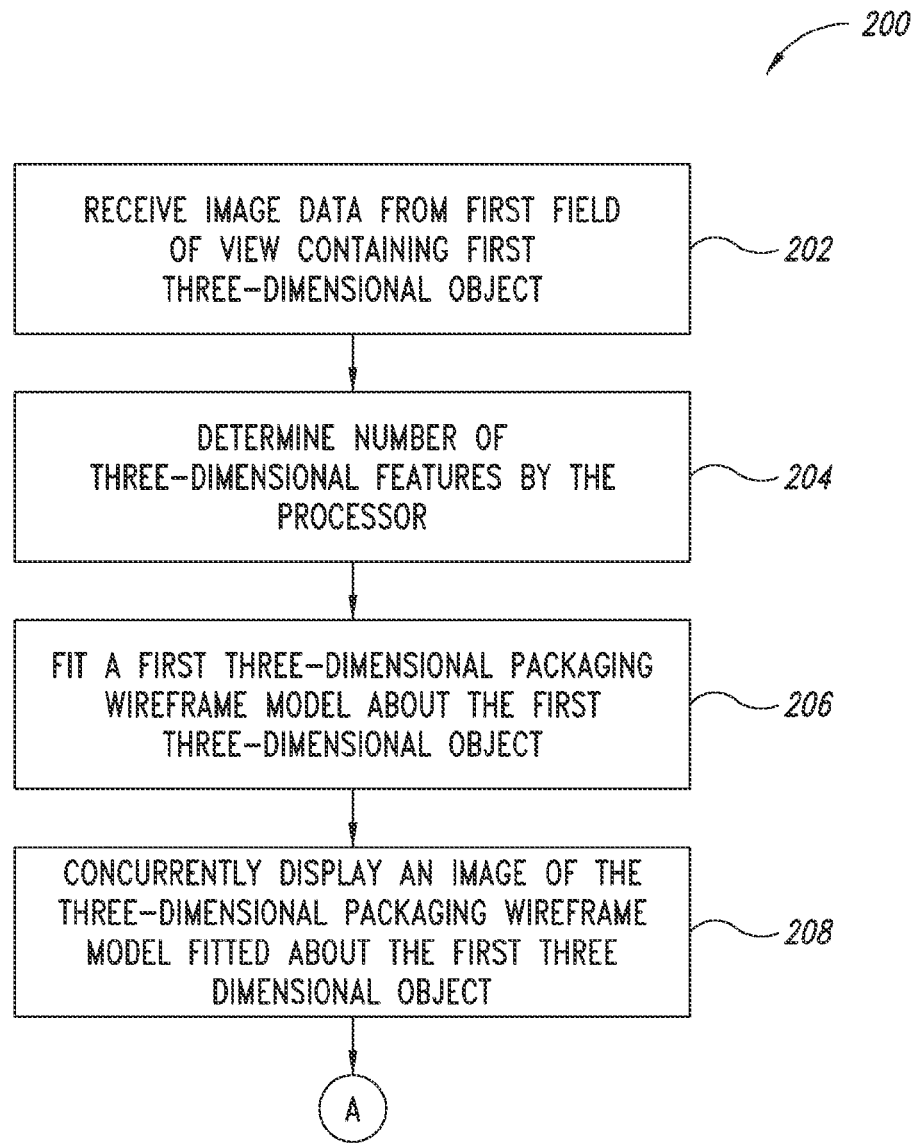
FIG. 2 is an example volume dimensioning method using a volume dimensioning system including an image sensor, a non-transitory, machine-readable storage, a processor, a camera, and a display device.

FIG. 2 shows a method 200 of operation of an example illustrative volume dimensioning system such as the system depicted in FIGS. 1A and 1B. Data captured or acquired by the image sensor 114 is used by the one or more processors 120 to select one or more geometric primitives 104, for example from a library in the one or more non-transitory, machine-readable storage media 118. The one or more geometric primitives 104 selected by the one or more processors 120 are used to construct a virtual representation of the packaging about the one or more three-dimensional objects 102 appearing in the field-of-view 116 of the image sensor 114. The one or more processors 120 can therefore use the one or more selected geometric primitives 104 to construct a three-dimensional packaging wireframe model 106 that, when fitted to the three-dimensional object 102, provides a three-dimensional packaging wireframe model 106 that is scaled and fitted to encompass or otherwise contain the three-dimensional object 102.

The one or more processors 120 can use the plurality of features identified on the three-dimensional object 102 in selecting the one or more geometric primitives 104 from the library. The three-dimensional packaging wireframes 106 encompassing each three-dimensional object 102 within the volume dimensioning system 110 permit a reasonably accurate determination of the dimensions and volume of each three-dimensional object 102. The user benefits from accurate dimensional and volumetric information by receiving accurate shipping rates based on the object's true size and volume. Carriers benefit from accurate dimensional and volumetric information by having access to data needed to optimize the packing of the objects for transport and the subsequent routing of transportation assets based upon reasonably accurate load data.

At 202, the image sensor 114 captures or acquires three-dimensional image data which is communicated to the one or more non-transitory, machine-readable storage media 118 via one or more data busses 126. The three-dimensional image data captured by the image sensor 114 includes a first three-dimensional object 102 disposed within the field-of-view 116 of the image sensor 114. The three-dimensional image data captured by the image sensor 114 may include depth data providing a depth map and intensity data providing an intensity image of the field-of-view 116 of the image sensor 114. At least a portion of the three-dimensional image data received by the one or more non-transitory, machine-readable storage media 118 is communicated to or otherwise accessed by the one or more processors 120 in order to select one or more geometric primitives 104 preparatory to fitting a first three-dimensional packaging wireframe model 106 about all or a portion of the first three-dimensional object 102.

At 204, based in whole or in part on the three-dimensional image data received from the image sensor 114, the one or more processors 120 determine a number of features on the first three-dimensional object 102 contained in the three-dimensional image data. The features may include any point, edge, or other discernible structure on the first three-dimensional object 102 and detectable in the image represented by the three-dimensional image data. For example, one or more features may correspond to a three-dimensional point on the three-dimensional object 102 that is detectable in a depth map containing the first three-dimensional object, an intensity image in which the three-dimensional object, or both a depth map and an intensity image in which the first three-dimensional object 102 appears as is represented. The identified features may include boundaries or defining edges of the first three-dimensional object, for example corners, arcs, lines, edges, angles, radii, and similar characteristics that define all or a portion of the external boundary of the first three-dimensional object 102.

At 206, based at least in part on the features identified in 204 the one or more processors 120 selects one or more geometric primitives 104 from the library. The one or more processors 120 use the selected one or more geometric primitives 104 to roughly represent the packaging encompassing first three-dimensional object 102 making allowances for any specialized packing instructions (e.g., fragile surfaces, extra packing, unusual packing shapes, etc.) that may have been provided by the user. The one or more processors 120 fit a three-dimensional packaging wireframe model 106 about all or a portion of the first three-dimensional object 102 that encompasses substantially all of the processor identified features defining an external boundary of the first three-dimensional object 102 and reflecting any specialized packing instructions provided by the user.

For example, where the first three-dimensional object 102 is a cube, the one or more processors 120 may identify seven or more features (e.g., four defining the corners of one face of the cube, two additional defining the corners of a second face of the cube and one defining the fourth corner of the top of the cube). The user may have identified one surface of the cube as requiring "extra packaging." Based on these identified features and the user's specialized packing instructions, the one or more processors 120 may select a rectangular prismatic geometric primitive 104 accommodating the cubic three-dimensional object 102 and the extra packaging requirements identified by the user and use the selected rectangular prismatic geometric primitive 104 to fit a first three-dimensional packaging wireframe model 106 that substantially encompasses the cubic first three-dimensional object 102 and the associated packaging surrounding the object.

In another example, the first three-dimensional object 102 may be a cylinder and the one or more processors 120 may identify a number of features about the face and defining the height of the cylinder. Based on these identified features, the one or more processors 120 may select a cylindrical geometric primitive 104 and use the selected geometric primitive to fit a first three-dimensional packaging wireframe model 106 to the cylindrical first three-dimensional object 102 that substantially encompasses the object and includes an allowance for packaging materials about the cylindrical three-dimensional object 102.

Based at least in part on the identified features, the one or more processors 120 may search the library for one or more geometric primitives 104 having features, points, or nodes substantially similar to the spatial arrangement of the identified features, points, or nodes associated with the first three-dimensional object 102. In searching the library, the one or more processors may use one or more appearance-based or feature-based shape recognition or shape selection methods. For example a "large modelbases" appearance-based method using eigenfaces may be used to select geometric primitives 104 appropriate for fitting to the first three-dimensional object 102.

At 208, the one or more processors 120 can generate a video, image, or display output that includes data providing an image of the first three-dimensional packaging wireframe model 106 as fitted to the first three-dimensional object 102. The video, image, or display output data provided by the one or more processors 120 may be used by the one or more CPUs 160 to generate one or more video, image, or display outputs on the one or more display devices 156 that includes one or more images providing the concurrent or simultaneous depiction of the first three-dimensional object 102 using image data from the camera 152 and the fitted first three-dimensional packaging wireframe model 106. In some instances, an image concurrently or simultaneously depicting the geometric primitive 104 fitted to the first three-dimensional object 102 along with the first three-dimensional packaging wireframe model 106 fitted thereto may also be provided on the one or more display devices 156.

Figure 3:
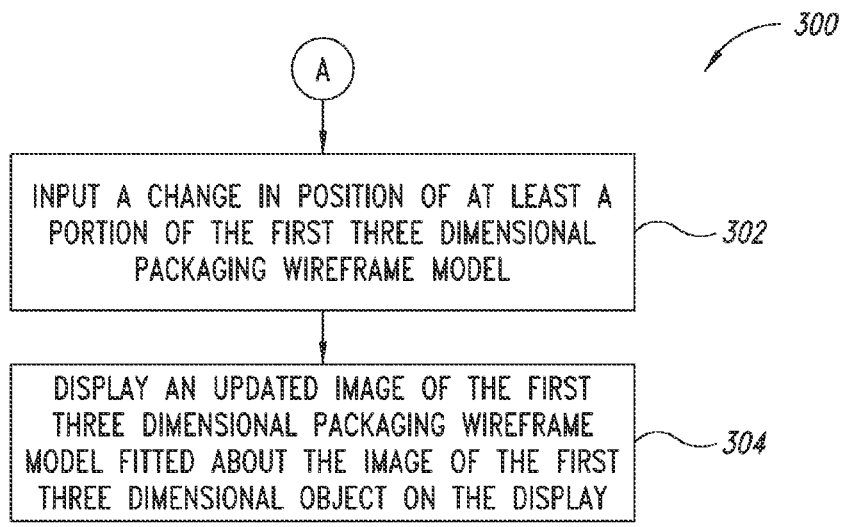
FIG. 3 is an example volume dimensioning method based on the method depicted in FIG. 2 and including receipt of a corrected first three-dimensional packaging wireframe model.

FIG. 3 shows a method 300 extending from the method 200 and describing one or more additional features of an example volume dimensioning system 100, such as the system depicted in FIGS. 1A and 1B. For various reasons, the first three-dimensional packaging wireframe model 106 fitted by the one or more processors 120 may not properly encompass the first three-dimensional object 102. For example, where the first three-dimensional object is a box, one face of the first three-dimensional packaging wireframe model 106 generated by the one or more processors 120 may be situated in too close proximity to the three-dimensional object 102 to permit the insertion of adequate padding between the three-dimensional object 102 and the shipping box. Such incorrectly positioned or sized three-dimensional packaging wireframe models 106 may result in erroneous shipping rate information or erroneous packing information. Therefore, providing a process to correct the shape, size, or position of all or a portion of the three-dimensional packaging wireframe model 106 is advantageous to both the user and the carrier.

At 302, the one or more processors 120 receive an input indicative of a desired change at least a portion of the first three-dimensional packaging wireframe model 106. The change in position of the first three-dimensional packaging wireframe model 106 may include a change to a single point, multiple points, or even a scalar, arc, curve, face, or line linking two or more points used by the one or more processors 120 to fit the three-dimensional packaging wireframe model 106. The one or more processors 120 may receive the input via an I/O device 166 such as a mouse or keyboard, or in a preferred embodiment via a resistive or capacitive touch-based input device which is part of a touch-screen display device 156 communicably connected to the host computer system 150. The use of a touch-screen display device 114 advantageously enables a user to visually align all or a portion of the first three-dimensional packaging wireframe model 106 with all or a corresponding portion of the image of first three-dimensional object 102 in an intuitive and easy to visualize manner. In some embodiments, a prior input received by the one or more processors 120 may be used to place the system 100 in a mode where a subsequent input indicating the desired change to the three-dimensional packaging wireframe model 106 will be provided to the one or more processors 120.

At 304, the one or more processors 120 can generate a video, image, or display data output that includes image data of the modified or updated first three-dimensional packaging wireframe model 106 as fitted to the first three-dimensional object 102. The video, image, or display output data provided by the one or more processors 120 may be used by the one or more CPUs 160 to generate one or more video, image, or display outputs on the one or more display devices 156 that includes an image contemporaneously or simultaneously depicting the first three-dimensional object 102 using image data from the camera 152 and the first three-dimensional packaging wireframe model 106 data as fitted by the one or more processors 120. In some instances, an image concurrently or simultaneously depicting the first three-dimensional object 102 along with the one or more scaled and fitted geometric primitives 104 and the first three-dimensional packaging wireframe model 106 may also be provided on the one or more display devices 156.

Figure 4:
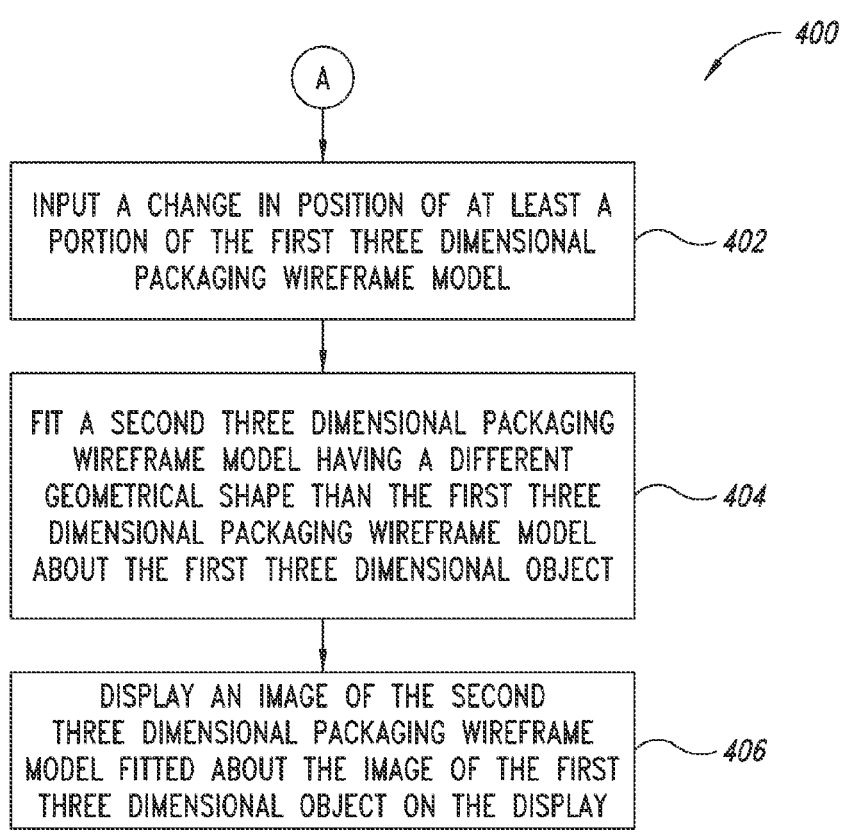
FIG. 4 is an example volume dimensioning method based on the method depicted in FIG. 2 and including selection of a second three-dimensional packaging wireframe model to replace the first three-dimensional packaging wireframe model.

FIG. 4 shows a method 400 extending from the method 200 and describing one or more additional features of an example volume dimensioning system 100, such as the system depicted in FIGS. 1A and 1B. For various reasons, the first three-dimensional packaging wireframe model 106 fitted by the one or more processors 120 may not properly encompass the first three-dimensional object 102 and in fact, the first three-dimensional packaging wireframe model 106 as fitted by the one or more processors 120 may require significant modification or replacement to substantially conform to both the first three-dimensional object 102 and any associated specialized shipping requirements provided by the user.

For example, where the first three-dimensional object 102 is a cylindrical object, a cylindrical geometric primitive 104 may be selected by the one or more processors 120, resulting in a cylindrical first three-dimensional packaging wireframe model 106. Perhaps the user has triangular shaped padding that will be used to pad and center the cylindrical object in the center of a rectangular shipping container. In response to an input indicative of a desired change in a position of at least a portion of the first three-dimensional packaging wireframe model 106, the one or more processors 120 may select a second geometric primitive 104, for example a rectangular prismatic geometric primitive, and fit a more appropriate second three-dimensional packaging wireframe model 106 to replace the previously fitted first three-dimensional packaging wireframe model 106.

At 402, the one or more processors 120 receive an input indicative of a desired change to at least a portion of the first three-dimensional packaging wireframe model 106 fitted to the three-dimensional object 102. The input may specify one or more of a single point, multiple points, or even a scalar, arc, curve, face, or line linking two or more points used by the one or more processors 120 to fit the three-dimensional packaging wireframe model 106. The one or more processors 120 may receive the input via an I/O device 166 such as a mouse or keyboard, or in a preferred embodiment via a resistive or capacitive touch-based input device which is part of a touch-screen display device 156 communicably connected to the host computer system 150. The use of a touch-screen display device 114 advantageously enables a user to visually align all or a portion of the first three-dimensional packaging wireframe model 106 with all or a corresponding portion of the image of the first three-dimensional object 102 in an intuitive and easy to visualize manner. In some embodiments, a prior input received by the one or more processors 120 may be used to place the system 100 in a mode where a subsequent input indicating the desired change to the three-dimensional packaging wireframe model 106 will be provided to the one or more processors 120.

At 404, responsive to the input the one or more processors 120 may select from the library one or more second geometric primitives 104 that are different from the first geometric primitive 104 and fit the second three-dimensional packaging wireframe 106 model using the second geometric primitive 104 to substantially encompass the first three-dimensional object 102. For example, where the one or more processors 120 detect from the input that a cylindrical three-dimensional packaging wireframe model 106 is being changed to a rectangular prismatic three-dimensional packaging wireframe model 106, the one or more processors 120 may alternatively select a second geometric primitive 104 corresponding to a rectangular prism from the library to fit the second three-dimensional packaging wireframe model 106 to the first three-dimensional object 102.

At 406, the one or more processors 120 can generate a video, image, or display data output that includes image data of the second three-dimensional packaging wireframe model 106 as fitted to the first three-dimensional object 102. The video, image, or display output data provided by the one or more processors 120 may be used by the one or more CPUs 160 to generate one or more video, image, or display outputs on the one or more display devices 156 that includes an image contemporaneously or simultaneously depicting the first three-dimensional object 102 using image data from the camera 152 and the second three-dimensional packaging wireframe model 106 data as fitted by the one or more processors 120. In some instances, an image concurrently or simultaneously depicting the first three-dimensional object 102 along with the one or more scaled and fitted second geometric primitives 104 and the first three-dimensional packaging wireframe model 106 may also be provided on the one or more display devices 156.

Figure 5:
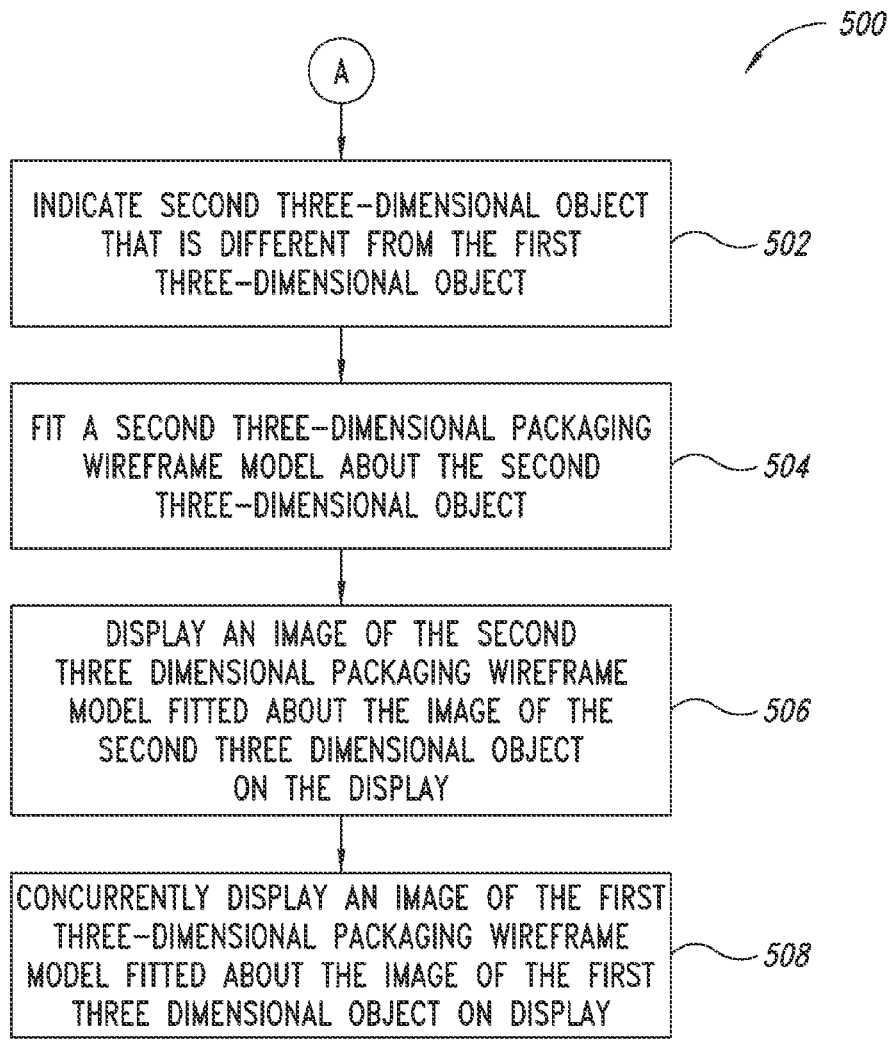
FIG. 5 is an example volume dimensioning method based on the method depicted in FIG. 2 and including fitting a first three-dimensional packaging wireframe model about a first three-dimensional object and fitting a second three-dimensional packaging wireframe model about a second three-dimensional object.

FIG. 5 shows a method 500 extending from the method 200 and describing one or more additional features of an example volume dimensioning system 100, such as the system depicted in FIGS. 1A and 1B. As depicted in FIG. 1A, at times a second three-dimensional object 102 may be present in the field-of-view 116 of the image sensor 114. For various reasons, the second three-dimensional object 102 may not be detected by the one or more processors 120 and consequently a second three-dimensional packaging wireframe model 106 may not be fitted about the second three-dimensional object 102 by the one or more processors 120. In such an instance, one or more second geometric primitives 104 can be selected by the one or more processors 120 and used to fit a second three-dimensional packaging wireframe model 106 to the second three-dimensional object 102 based at least in part upon the receipt of an input by the one or more processors 120 indicating the existence of the second three-dimensional object 102.

At 502, the one or more processors 120 receive an input that indicates a second three-dimensional object 102 exists within the field-of-view 116 of the image sensor 114. The one or more processors 120 may receive the input via an I/O device 166 such as a mouse or keyboard, or in a preferred embodiment via a resistive or capacitive touch-based input device which is part of a touch-screen display device 156 communicably connected to the host computer system 150. The use of a touch-screen display device 114 advantageously enables a user to draw a perimeter around or otherwise clearly delineate the second three-dimensional object 102. In some embodiments, a prior input received by the one or more processors 120 may be used to place the system 100 in a mode where a subsequent input indicating the second three-dimensional object 102 will be provided to the one or more processors 120. Responsive to the input indicating the existence of a second three-dimensional object 102 within the field-of-view 116 of the image sensor 114, the one or more processors 120 may detect additional three-dimensional features associated with the second three-dimensional object 102.

At 504, based at least in part on the three-dimensional features identified in 502, the one or more processors 120 may select from the library one or more second geometric primitives 104 to provide representation of the packaging encompassing the second three-dimensional object 102. The one or more processors 120 fit a second three-dimensional packaging wireframe model 106 about the second three-dimensional object 102 that is responsive to any specialized instructions received from the user and encompasses substantially all the three-dimensional features of the second three-dimensional object 102 identified by the one or more processors 120 at 502.

At 506, the one or more processors 120 can generate a video, image, or display data output that includes image data of the second three-dimensional packaging wireframe model 106 as fitted to the virtual representation of the second three-dimensional object 104. The video, image, or display output data provided by the one or more processors 120 may be used by the one or more CPUs 160 to generate one or more video, image, or display outputs to the one or more display devices 156 that includes image data depicting an image of the second three-dimensional object 102 using image data from the camera 152 along with the fitted second three-dimensional packaging wireframe model 106 provided by the one or more processors 120. In some instances, an image concurrently or simultaneously depicting the second three-dimensional object 102 along with the one or more scaled and fitted second geometric primitives 104 and the second three-dimensional packaging wireframe model 106 may also be provided on the one or more display devices 156.

At 508, the one or more processors 120 can generate a video, image, or display data output that includes image data of the first three-dimensional packaging wireframe model 106 as fitted to the first three-dimensional object 102. The video, image, or display output data provided by the one or more processors 120 may be used by the one or more CPUs 160 to generate one or more video, image, or display outputs on the one or more display devices 156 that includes an image contemporaneously or simultaneously depicting images of the first and second three-dimensional objects 102 using image data from the camera 152 along with the respective first and second three-dimensional packaging wireframe models 106 fitted by the one or more processors 120. In some instances, an image concurrently or simultaneously depicting the first and second three-dimensional objects 102 along with the one or more scaled and fitted first and second geometric primitives 104 and the first and second three-dimensional packaging wireframe models 106 may also be provided on the one or more display devices 156.

Figure 6:
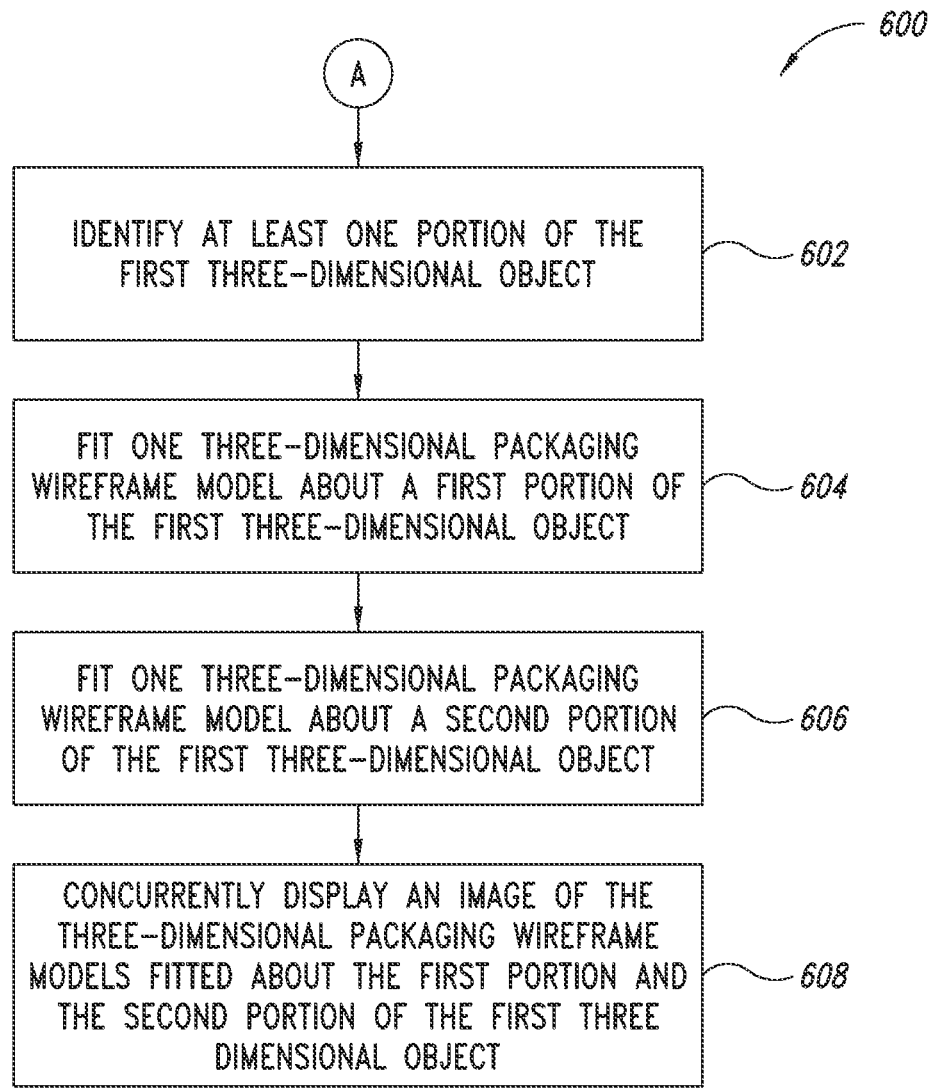
FIG. 6 is an example volume dimensioning method based on the method depicted in FIG. 2 and including fitting a three-dimensional packaging wireframe model about a first portion of a first three-dimensional object and fitting a three-dimensional packaging wireframe model about a second portion of the first three-dimensional object.

FIG. 6 shows a method 600 extending from method 200 and describing one or more additional features of an example volume dimensioning system 100, such as the system depicted in FIGS. 1A and 1B. In some situations, the first three-dimensional object 102 may have a complex or non-uniform shape that, when virtually represented as a plurality of geometric primitives 104, is best fitted using a corresponding plurality of three-dimensional packaging wireframe models 106. For instance, one three-dimensional packaging wireframe model 106 may be fitted to a first portion of a three-dimensional object 102 and another three-dimensional packaging wireframe model 106 may be fitted to a second portion of the three-dimensional object 102.

For example, rather than fitting a single three-dimensional packaging wireframe model 106 about a guitar-shaped three-dimensional object 102, a more accurate three-dimensional packaging wireframe model 106 may incorporate a plurality wireframe models 106, such as a first three-dimensional packaging wireframe model 106 fitted to the body portion of the guitar-shaped object and a second three-dimensional packaging wireframe model 106 fitted to the neck portion of the guitar-shaped object may provide a more accurate three-dimensional packaging wireframe model 106 for the entire guitar-shaped object. Fitting of multiple three-dimensional packaging wireframe models 106 may be performed automatically by the one or more processors 120, or performed responsive to the receipt of a user input indicating that a plurality of three-dimensional packaging wireframe models should be used. Providing a user with the ability to designate the use of three-dimensional packaging wireframe models 106 about different portions of a single three-dimensional object 102 may provide the user with a more accurate freight rate estimate based upon the actual configuration of the object and may provide the carrier with a more accurate shipping volume.

At 602, the one or more processors 120 receive an input that identifies a portion of the first three-dimensional object 102 that may be represented using a separate three-dimensional packaging wireframe model 106. Using the example of a guitar, the user may provide an input that when received by the one or more processors 120, indicates the neck of the guitar is best fitted using separate three-dimensional packaging wireframe model 106. The one or more processors 120 may receive the input via an I/O device 166 such as a mouse or keyboard, or in a preferred embodiment via a resistive or capacitive touch-based input device which is part of a touch-screen display device 156 communicably connected to the host computer system 150. The use of a touch-screen display device 114 advantageously enables a user to draw a perimeter or otherwise clearly delineate the portion of the first three-dimensional object 102 for which one or more separate geometric primitives 104 may be selected and about which a three-dimensional packaging wireframe model 106 may be fitted by the one or more processors 120. In some embodiments, a prior input received by the one or more processors 120 may be used to place the system 100 in a mode where a subsequent input indicating the portion of the first three-dimensional object 102 suitable for representation by a separate three-dimensional packaging wireframe model 106 will be provided as an input to the one or more processors 120.

At 604, responsive at least in part to the input indicating the portion of the first three-dimensional object 102 suitable for representation as a separate three-dimensional packaging wireframe model 106, the one or more processors 120 can select one or more geometric primitives 104 encompassing the first portion of the first three-dimensional object 102. Based on the one or more selected geometric primitives 104, the one or more processors 120 fit a three-dimensional packaging wireframe model 106 about the first portion of the three-dimensional object 102. Continuing with the illustrative example of a guitar—the one or more processors 120 may receive an input indicating the user's desire to represent the neck portion of the guitar as a first three-dimensional packaging wireframe model 106. Responsive to the receipt of the input selecting the neck portion of the guitar, the one or more processors 120 select one or more appropriate geometric primitives 104, for example a cylindrical geometric primitive, and fit a cylindrical three-dimensional packaging wireframe model 106 that encompasses the first portion of the first three-dimensional object 102 (i.e., the neck portion of the guitar).

At 606, the one or more processors 120 select one or more geometric primitives 104 encompassing the second portion of the first three-dimensional object 102. Based on the one or more selected geometric primitives 104, the one or more processors 120 fit a three-dimensional packaging wireframe model 106 about the second portion of the first three-dimensional object 102. The separate three-dimensional packaging wireframe model 106 fitted to the second portion may be the same as, different from, or a modified version of the three-dimensional packaging wireframe model 106 fitted to the first portion of the three-dimensional object 102.

Continuing with the illustrative example of a guitar the single, three-dimensional packaging wireframe model 106 originally fitted by the one or more processors 120 to the entire guitar may have been in the form of a rectangular three-dimensional packaging wireframe model 106 encompassing both the body portion and the neck portion of the guitar. After fitting the cylindrical three-dimensional packaging wireframe model 106 about the first portion of the first three-dimensional object 102 (i.e., the neck of the guitar), the one or more processors 120 may reduce the size of the originally fitted, rectangular, three-dimensional packaging wireframe model 106 to a rectangular three-dimensional packaging wireframe model 106 fitted about the second portion of the first three-dimensional object 104 (i.e., the body of the guitar).

At 608, the one or more processors 120 can generate a video, image, or display data output that includes image data of the three-dimensional packaging wireframe models 106 fitted to the first and second portions of the first three-dimensional object 102. The video, image, or display output data provided by the one or more processors 120 may be used by the one or more CPUs 160 to generate one or more video, image, or display outputs on the one or more display devices 156 including an image concurrently or simultaneously depicting the first and second portions of the first three-dimensional object 102 using image data from the camera 152 and the respective three-dimensional packaging wireframe models 106 fitted to each of the first and second portions by the one or more processors 120. In some instances, an image concurrently or simultaneously depicting the first and second portions of the first three-dimensional object 102 along with their respective one or more scaled and fitted geometric primitives 104 and their respective three-dimensional packaging wireframe models 106 may also be provided on the one or more display devices 156.

Figure 7:
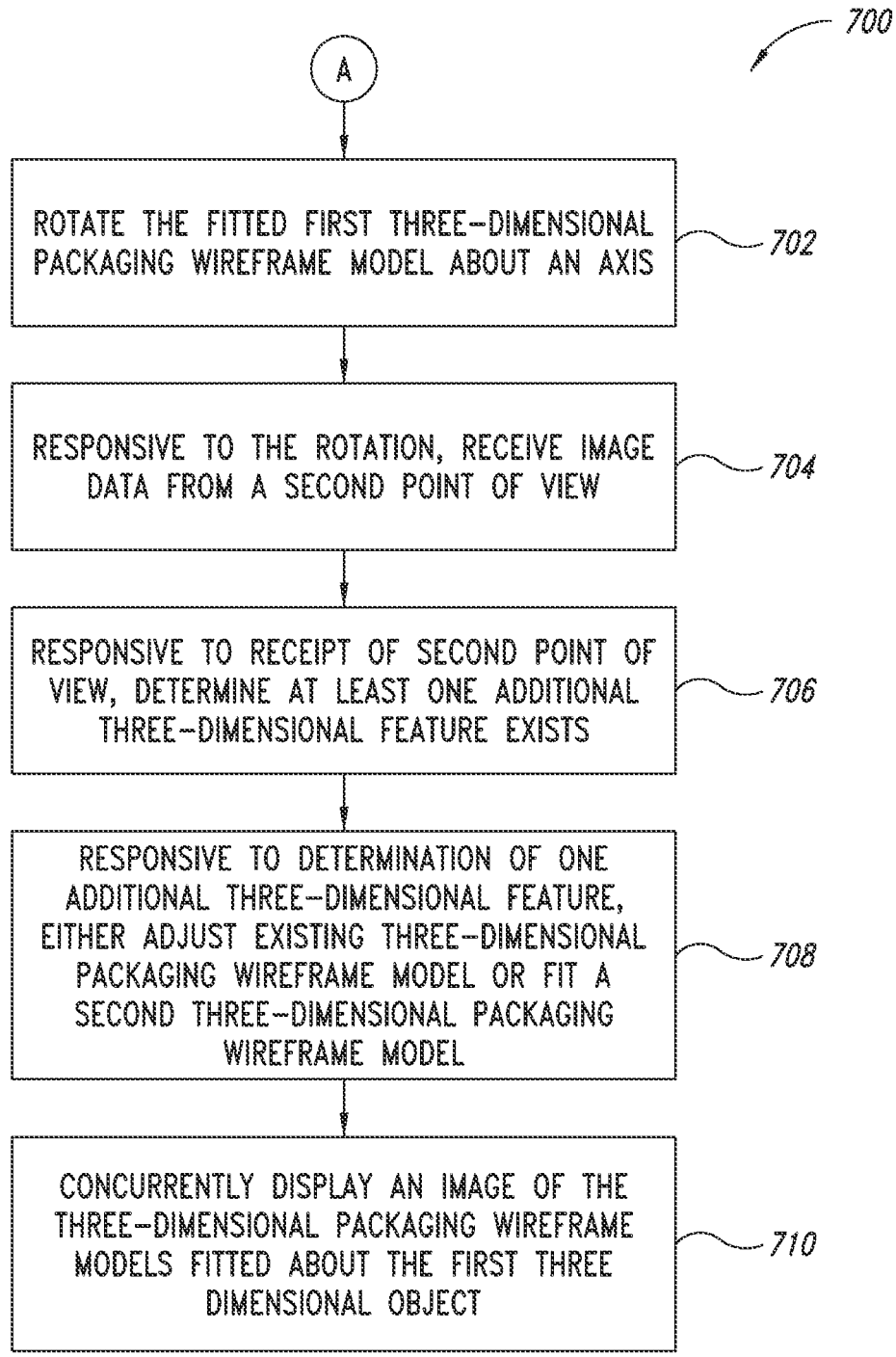
FIG. 7 is an example volume dimensioning method based on the method depicted in FIG. 2 and including rotation of the first three-dimensional packaging wireframe model to detect the existence of additional three-dimensional features of the three-dimensional object and adjustment of the first three-dimensional packaging wireframe model or addition of a second three-dimensional packaging wireframe model to encompass the additional three-dimensional features.

FIG. 7 shows a method 700 extending from method 200 and describing one or more additional features of an example volume dimensioning system 100, such as the system depicted in FIGS. 1A and 1B. In some situations, one or more features present on the first three-dimensional object 102 may not be visible from the point of view of the image sensor 114. For example, a protruding feature may lie on a portion of the three-dimensional object 102 facing away from the image sensor 114 such that substantially all of the feature is hidden from the image sensor 114. In such instances, a failure to incorporate the hidden feature may result in erroneous or inaccurate rate information being provided to a user or erroneous or inaccurate packing dimensions or volumes being provided to the carrier.

In such instances, obtaining image data from a second point of view that includes the previously hidden or obscured feature will permit the one or more processors 120 to select one or more geometric primitives 104 fitting the entire three-dimensional object 102 including the features hidden in the first point of view. By encompassing all or the features within the one or more geometric primitives 104, the one or more processors 120 are able to fit the first three-dimensional packaging wireframe model 106 about the entire first three-dimensional object 102 or alternatively, to add a second three-dimensional packaging wireframe model 106 incorporating the portion of the first three-dimensional object 102 that was hidden in the first point of view of the image sensor 114.

At 702, after fitting the first three-dimensional packaging wireframe model 106 to the first three-dimensional object 102, the one or more processors 120 rotate the fitted three-dimensional packaging wireframe model 106 about an axis to expose gaps in the model or to make apparent any features absent from the model but present on the first three-dimensional object 102. In some situations, the volume dimensioning system 110 may provide a video, image, or display data output to the host computer 150 providing a sequence or views of the fitted first three-dimensional packaging wireframe model 106 such that the first three-dimensional packaging wireframe model 106 appears to rotate about one or more axes when viewed on the one or more display devices 156.

Responsive to the rotation of the first three-dimensional packaging wireframe model 106 on the one or more display devices 156, the system 100 can generate an output, for example a prompt displayed on the one or more display devices 156, requesting a user to provide an input confirming the accuracy of or noting any deficiencies present in the first three-dimensional packaging wireframe model 106.

At 704, additional image data in the form of a second point of view of the first three-dimensional object 102 that exposes the previously hidden or obscured feature on the first three-dimensional object 102 may be provided to the one or more processors 120. Image data may be acquired or captured from a second point of view in a variety of ways. For example, in some instances, the image sensor 114 may be automatically or manually displaced about the first three-dimensional object 102 to provide a second point of view that includes the previously hidden feature. Alternatively or additionally, a second image sensor (not shown in FIGS. 1A, 1B) disposed remote from the system 100 may provide a second point of view of the first three-dimensional object 102. Alternatively or additionally, the system 100 may generate an output, for example an output visible on the one or more display devices 156 providing guidance or directions to the user to physically rotate the first three-dimensional object 102 to provide a second point of view to the image sensor 114. Alternatively or additionally, the system 100 may generate a signal output, for example a signal output from the host computer 150 that contains instructions to automatically rotate a turntable upon which the first three-dimensional object 102 has been placed to provide a second point of view of the first three-dimensional object 102 to the image sensor 114.

At 706, responsive to the receipt of image data from the image sensor as viewed from the second point of view of the first three-dimensional object 102, the one or more processors 120 can detect a portion of the first three-dimensional object 102 that was hidden in the first point of view. Such detection can be accomplished, for example by tracking the feature points on the first three-dimensional object 102 visible in the first point of view as the first point of view is transitioned to the second point of view. Identifying new feature points appearing in the second point of view that were absent from the first point of view provide an indication to the one or more processors 120 of the existence of a previously hidden or obscured portion or feature of the first three-dimensional object 102.

At 708, responsive to the detection of the previously hidden or obscured portion or feature of the first three-dimensional object 102, the one or more processors 120 can modify one or more originally selected geometric primitives 140 (e.g., by stretching the geometric primitive 104) to incorporate the previously hidden or obscured feature, or alternatively can select one or more second geometric primitives 104 that when combined with the one or more previously selected geometric primitives 104 encompasses the previously hidden or obscured feature on the first three-dimensional object 102.

In some instances, the one or more processors 120 may modify the one or more originally selected geometric primitives 104 to encompass the feature hidden or obscured in the first point of view, but visible in the second point of view. The three-dimensional packaging wireframe model 106 can then be scaled and fitted to the modified originally selected geometric primitive 104 to encompass the feature present on the first three-dimensional object 102. For example, a first three-dimensional packaging wireframe model 106 may be fitted to a rectangular prismatic three-dimensional object 102, and a hidden feature in the form of a smaller rectangular prismatic solid may be located on the rear face of the rectangular prismatic three-dimensional object 102. The one or more processors 120 may in such a situation, modify the originally selected geometric primitive 104 to encompass the smaller rectangular prismatic solid. The one or more processors 120 can then scale and fit the first three-dimensional packaging wireframe model 106 to encompass the entire first three-dimensional object 102 by simply modifying, by stretching, the originally fitted rectangular three-dimensional packaging wireframe model 106.

In other instances, the one or more processors 120 may alternatively select one or more second geometric primitives 104 to encompass the smaller rectangular solid feature and fit a second three-dimensional packaging wireframe model 106 to the second geometric primitive 104. For example, when the three-dimensional object 102 is a guitar-shaped object, the first point of view, may expose only the body portion of the guitar-shaped object to the image sensor 114 while the neck portion remains substantially hidden from the first point of view of the image sensor 114. Upon receiving image data from the second point of view, the one or more processors 120 can detect an additional feature that includes the neck portion of the guitar-shaped object. In response, the one or more processors 120 may select a second geometric primitive 104 and use the selected second geometric primitive 104 to fit a second three-dimensional packaging wireframe model 106 about the neck portion of the guitar-shaped object.

At 710, the one or more processors 120 can generate a video, image, or display data output that includes image data of the one or more three-dimensional packaging wireframe models 106 fitted to the first three-dimensional object 102, including features visible from the first and second points of view of the image sensor 114. The video, image, or display output data provided by the one or more processors 120 may be used by the one or more CPUs 160 to generate one or more video, image, or display outputs on the one or more display devices 156 that includes an image concurrently or simultaneously displaying the first three-dimensional object 102 using image data from the camera 152 and the one or more three-dimensional packaging wireframe models 106 fitted to respective portions of the first three-dimensional object 102 by the one or more processors 120. In some instances, an image concurrently or simultaneously depicting the first and second portions of the first three-dimensional object 102 along with one or more geometric primitives 104 and the scaled and fitted three-dimensional packaging wireframe model 106 may also be provided on the one or more display devices 156.

Figure 8:
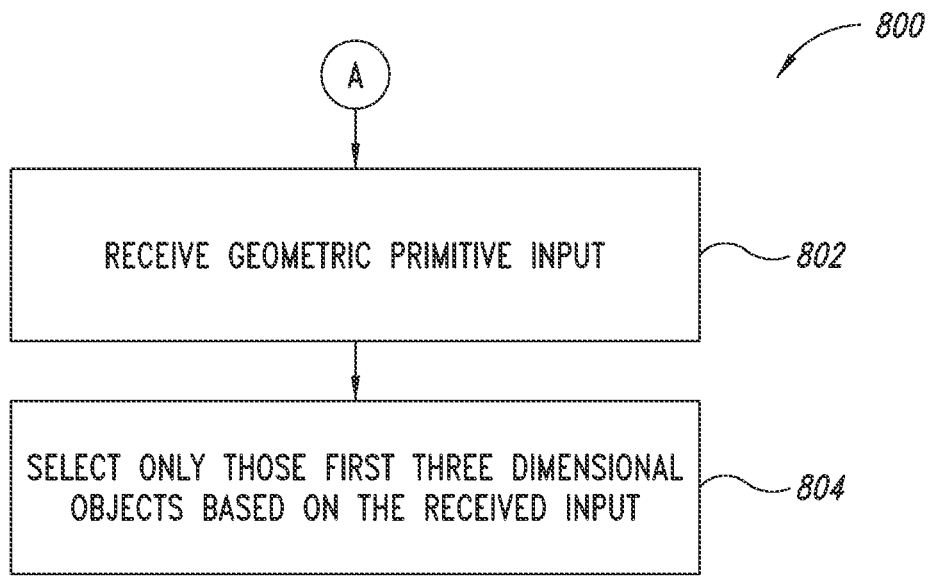
FIG. 8 is an example volume dimensioning method based on the method depicted in FIG. 2 and including receipt of an input including a geometric primitive and selection of three-dimensional objects within the point of view of the image sensor that are substantially similar to or match the received geometric primitive input.

FIG. 8 shows a method 800 extending from method 200 and describing one or more additional features of an example volume dimensioning system 100, such as the system depicted in FIGS. 1A and 1B. The field-of-view 116 of the image sensor 114 may contain a multitude of potential first three-dimensional objects 102, yet the only three-dimensional objects of interest to a user may have a particular size or shape. For example, the field-of-view 116 of the image sensor 114 may be filled with a three bowling balls and a single box which represents the desired first three-dimensional object 102. In such an instance, the one or more processors 120 may select four geometric primitives 104— three associated with the bowling balls and one associated with the box and fit three-dimensional packaging wireframe models 106 to each of the three bowling balls and the single box. Rather than laboriously deleting the three spherical wireframes fitted to the bowling balls, in some embodiments, the one or more processors 120 may receive an input designating a particular geometric primitive shape as indicating the desired first three-dimensional object 102 within the field-of-view 116 of the image sensor 114.

In the previous example, the one or more processors 120 may receive an input indicating a rectangular prismatic geometric primitive as designating the particular shape of the desired first three-dimensional object. This allows the one or more processors 120 to automatically eliminate the three bowling balls within the field-of-view of the image sensor 114 as potential first three-dimensional objects 102. Such an input, when received by the one or more processors 120 effectively provides a screen or filter for the one or more processors 120 eliminating those three-dimensional objects 102 having geometric primitives not matching the indicated desired geometric primitive received by the one or more processors 120.

At 802, the one or more processors 120 receive an input indicative of a desired geometric primitive 104 useful in selecting, screening, determining or otherwise distinguishing the first three-dimensional object 102 from other objects that are present in the field-of-view 116 of the image sensor 114. The one or more processors 120 may receive the input via an I/O device 166 such as a mouse or keyboard, or in a preferred embodiment via a resistive or capacitive touch-based input device which is part of a touch-screen display device 156 communicably connected to the host computer system 150. In some instances, text or graphical icons indicating various geometric primitive shapes may be provided in the form of a list, menu, or selection window to the user.

At 804, responsive to the receipt of the selected geometric primitive 104, the one or more processors 120 search through the three-dimensional objects 102 appearing in the field-of-view 116 of the image sensor 114 to locate only those first three-dimensional objects 102 having a shape that is substantially similar to or matches the user selected geometric primitive 104.

Figure 9:
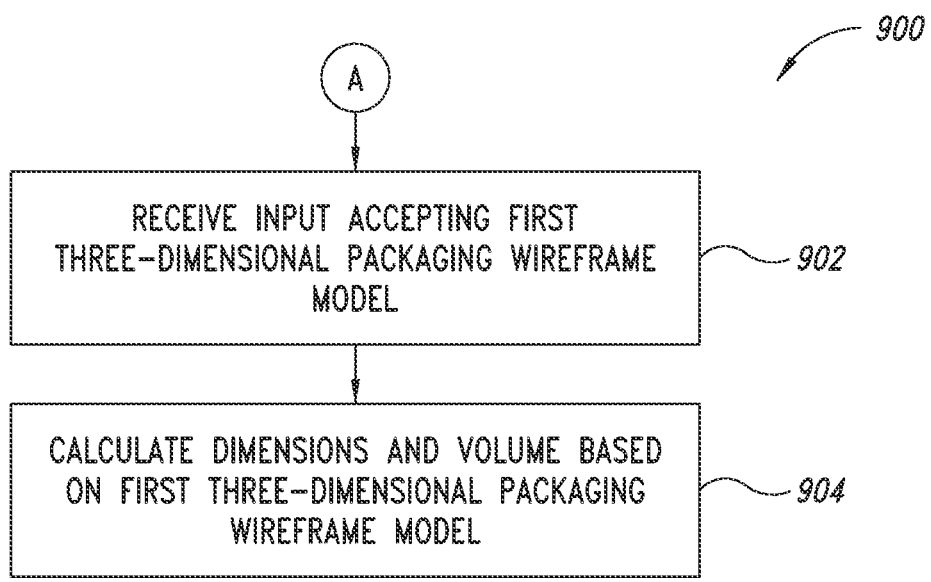
FIG. 9 is an example volume dimensioning method based on the method depicted in FIG. 2 and including acceptance of the fitted first three-dimensional packaging wireframe model and calculation of the dimensions and the volume of the first three-dimensional packaging wireframe model.

FIG. 9 shows a method 900 extending from method 200 and describing one or more additional features of an example volume dimensioning system 100, such as the system depicted in FIGS. 1A and 1B. After fitting the first three-dimensional packaging wireframe model 106 to the first three-dimensional object 102, the one or more processors 120 can determine the packaging dimensions and the volume of the first three-dimensional object 102 responsive to receipt of an input indicative of user acceptance of the fitted first three-dimensional packaging wireframe model 106. The calculated packing dimensions are based on dimensional and volumetric information acquired from the fitted first three-dimensional packaging wireframe model 106 and reflect not only the dimensions of the three-dimensional object 102 itself, but also include any additional packaging, boxing, crating, etc., necessary to safely and securely ship the first three-dimensional object 102.

At 902, the one or more processors 120 receive an input indicative of user acceptance of the first three-dimensional packaging wireframe model 106 fitted to the first three-dimensional object 102 by the one or more processors 120. The one or more processors 120 can generate a video, image, or display data output that includes image data of the three-dimensional packaging wireframe model 106 after scaling and fitting to the first three-dimensional object 102, and after any modifications necessary to accommodate any specialized shipping instructions provided by the user.

The video, image, or display output data provided by the one or more processors 120 may be used by the one or more CPUs 160 to generate one or more video, image, or display outputs on the one or more display devices 156 including image data depicting a simultaneous or concurrent image of the first three-dimensional object 102 using image data from the camera 152 and the three-dimensional packaging wireframe model 106 fitted to the first three-dimensional object 102 by the one or more processors 120. In some instances, an image concurrently or simultaneously depicting the first three-dimensional object 102 along with one or more scaled and fitted geometric primitives 104 and the scaled and fitted three-dimensional packaging wireframe model 106 may also be provided on the one or more display devices 156.

Responsive to the display of at least the first three-dimensional object 102 and the first three-dimensional packaging wireframe model 106, the system 100 may generate a signal output, for example a signal output from the host computer 150 containing a query requesting the user provide an input indicative of an acceptance of the fitting of the first three-dimensional packaging wireframe model 106 to the first three-dimensional object 102.

At 904, responsive to user acceptance of the fitting of the first three-dimensional packaging wireframe model 106 to the first three-dimensional object 102, the one or more processors 120 determine the dimensions and calculate the volume of the first three-dimensional object 102 based at least in part on the three-dimensional packaging wireframe model 106. Any of a large variety of techniques or algorithms for determining a volume of a bounded three-dimensional surface may be employed by the system 100 to determine the dimensions or volume of the first three-dimensional object 102.

Figure 10:
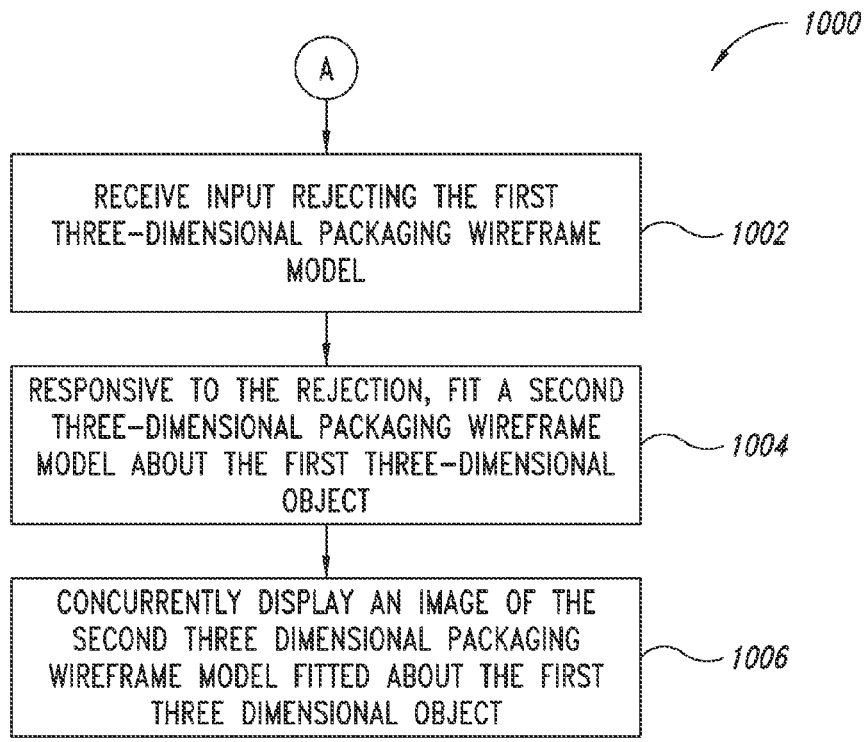
FIG. 10 is an example volume dimensioning method based on the method depicted in FIG. 2 and including receipt of an input rejecting the first three-dimensional packaging wireframe model fitted to the three-dimensional object and selection and fitting of a second three-dimensional packaging wireframe model to the first three-dimensional object.

FIG. 10 shows a method 1000 extending from method 200 and describing one or more additional features of an example volume dimensioning system 100, such as the system depicted in FIGS. 1A and 1B. In some instances, the one or more processors 120 may select one or more inapplicable geometric primitives 104 or improperly fit a first three-dimensional packaging wireframe model 106 about the first three-dimensional object 102. In such an instance, rather than modify the first three-dimensional packaging wireframe model 106, a more expeditious solution may be to delete the first three-dimensional packaging wireframe model 106 fitted by the one or more processors 120 in its entirety and request the one or more processors 120 to select one or more different geometric primitives 104 and fit a second three-dimensional packaging wireframe model 106 about the first three-dimensional object 102.

At 1002, the one or more processors 120 receive an input indicative of a rejection of the first three-dimensional packaging wireframe model 106 fitted by the one or more processors 120 about the first three-dimensional object 102. The one or more processors 120 may receive the input via an I/O device 166 such as a mouse or keyboard, or in a preferred embodiment via a resistive or capacitive touch-based input device which is part of a touch-screen display device 156 communicably connected to the host computer system 150.

At 1004, responsive to the receipt of the rejection of the first three-dimensional packaging wireframe model 106 fitted about the first three-dimensional object 102, the one or more processors 120 select one or more second geometric primitives 104 and, based on the one or more second selected geometric primitives 104, fit a second three-dimensional packaging wireframe model 106 about the first three-dimensional object 102.

At 1006, the one or more processors 120 can generate a video, image, or display data output that includes image data of the second three-dimensional packaging wireframe model 106 fitted to the first three-dimensional object 102. The video, image, or display output data provided by the one or more processors 120 may be used by the one or more CPUs 160 to generate one or more video, image, or display outputs on the one or more display devices 156 that includes an image contemporaneously or simultaneously depicting the first three-dimensional object 102 using image data from the camera 152 and the second three-dimensional packaging wireframe model 106 fitted by the one or more processors 120. In some instances, an image concurrently or simultaneously depicting an image of the first three-dimensional object 102 along with the one or more second geometric primitives 104 and the scaled and fitted three-dimensional packaging wireframe model 106 may also be provided on the one or more display devices 156.

Figure 11:
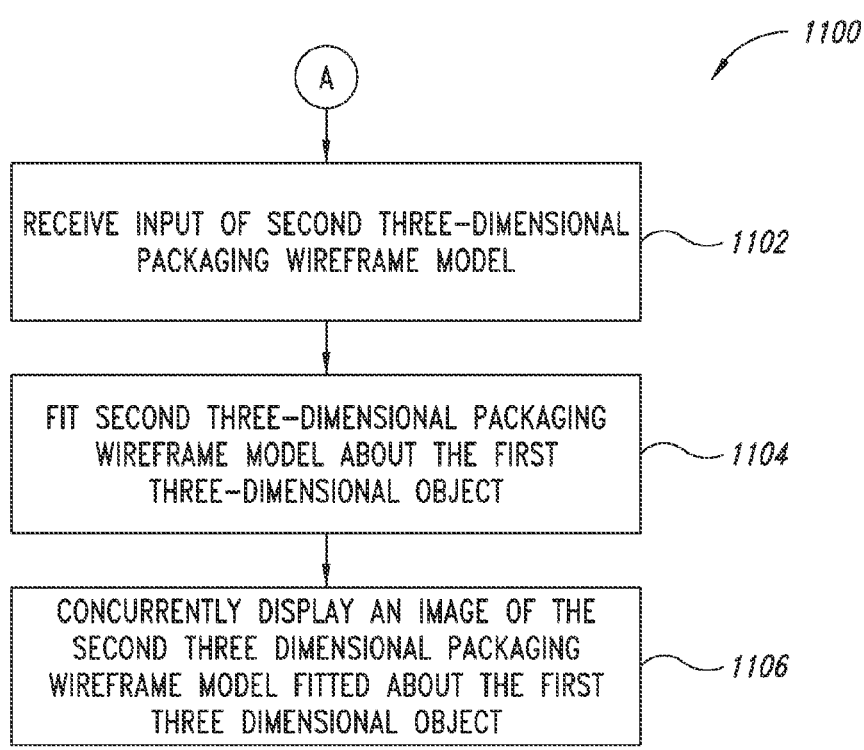
FIG. 11 is an example volume dimensioning method based on the method depicted in FIG. 2 and including receipt of an input selecting a second three-dimensional packaging wireframe model and fitting of the second three-dimensional packaging wireframe model to the first three-dimensional object.

FIG. 11 shows a method 1100 extending from method 200 and describing one or more additional features of an example volume dimensioning system 100, such as the system depicted in FIGS. 1A and 1B. In some instances, the one or more processors 120 may receive as an input a value indicating a selection of a second three-dimensional packaging wireframe model 106 for fitting about the virtual representation of the first three-dimensional object 104. The one or more processors 120 can fit the second three-dimensional packaging wireframe model about the first three-dimensional object 102. Such an input can be useful in expediting the fitting process when the appropriate geometric primitive or second three-dimensional packaging wireframe model is known in advance.

At 1102, the one or more processors 120 receive an input indicative of a selection of a second geometric primitive 104 as representative of the first three-dimensional object 102 or a second three-dimensional packaging wireframe model 106 for fitting about the first three-dimensional object 102. In some instances, the one or more processors 120 receive an input indicative of one or more second geometric primitives 104 that are different from the one or more first geometric primitives 104 used by the one or more processors 120 to fit the first three-dimensional packaging wireframe model 106. The one or more processors 120 may receive the input via an I/O device 166 such as a mouse or keyboard, or in a preferred embodiment via a resistive or capacitive touch-based input device which is part of a touch-screen display device 156 communicably connected to the host computer system 150. In at least some instances, the input is provided by selecting a text or graphic icon corresponding to the second geometric primitive 104 or an icon corresponding to the second three-dimensional packaging wireframe model 106 from a list, menu or selection window containing a plurality of such icons.

At 1104, responsive to the selection of the second geometric primitive 104 or the second three-dimensional packaging wireframe model, the one or more processors 120 can fit the second three-dimensional packaging wireframe model 106 to the first three-dimensional object 102.

At 1106, the one or more processors 120 can generate a video, image, or display data output that includes image data of the second three-dimensional packaging wireframe model 106 fitted to the first three-dimensional object 102. The video, image, or display output data provided by the one or more processors 120 may be used by the one or more CPUs 160 to generate one or more video, image, or display outputs on the one or more display devices 156 that includes an image concurrently or simultaneously depicting the first three-dimensional object 102 using image data from the camera 152 and the second three-dimensional packaging wireframe model 106 fitted by the one or more processors 120. In some instances, an image concurrently or simultaneously depicting an image of the first three-dimensional object 102 along with the one or more geometric primitives 104 and the scaled and fitted three-dimensional packaging wireframe model 106 may also be provided on the one or more display devices 156.

Figure 12:
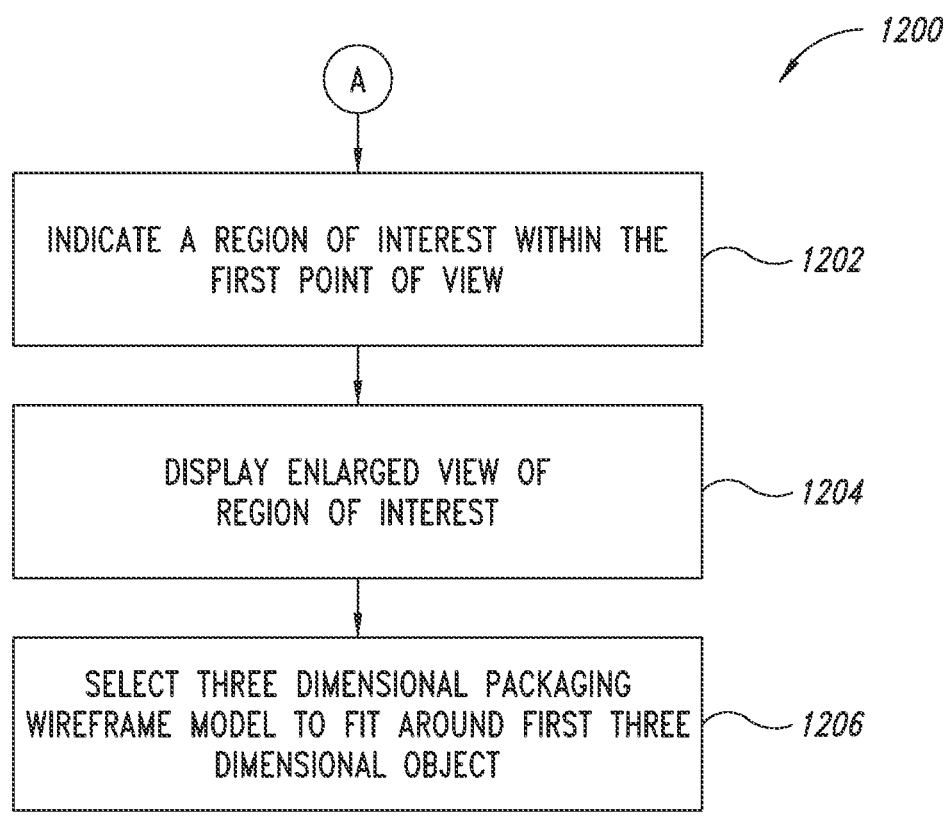
FIG. 12 is an example volume dimensioning method based on the method depicted in FIG. 2 and including receipt of an input indicating a region of interest within the first point of view and the display of an enlarged view of the region of interest.

FIG. 12 shows a method 1200 extending from method 200 and describing one or more additional features of an example volume dimensioning system 100, such as the system depicted in FIGS. 1A and 1B. In some instances, all or a portion of the first three-dimensional object 102 may be too small to easily view within the confines of the one or more display devices 156. The one or more processors 120 may receive an input indicative of a region of interest containing all or a portion of the first three-dimensional object 102. In response to the input, the one or more processors 120 may ascertain whether the first three-dimensional packaging wireframe model 106 included within the indicated region of interest has been properly fitted about the first three-dimensional object 102. Such an input can be useful in increasing the accuracy of the three-dimensional packaging wireframe model 106 fitting process, particularly when all or a portion of the first three-dimensional object 102 is small in size and all or a portion of the fitted first three-dimensional packaging wireframe 106 model is difficult to discern.

At 1202, the one or more processors 120 receive an input indicative of a region of interest lying in the field-of-view 116 of the image sensor 114. The one or more processors 120 may receive the input via an I/O device 166 such as a mouse or keyboard, or in a preferred embodiment via a resistive or capacitive touch-based input device which is part of a touch-screen display device 156 communicably connected to the host computer system 150.

At 1204, responsive to the receipt of the input indicative of a region of interest in the field-of-view 116 of the image sensor 114, the one or more CPUs 160 enlarge the indicated region of interest and output a video, image, or display data output including the enlarged region of interest to the one or more display devices 156 on the host computer system 150. In some situations, the one or more processors 120 may provide the video, image, or display data output including the enlarged region of interest to the one or more display devices 156 on the host computer system 150.

At 1206, the one or more processors 120 automatically select a geometric primitive 104 based upon the features of the first three-dimensional object 102 included in the enlarged region of interest for use in fitting the first three-dimensional packaging wireframe model 106 about all or a portion of the first three-dimensional object 102. Alternatively, the one or more processors 120 may receive an input indicative of a geometric primitive 104 to fit the first three-dimensional packaging wireframe model 106 about all or a portion of the first three-dimensional object 102 depicted in the enlarged region of interest. The one or more processors 120 may receive the input via an I/O device 166 such as a mouse or keyboard, or in a preferred embodiment via a resistive or capacitive touch-based input device which is part of a touch-screen display device 156 communicably connected to the host computer system 150. In at least some instances, the input is provided to the one or more processors 120 by selecting a text or graphic icon corresponding to the geometric primitive from a menu, list or selection window containing a plurality of such icons.

Figure 13:
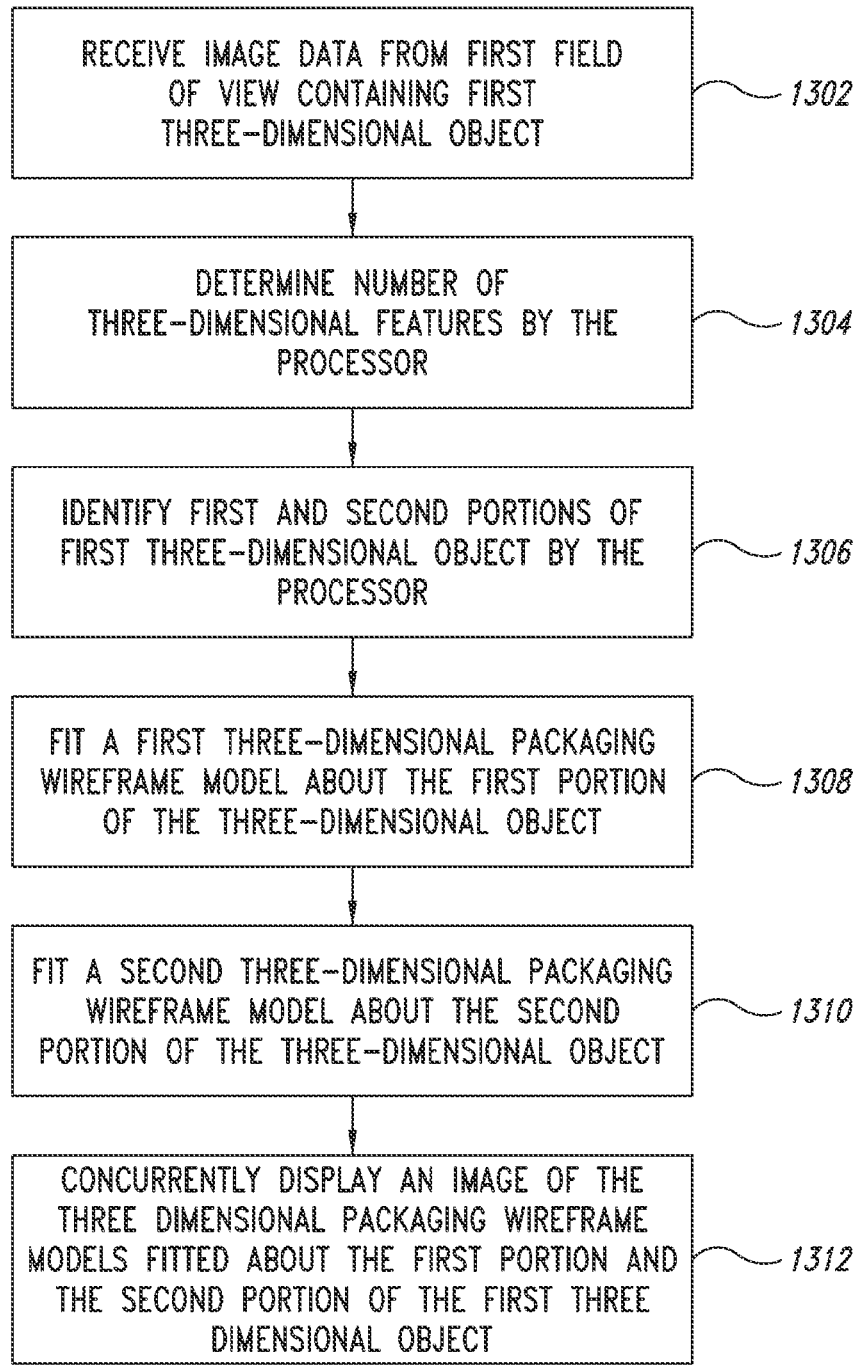
FIG. 13 is an example volume dimensioning method including autonomous identification of first and second portions of a first three-dimensional object and fitting three-dimensional packaging wireframe models about each of the respective first and second portions of the three-dimensional object.

FIG. 13 shows a method 1300 depicting the operation of an example volume dimensioning system 100, such as the system depicted in FIG. 1. In some embodiments, the first three-dimensional object 102 may have a complex or non-uniform shape that is best represented using two or more geometric primitives 104. In such instances, a first geometric primitive 104 may be used by the one or more processors 120 to fit a first three-dimensional packaging wireframe model 106 about a first portion of the first three-dimensional object 102. Similarly, a second geometric primitive 104 may be used by the one or more processors 120 to fit a second three-dimensional packaging wireframe model 106 about a second portion of the first three-dimensional object 102. In at least some embodiments, the first and second geometric primitives 104 may be autonomously selected by the one or more processors 120. Permitting the one or more processors 120 to select two or more geometric primitives 104 and fit a corresponding number of three-dimensional packaging wireframe models 106 about a corresponding number of portions of the three-dimensional object 102 may provide the user with a more accurate estimate of the dimensions or volume of the packaging encompassing the first three-dimensional object 102.

At 1302, the image sensor 114 captures or acquires three-dimensional image data which is communicated to the one or more non-transitory, machine-readable storage media 118 via one or more data busses 126. The three-dimensional image data captured by the image sensor 114 includes a first three-dimensional object 102 disposed within the field-of-view 116 of the image sensor 114. The three-dimensional image data captured by the image sensor 114 may include depth data providing a depth map and intensity data providing an intensity image of the field-of-view 116 of the image sensor 114. At least a portion of the three-dimensional image data received by the one or more non-transitory, machine-readable storage media 118 is communicated to or otherwise accessed by the one or more processors 120 in order to select one or more geometric primitives 104 preparatory to fitting a three-dimensional packaging wireframe model 106 about all or a portion of the first three-dimensional object 104.

At 1304, based in whole or in part on the three-dimensional image data received from the image sensor 114, the one or more processors 120 determine a number of features on the first three-dimensional object 102 that appear in the three-dimensional image data. The features may include any point, edge, or other discernible structure on the first three-dimensional object 102 and detectable in the image represented by the three-dimensional image data. For example, one or more features may correspond to a three-dimensional point on the three-dimensional object 102 that is detectable in a depth map containing the first three-dimensional object, an intensity image in which the three-dimensional object, or both a depth map and an intensity image in which the first three-dimensional object 102 appears as is represented. The identified features may include boundaries or defining edges of the first three-dimensional object, for example corners, arcs, lines, edges, angles, radii, and similar characteristics that define all or a portion of the external boundary of the first three-dimensional object 102.

At 1306, based at least in part on the features identified in 1304, the one or more processors 120 select one or more geometric primitives 104 having the same or differing shapes to encompass substantially all of the identified features of the first three-dimensional object 102. Dependent upon the overall number, arrangement, and complexity of the one or more selected geometric primitives 104, the one or more processors 120 may autonomously determine that a plurality of three-dimensional packaging wireframe models 106 are useful in fitting an overall three-dimensional packaging wireframe model 106 to the relatively complex three-dimensional object 102. The one or more processors 120 may determine that a first three-dimensional packaging wireframe model 106 can be fitted to a first portion of the first three-dimensional object 102 and a second three-dimensional packaging wireframe model 106 can be fitted to a second portion of the first three-dimensional object 102.

At 1308, the one or more processors 120 scale and fit the first three-dimensional packaging wireframe model 106 to the one or more geometric primitives 104 encompassing the first portion of the first three-dimensional object 102. The scaled and fitted first three-dimensional packaging wireframe model 106 encompasses substantially all the first portion of the first three-dimensional object 102.

At 1310 the one or more processors 120 fit the second three-dimensional packaging wireframe model 106 to the one or more geometric primitives 104 encompassing the second portion of the first three-dimensional object 102. The scaled and fitted second three-dimensional packaging wireframe model 106 encompasses substantially all the second portion of the first three-dimensional object 102.

At 1312, the one or more processors 120 can generate a video, image, or display data output that includes image data of the first and second three-dimensional packaging wireframe models 106 as fitted to the first and second portions of the first three-dimensional object 102, respectively. The video, image, or display output data provided by the one or more processors 120 may be used by the one or more CPUs 160 to generate one or more video, image, or display outputs viewable on the one or more display devices 156 that includes an image simultaneously or contemporaneously depicting the first and second portions of the first three-dimensional object 102 using image data from the camera 152 and the respective first and second three-dimensional packaging wireframe models 106 fitted to each of the first and second portions by the one or more processors 120. In some instances, an image concurrently or simultaneously depicting an image of the first and second portions of the first three-dimensional object 102 along with the one or more respective first and second geometric primitives 104 and the respective scaled and fitted first and second three-dimensional packaging wireframe models 106 may also be provided on the one or more display devices 156.

Figure 14:
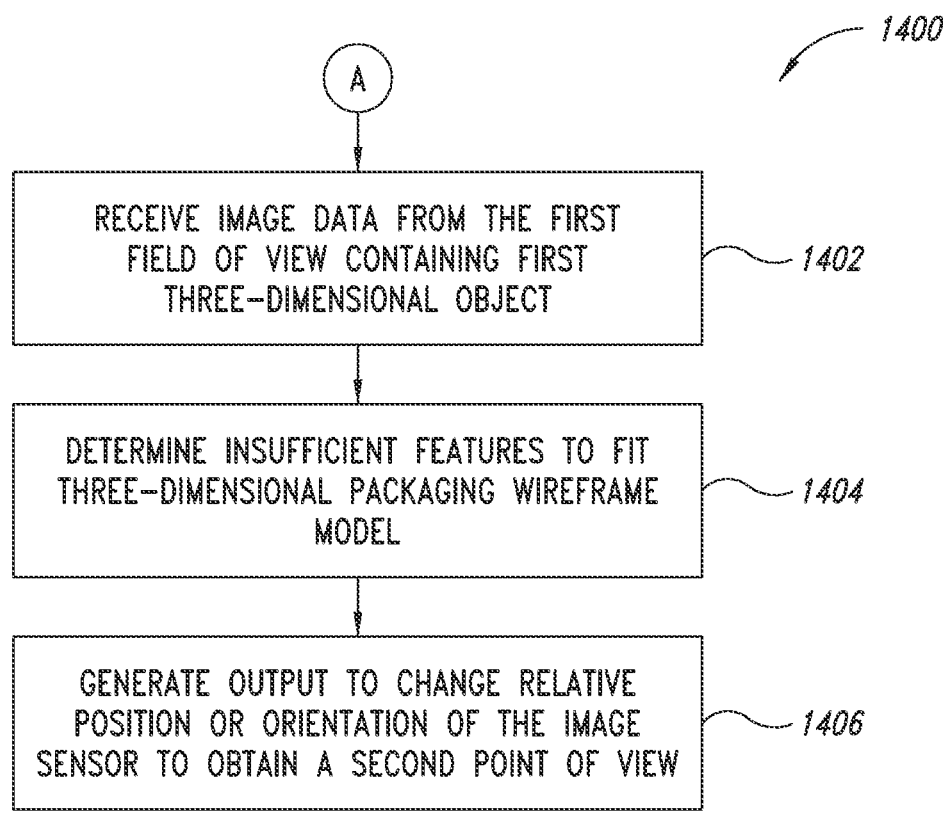
FIG. 14 is an example volume dimensioning method including the determination that an insufficient number of three-dimensional features are visible within the first point of view to permit the fitting of a first three-dimensional packaging wireframe model about the three-dimensional object.

FIG. 14 shows a method 1400 depicting the operation of an example volume dimensioning system 100, such as the system depicted in FIG. 1. In some embodiments, the initial or first point of view of the image sensor 114 may not provide sufficient feature data to the one or more processors 120 to determine the extent, scope, or boundary of the first three-dimensional object 102. For example, if the first three-dimensional object 102 is a cubic box and only the two-dimensional front surface of the cubic box is visible to the image sensor 114, the image data provided by the image sensor 114 to the one or more processors 120 is insufficient to determine the depth (i.e., the extent) of the cubic box, and therefore the one or more processors 120 do not have sufficient data regarding the features of the three-dimensional object 102 to select one or more geometric primitives 104 as representative of the first three-dimensional object 102. In such instances, it is necessary to provide the one or more processors 120 with additional data gathered from at least a second point of view to enable selection of one or more appropriate geometric primitives 104 for fitting a first three-dimensional packaging wireframe model 106 that encompasses the first three-dimensional object 102.

At 1402, the image sensor 114 captures or acquires three-dimensional image data which is communicated to the one or more non-transitory, machine-readable storage media 118 via one or more data busses 126. The three-dimensional image data captured by the image sensor 114 includes a first three-dimensional object 102 disposed within the field-of-view 116 of the image sensor 114. The three-dimensional image data captured by the image sensor 114 may include depth data providing a depth map and intensity data providing an intensity image of the field-of-view of the image sensor 114. At least a portion of the three-dimensional image data received by the one or more non-transitory, machine-readable storage media 118 is communicated to or otherwise accessed by the one or more processors 120 in order to select one or more geometric primitives 104 to fit a three-dimensional packaging wireframe model 106 that encompasses the first three-dimensional object 102.

At 1404, based on the image data received from the image sensor 114, the one or more processors 120 determine that an insufficient number of features on the first three-dimensional object 102 are present within the first point of view of the image sensor 114 to permit the selection of one or more geometric primitives 104 to fit the first three-dimensional packaging wireframe model 106.

At 1406, responsive to the determination that an insufficient number of features are present within the first point of view of the image sensor 114, the one or more processors 120 generates an output indicative of the lack of an adequate number of features within the first point of view of the image sensor 114. In some instances, the output provided by the one or more processors 120 can indicate a possible second point of view able to provide a view of a sufficient number of additional features on the first three-dimensional object 102 to permit the selection of one or more appropriate geometric primitives representative of the first three-dimensional object 102.

In some situations, the output generated by the one or more processors 120 may cause a second image sensor positioned remote from the image sensor 114 to transmit image data from a second point of view to the one or more non-transitory, machine-readable storage media 118. In some instances the second image sensor can transmit depth data related to a depth map of first three-dimensional object 102 from the second point of view or intensity data related to an intensity image of the first three-dimensional object 102 from the second point of view. The image data provided by the second image sensor is used by the one or more processors 120 in identifying additional features on the first three-dimensional object 102 that are helpful in selecting one or more appropriate geometric primitives representative of the first three-dimensional object 102.

In some situations, the output generated by the one or more processors 120 may include audio, visual, or audio/visual indicator data used by the host computer 150 to generate an audio output via one or more I/O devices 166 or to generate a visual output on the one or more display devices 156 that designate a direction of movement of the image sensor 114 or a direction of movement of the first three-dimensional object 102 that will permit the image sensor 114 to obtain a second point of view of the first three-dimensional object 102. The image data provided by the image sensor 114 from the second point of view is used by the one or more processors 120 in identifying additional features on the first three-dimensional object 102 that are helpful in selecting one or more appropriate geometric primitives representative of the first three-dimensional object 102.

Figure 15:
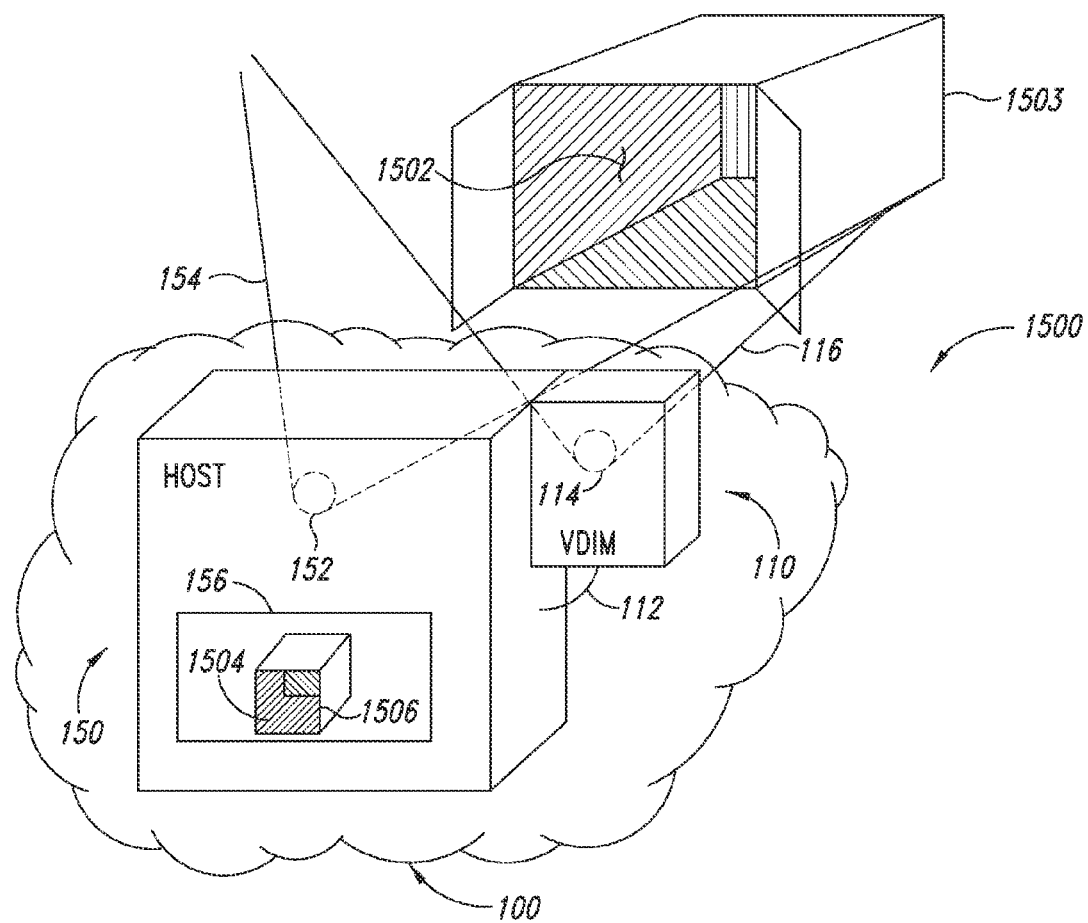
FIG. 15 is a schematic diagram of an example volume dimensioning system coupled to a host computer, with a three-dimensional void disposed within the field-of-view of the host system camera and the field-of-view of the volume dimensioning system image sensor.

FIG. 15 depicts an illustrative volume dimensioning system 110 communicably coupled to a host computer 150 via one or more busses 112. The volume dimensioning system 110 is equipped with an image sensor 114 having a field-of-view 116. The host computer 150 is equipped with a camera 152 having a field-of-view 154 and a display device 156.

An interior space of a partially or completely empty container or trailer 1503 is depicted as forming a three-dimensional void 1502 falling within the field-of-view 116 of the image sensor 114 and the field-of-view 154 of the camera 152. An image of the three-dimensional void is depicted as an image on the one or more display devices 156. The one or more processors 120 can select one or more geometric primitives 1504 corresponding to the first three-dimensional void 1502 preparatory to scaling and fitting a three-dimensional receiving wireframe 1506 within the first three-dimensional void 1502. The scaled and fitted three-dimensional receiving wireframe model 1506 is depicted within the three-dimensional void 1502. In some embodiments, the scaled and fitted three-dimensional receiving wireframe model 1506 may be shown in a contrasting or bright color on the one or more display devices 156.

The scaled, fitted three-dimensional receiving wireframe model 1506 may be generated by the host computer 150 or, more preferably may be generated by the volume dimensioning system 110. The image on the display device 156 is a provided in part using the image data acquired by the camera 152 coupled to the host computer system 150 which provides an image of the three-dimensional void 1502, and in part using the scaled and fitted three-dimensional receiving wireframe model 1506 provided by the volume dimensioning system 110. Data, including visible image data provided by the camera 152 and depth map data and intensity image data provided by the image sensor 114 is exchanged between the host computer 150 and the volume dimensioning system 110 via the one or more busses 112. In some instances, the volume dimensioning system 110 and the host computer system 150 may be partially or completely incorporated within the same housing, for example a handheld computing device or a self service kiosk.

Figure 16:
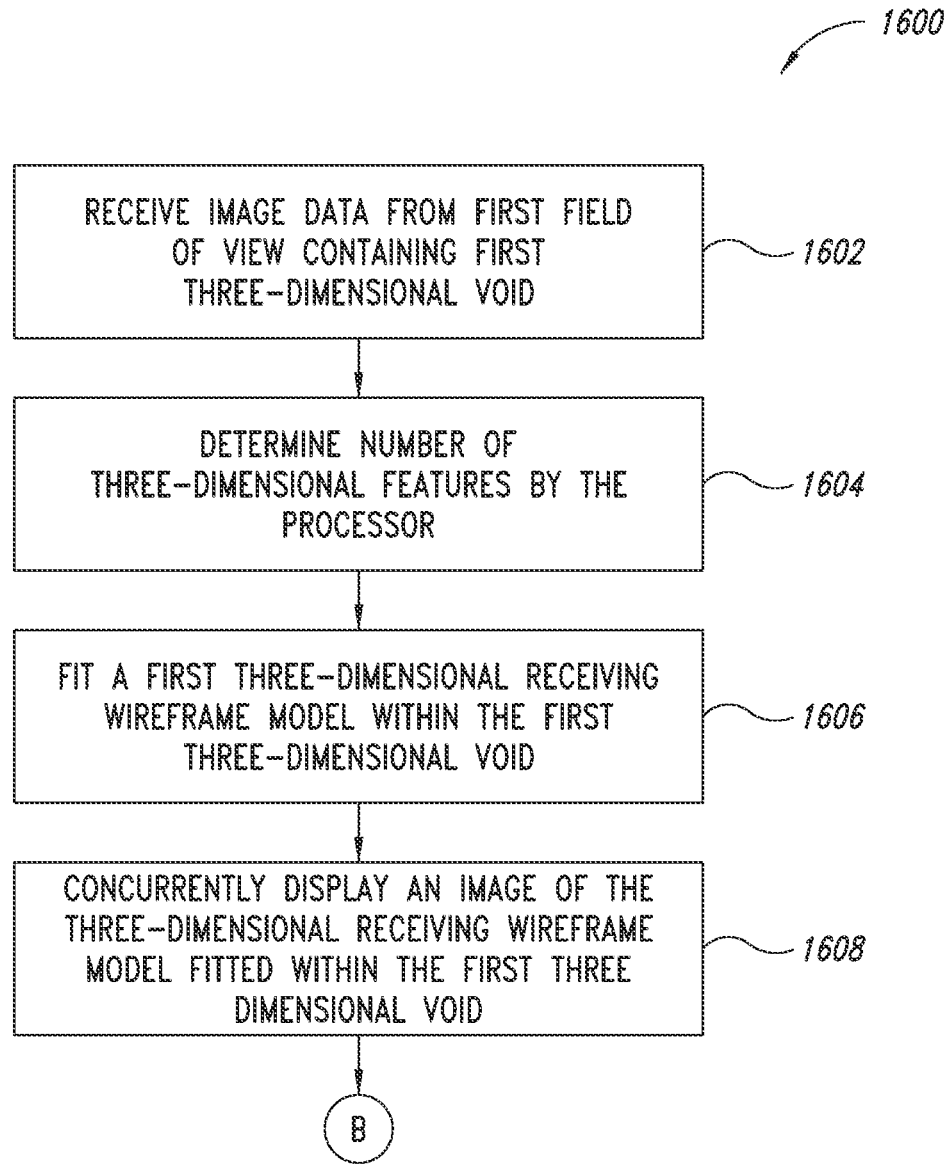
FIG. 16 is an example volume dimensioning method including the fitting of a first three-dimensional receiving wireframe model within a first three-dimensional void, for example an empty container to receive one or more three-dimensional objects.

FIG. 16 shows a method 1600 depicting the operation of an example volume dimensioning system 1500, such as the system depicted in FIG. 15. In some instances, the first three-dimensional object 102 cannot be constructed based upon the presence of a physical, three-dimensional object, and is instead represented by the absence of one or more physical objects, or alternatively as a three-dimensional void 1502. Such an instance can occur, for example, when the system 100 is used to determine the available dimensions or volume remaining within an empty or partially empty shipping container, trailer, box, receptacle, or the like. For a carrier, the ability to determine with a reasonable degree of accuracy the available dimensions or volume within a particular three-dimensional void 1502 provides the ability to optimize the placement of packaged physical three-dimensional objects 102 within the three-dimensional void 1502. Advantageously, when the dimensions or volumes of the packaged three-dimensional objects 102 intended for placement within the three-dimensional void 1502 are known, for example when a volume dimensioning system 100 as depicted in FIG. 1 has been used to determine the dimensions or volume of the three-dimensional packaging wireframe models 106 corresponding to packaged three-dimensional objects 102, the ability to determine the dimensions or volume available within a three-dimensional void 1502 can assist in optimizing the load pattern of the three-dimensional objects 102 within the three-dimensional void 1502.

At 1602, the image sensor 114 captures or acquires three-dimensional image data of a first three-dimensional void 1502 within the field-of-view of 116 of the image sensor 114. Image data captured or acquired by the image sensor 114 is communicated to the one or more non-transitory, machine-readable storage media 118 via one or more data busses 126. The three-dimensional image data captured by the image sensor 114 includes a first three-dimensional void 1502 disposed within the field-of-view 116 of the image sensor 114. The three-dimensional image data captured by the image sensor 114 may include depth data providing a depth map and intensity data providing an intensity image of the field-of-view of the image sensor 114. At least a portion of the three-dimensional image data received by the one or more non-transitory, machine-readable storage media 118 is communicated to or otherwise accessed by the one or more processors 120 in order to select one or more geometric primitives 1504 preparatory to fitting a first three-dimensional receiving wireframe model 1506 within all or a portion of the first three-dimensional void 1502.

At 1604, based in whole or in part on the image data captured by the image sensor 114, stored in the one or more non-transitory, machine-readable storage media 118, and communicated to the one or more processors 120, the one or more processors 120 determine a number of features related to or associated with the first three-dimensional void 1502 present in the image data received by the one or more processors 120. The features may include any point on the first three-dimensional void 1502 detectable in the image data provided by the image sensor 114. For example, one or more features may correspond to a point on the first three-dimensional void 1502 that is detectable in a depth map containing the first three-dimensional void 1502, an intensity image containing the three-dimensional void 1502, or both a depth map and an intensity image containing the first three-dimensional void 1502. The identified features include boundaries or defining edges of the first three-dimensional void 1502, for example corners, arcs, lines, edges, angles, radii, and similar characteristics that define all or a portion of one or more boundaries defining the first three-dimensional void 1502.

At 1606, based at least in part on the features identified in 1604, the one or more processors 120 select one or more geometric primitives 1504 and fit the selected geometric primitives 1504 within substantially all of the features identified by the one or more processors 120 as defining all or a portion of one or more boundaries of the first three-dimensional void 1502. The one or more selected geometric primitives 1504 are used by the one or more processors 120 to fit a three-dimensional receiving wireframe model 1506 within all or a portion of the first three-dimensional void 1502.

After fitting the first three-dimensional receiving wireframe model 1506 within the three-dimensional void 1502, the one or more processors 120 determine, based on the first three-dimensional receiving wireframe model 1506, the available dimensions or volume within the first three-dimensional void 1502.

At 1608, the one or more processors 120 can generate a video, image, or display data output that includes image data of the first three-dimensional receiving wireframe model 1506 as fitted to the first three-dimensional void 1502. The video, image, or display output data provided by the one or more processors 120 may be used by the one or more CPUs 160 to generate one or more video, image, or display outputs on the one or more display devices 156 including an image concurrently or simultaneously depicting the first three-dimensional void 1502 using image data from the camera 152 and the first three-dimensional receiving wireframe model 1506 fitted therein by the one or more processors 120. In some instances, an image concurrently or simultaneously depicting an image of the first three-dimensional void 1502 along with the one or more geometric primitives 1504 and the scaled and fitted three-dimensional packaging wireframe model 1506 may also be provided on the one or more display devices 156.

Figure 17:
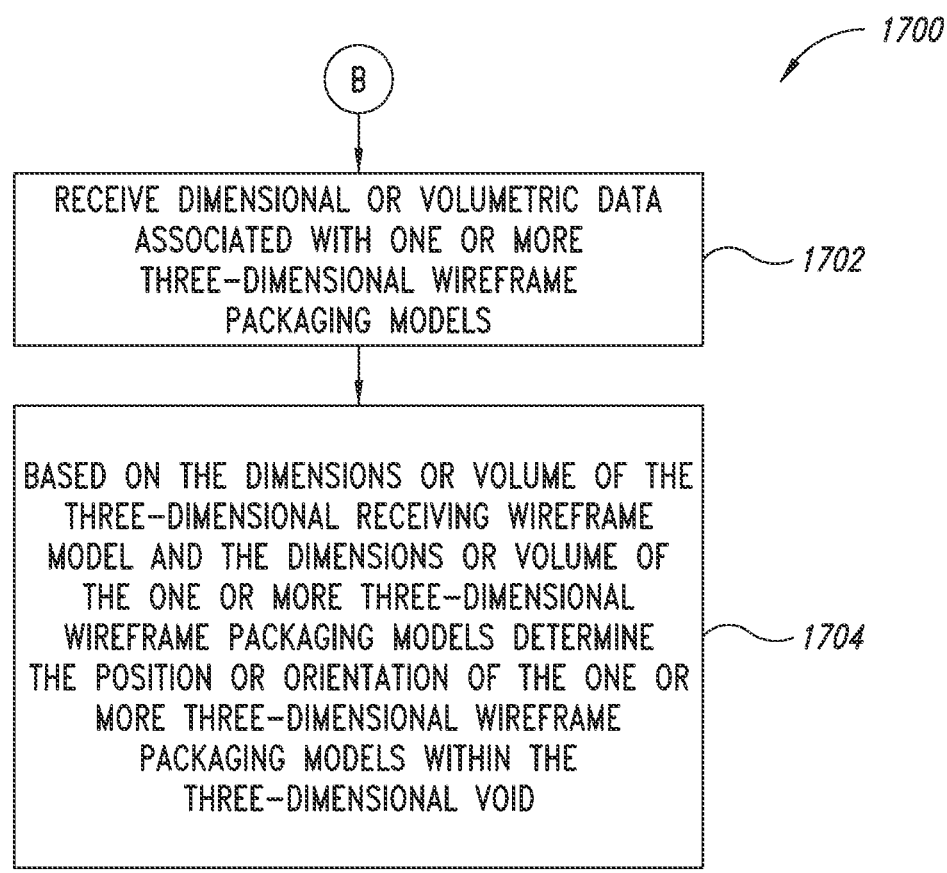
FIG. 17 is an example volume dimensioning method based on the method depicted in FIG. 15 and including the receipt of dimensional or volumetric data associated with one or more three-dimensional packaging wireframe models and the determining of positions or orientations of the one or more three-dimensional packaging wireframe models within the three-dimensional void.

FIG. 17 shows a method 1700 extending from logic flow diagram 1600 and describing one or more additional features of an example volume dimensioning system 1500, such as the system depicted in FIG. 15. The one or more processors 120 fit the first three-dimensional receiving wireframe model 1506 within the first three-dimensional void 1502 and determine the dimensions or volume available within the first three-dimensional void 1502. In some instances, the one or more processors 120 can receive data, for example via the host computer 150 that includes volumetric or dimensional data associated with one or more three-dimensional objects 102.

For example, where the first three-dimensional void 1502 corresponds to the available volume in a shipping container 1503 destined for Seattle, the one or more processors 120 may receive volumetric or dimensional data associated with a number of three-dimensional objects 102 for shipment to Seattle using the shipping container 1503. Using the dimensions or volume of the first three-dimensional void 1502, the dimensions of each of the number of three-dimensional objects 102, and any specialized handling instructions (e.g., fragile objects, fragile surfaces, top-load only, etc), the one or more processors 120 can calculate a load pattern including each of the number of three-dimensional objects 102 that accommodates any user specified specialized shipping requirements and also specifies the placement or orientation of each of the number of three-dimensional objects 102 within the three-dimensional void 1502 such that the use of the available volume within the container 1503 is optimized.

At 1702, the one or more processors 120 can receive an input, for example via the host computer system 150, that contains dimensional or volumetric data associated with each of a number of three-dimensional objects 102 that are intended for placement within the first three-dimensional void 1502. In some instances, at least a portion of the dimensional or volumetric data associated with each of a number of three-dimensional objects 102 can be provided by the volume dimensioning system 100. In other instances, at least a portion of the dimensional or volumetric data provided to the one or more processors 120 can be based on three-dimensional packaging wireframe models 106 fitted to each of the three-dimensional objects 102. In some instances, the dimensional or volumetric data associated with a particular three-dimensional object 102 can include one or more user-supplied specialized shipping requirements (e.g., fragile surfaces, top-load items, "this side up" designation, etc.).

At 1704, based in whole or in part upon the received dimensional or volumetric data, the one or more processors 120 can determine the position or orientation for each of the number of three-dimensional objects 102 within the first three-dimensional void 1502. The position or location of each of the number of three-dimensional objects 102 can take into account the dimensions of the object, the volume of the object, any specialized shipping requirements associated with the object, and the available dimensions or volume within the first three-dimensional void 1502. In some instances, the volume dimensioning system 1500 can position or orient the number of three-dimensional objects 102 within the first three-dimensional void 1502 to minimize empty space within the three-dimensional void 1502.

The one or more processors 120 can generate a video, image, or display data output that includes the three-dimensional packaging wireframes 106 fitted to each of the three-dimensional objects 102 intended for placement within the three-dimensional void 1502. The three-dimensional packaging wireframes 106 associated with some or all of the number of three-dimensional objects 102 may be depicted on the one or more display devices 156 in their final positions and orientations within the three-dimensional receiving wireframe 1506. The video, image, or display output data provided by the one or more processors 120 may be used by the one or more CPUs 160 to generate one or more video, image, or display outputs on the one or more display devices 156 that includes an image concurrently or simultaneously depicting the first three-dimensional void 1502 and all or a portion of the three-dimensional packaging wireframe models 106 fitted within the three-dimensional void 1502 by the one or more processors 120.

Figure 18:
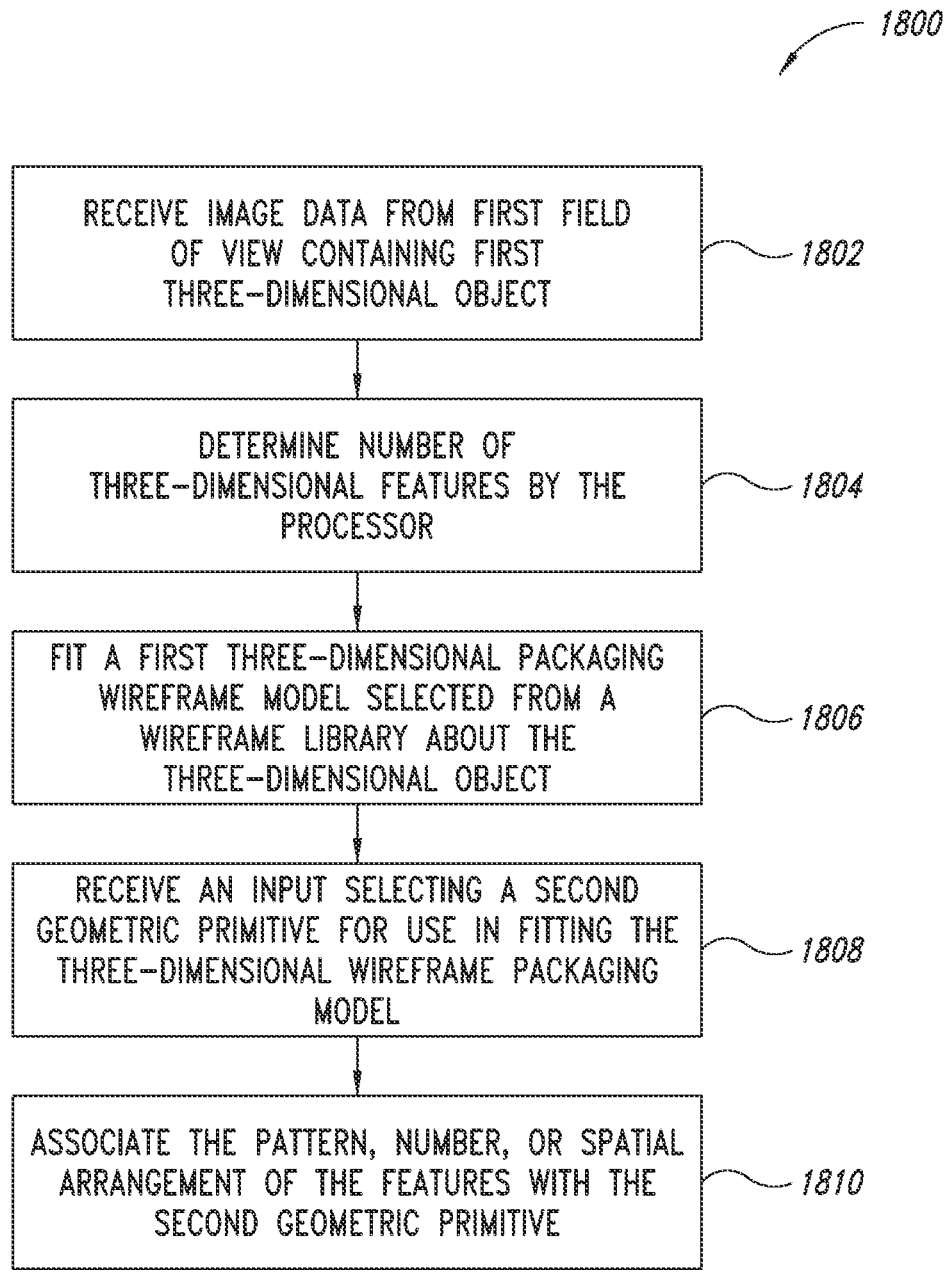
FIG. 18 is an example volume dimensioning method including the selection of a first geometric primitive based on a pattern of feature points, the rejection of the first three-dimensional packaging wireframe model, the selection of a second geometric primitive based on the pattern of feature points, and the future selection of the second geometric primitive for a similar pattern of feature points.

FIG. 18 shows a method 1800 depicting the operation of an example volume dimensioning system 100, such as the system depicted in FIG. 1. Recall that in certain instances, a user may provide an input to the volume dimensioning system resulting in the changing of one or more three-dimensional packaging wireframe models 106 fitted to the three-dimensional object 102. In other instances, a user can provide a recommended geometric primitive 104 for use by the one or more processors 120 in fitting a three-dimensional packaging wireframe model 106 about the three-dimensional object 102. In other instances, a user may provide an input to the volume dimensioning system 100 indicating a single three-dimensional object 102 can be broken into a plurality of portions, each of the portions represented by a different geometric primitive 104 and fitted by the one or more processors 120 with a different three-dimensional packaging wireframe model 106.

Over time, the volume dimensioning system 110 may "learn" to automatically perform one or more functions that previously required initiation based on a user input. In one instance, a first three-dimensional object 102 provides a particular pattern of feature points to the one or more processors 120 and a user provides an input selecting a particular geometric primitive 104 for use by the one or more processors 120 in fitting a three-dimensional packaging wireframe model 106 to the three-dimensional object 102. If, in the future, a three-dimensional object 102 provides a similar pattern of feature points, the one or more processors 120 may autonomously select the geometric primitive 104 previously selected by the user for fitting a three-dimensional packaging wireframe model 106 about the three-dimensional object 102.

In another instance, a first three-dimensional object 102 provides a particular pattern of feature points to the one or more processors 120 and a user indicates to the one or more processors 120 that the first three-dimensional object 102 should be apportioned into first and second portions about which respective first and second three-dimensional packaging wireframe models 106 can be fitted. If, in the future, a three-dimensional object 102 provides a similar pattern of feature points, the one or more processors 120 may autonomously apportion the three-dimensional object 102 into multiple portions based on the apportioning provided by the former user.

At 1802 the image sensor 114 captures or acquires three-dimensional image data which is communicated to the one or more non-transitory, machine-readable storage media 118 via one or more data busses 126. The three-dimensional image data captured by the image sensor 114 includes a first three-dimensional object 102 disposed within the field-of-view of the image sensor 114. The three-dimensional image data captured by the image sensor 114 may include depth data providing a depth map and intensity data providing an intensity image of the field-of-view of the image sensor 114. At least a portion of the three-dimensional image data received by the one or more non-transitory, machine-readable storage media 118 is communicated to or otherwise accessed by the one or more processors 120 in order to select one or more geometric primitives 104 for use in fitting a three-dimensional packaging wireframe model 106 encompassing all or a portion of the three-dimensional object 102.

At 1804, based in whole or in part on the three-dimensional image data received from the image sensor 114, the one or more processors 120 determine a number of features on the first three-dimensional object 102 appearing in the three-dimensional image data. The features may include any point, edge, face, surface, or other discernible structure on the first three-dimensional object 102 and detectable in the image represented by the three-dimensional image data. For example, one or more features may correspond to a three-dimensional point on the three-dimensional object 102 that is detectable in a depth map containing the first three-dimensional object, an intensity image in which the three-dimensional object, or both a depth map and an intensity image in which the first three-dimensional object 102 appears as is represented. The identified features may include boundaries or defining edges of the first three-dimensional object, for example corners, arcs, lines, edges, angles, radii, and similar characteristics that define all or a portion of the external boundary of the first three-dimensional object 102.

At 1806, based at least in part on the features identified in 1804, the one or more processors 120 select one or more geometric primitives 104 from the library. The one or more processors 120 use the selected one or more geometric primitives 104 in constructing a three-dimensional packaging wireframe model 106 that encompasses all or a portion of the first three-dimensional object 102. The three-dimensional packaging wireframe model 106 encompasses substantially all of the features identified in 1804 as defining all or a portion of the first three-dimensional object 102.

Based at least in part on the identified features, the one or more processors 120 may search the library for one or more geometric primitives 104 having features, points, or nodes substantially similar to the spatial arrangement of the identified features, points, or nodes associated with the first three-dimensional object 102. In searching the library, the one or more processors may use one or more appearance-based or feature-based shape recognition or shape selection methods. For example a large modelbases appearance-based method using eigenfaces may be used to select geometric primitives 104 appropriate for fitting to the first three-dimensional object 102.

At 1808 the one or more processors 120 receives an input indicative of a rejection of the first three-dimensional packaging wireframe model 106 fitted by the one or more processors 120 about the first three-dimensional object 102. The one or more processors 120 may receive the input via an I/O device 166 such as a mouse or keyboard, or in a preferred embodiment via a resistive or capacitive touch-based input device which is part of a touch-screen display device 156 communicably connected to the host computer system 150. Responsive to the receipt of the rejection of the first three-dimensional packaging wireframe model 106 fitted about the first three-dimensional object 102, the one or more processors 120 select a second geometric primitive 104 and, based on the second selected geometric primitive 104, fit a second three-dimensional packaging wireframe model 106 about the first three-dimensional object 102.

At 1810 the one or more processors 120 can associate the number, pattern, or spatial relationship of the features identified in 1804 with the second geometric primitive 104 selected by the one or more processors. If, in the future, the one or more processors 120 identify a similar number, pattern, or spatial relationship of the features, the one or more processors 120 can autonomously select the second geometric primitive 104 for use in constructing the first three-dimensional packaging wireframe model 106 about the first three-dimensional object 102.

The foregoing detailed description has set forth various embodiments of the devices and/or processes via the use of block diagrams, schematics, and examples. Insofar as such block diagrams, schematics, and examples contain one or more functions and/or operations, it will be understood by those skilled in the art that each function and/or operation within such block diagrams, flowcharts, or examples can be implemented, individually and/or collectively, by a wide range of hardware, software, firmware, or virtually any combination thereof. In one embodiment, the present subject matter may be implemented via Application Specific Integrated Circuits (ASICs) or programmable gate arrays. However, those skilled in the art will recognize that the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers) as one or more programs running on one or more processors (e.g., microprocessors), as firmware, or as virtually any combination thereof, and that designing the circuitry and/or writing the code for the software and or firmware would be well within the skill of one of ordinary skill in the art in light of this disclosure.

Various methods and/or algorithms have been described. Some or all of those methods and/or algorithms may omit some of the described acts or steps, include additional acts or steps, combine acts or steps, and/or may perform some acts or steps in a different order than described. Some of the method or algorithms may be implemented in software routines. Some of the software routines may be called from other software routines. Software routines may execute sequentially or concurrently, and may employ a multi-threaded approach.

In addition, those skilled in the art will appreciate that the mechanisms taught herein are capable of being distributed as a program product in a variety of forms, and that an illustrative embodiment applies equally regardless of the particular type of signal bearing media used to actually carry out the distribution. Examples of nontransitory signal bearing media include, but are not limited to, the following: recordable type media such as portable disks and memory, hard disk drives, CD/DVD ROMs, digital tape, computer memory, and other non-transitory computer-readable storage media.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for fitting a packaging wireframe model to one or more three-dimensional objects, the method comprising:
   receiving image data of an area from a first point of view by at least one nontransitory processor-readable medium from at least one image sensor, the area including at least a first three-dimensional object to be dimensioned;
   determining that there are insufficient features on the first three-dimensional object to select one or more geometric primitives that are representative of the first three-dimensional object to the packaging wireframe model; and
   in response to the determination, generating an output to obtain additional features on the first three-dimensional object from a second point of view in order to select one or more geometric primitives that are representative of the first three-dimensional object to fit to the packaging wireframe model, the second point of view different from the first point of view.

2. The method of claim 1, wherein generating the output to obtain the additional features on the first three-dimensional object from the second point of view comprises generating at least one output comprising an audio output that is perceivable by a user.

3. The method of claim 2, wherein the at least one output indicates to the user a direction of movement of the at least one image sensor with respect to the first three-dimensional object.

4. The method of claim 1, wherein generating the output to obtain the additional features on the first three-dimensional object from the second point of view comprises generating at least one output comprising a visual output that is perceivable by a user.

5. The method of claim 4, wherein the at least one output indicates to the user a direction of movement of the at least one image sensor with respect to the first three-dimensional object.

6. The method of claim 1, wherein the packaging wireframe model is two-dimensional and is fitted about a portion of an image of the first three-dimensional object, the method further comprising displaying an image of the packaging wireframe model on a display on which the image of the first three-dimensional object is displayed.

7. The method of claim 6, wherein displaying of the image of the packaging wireframe model occurs before generating the output.

8. The method of claim 1, comprising determining, from the received image data, a number of features in three dimensions of the first three-dimensional object by at least one processor communicatively coupled to the at least one nontransitory processor-readable medium, wherein the features comprise one of corners, arcs, lines, edges, angles, and radii associated with an external boundary of the first three-dimensional object.

9. The method of claim 8, further comprising, based at least in part on the determined features of the first three-dimensional object, displaying an image of the packaging wireframe model, wherein the packaging wireframe model is two dimensional and is fitted about a portion of an image of the first three-dimensional object, on a display on which the image of the first three-dimensional object is displayed.

10. The method of claim 9, wherein displaying the image of the packaging wireframe model occurs before generating the output.

11. A volume dimensioning system, comprising:
   at least one image sensor communicably coupled to at least one nontransitory processor-readable medium;
   at least one processor communicably coupled to the at least one nontransitory processor-readable medium; and
   a machine executable instruction set stored within at least one nontransitory processor-readable medium, that when executed by the at least one processor causes the at least one processor to:
   read image data from the at least one nontransitory processor-readable medium, the image data associated with a first point of view of an area sensed by the at least one image sensor, the area including at least a first three-dimensional object to be dimensioned;
   determine from the received image data that there are an insufficient number of features on the first three-dimensional object to select one or more geometric primitives that are representative of the first three-dimensional object to the packaging wireframe model;
   responsive to the determination of an insufficient number of features in the image data, generate an output to obtain additional features on the first three-dimensional object from a second point of view in order to select one or more geometric primitives that are representative of the first three-dimensional object to fit to the packaging wireframe model, the second point of view different from the first point of view.

12. The volume dimensioning system of claim 11, wherein the machine executable instruction set comprises instructions that when executed by the at least one processor cause the at least one processor to:
   generate an audio output that is perceivable by a user to obtain the additional features on the first three-dimensional object from the second point of view.

13. The volume dimensioning system of claim 12, wherein the audio output indicates to the user a direction of movement the at least one image sensor with respect to the first three-dimensional object.

14. The volume dimensioning system of claim 11, wherein the machine executable instruction set comprises instructions that when executed by the at least one processor cause the at least one processor to:
   generate a visual output that is perceivable by a user to obtain the additional features on the first three-dimensional object from the second point of view.

15. The volume dimensioning system of claim 14, wherein the visual output indicates to the user a direction of movement of the at least one image sensor with respect to the first three-dimensional object.

16. The volume dimensioning system of claim 11, wherein the packaged wireframe model is two-dimensional and is fitted about a portion of an image of the first three-dimensional model, the volume dimensioning system comprising a display, wherein the machine executable instruction set comprises instructions that when executed by the at least one processor cause the at least one processor to display an image of the packaging wireframe model object on the display, and wherein the image of the first three-dimensional object is displayed on the display.

17. The volume dimensioning system of claim 11, wherein the packaged wireframe model is two-dimensional and is fitted about a portion of an image of the first three-dimensional model, the volume dimensioning system comprising a display, wherein the machine executable instruction set comprises instructions that when executed by the at least one processor cause the at least one processor to, before generating the output, display an image of the packaging wireframe model on the display, and wherein the image of the first three-dimensional object is displayed on the display.

18. The volume dimensioning system of claim 11, wherein the machine executable instruction set comprises instructions that when executed by the at least one processor cause the at least one processor to determine, from the received image data, a number of features in three dimensions of the first three-dimensional object.

19. The volume dimensioning system of claim 11, wherein the packaged wireframe model is two-dimensional and is fitted about a portion of an image of the first three-dimensional model, the volume dimensioning system comprising a display, wherein the machine executable instruction set comprises instructions that when executed by the at least one processor cause the at least one processor to:
　determine from the received image data a number of features in three dimensions of the first three-dimensional object, wherein the features comprise one of corners, arcs, lines, edges, angles, and radii associated with an external boundary of the first three-dimensional object; and
　based at least in part on the determined features of the first three-dimensional object, display an image of the packaging wireframe model on the display, wherein the image of the first three-dimensional object is displayed on the display.

20. The volume dimensioning system of claim 11, wherein the packaged wireframe model is two-dimensional and is fitted about a portion of an image of the first three-dimensional model, the volume dimensioning system comprising a display, wherein the machine executable instruction set comprises instructions that when executed by the at least one processor cause the at least one processor to:
　determine from the received image data a number of features in three dimensions of the first three-dimensional object; and
　based at least in part on the determined features of the first three-dimensional object and before generating the output, display an image of the packaging wireframe model on the display, wherein the image of the first three-dimensional object is displayed on the display.

* * * * *